(12) United States Patent
Yetisir

(10) Patent No.: US 12,348,276 B1
(45) Date of Patent: Jul. 1, 2025

(54) ANTENNA APPARATUS AND IN-LINE CALIBRATION SYSTEM FOR SAME

(71) Applicant: Space Exploration Technologies Corp., Hawthorne, CA (US)

(72) Inventor: Ersin Yetisir, Redmond, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 176 days.

(21) Appl. No.: 18/132,108

(22) Filed: Apr. 7, 2023

Related U.S. Application Data

(60) Provisional application No. 63/328,683, filed on Apr. 7, 2022.

(51) Int. Cl.
    *H04B 17/12*     (2015.01)
    *H04B 17/15*     (2015.01)

(52) U.S. Cl.
    CPC ............. *H04B 17/12* (2015.01); *H04B 17/15* (2015.01)

(58) Field of Classification Search
    CPC ................ H04B 17/12; H04B 17/15
    See application file for complete search history.

(56) References Cited

U.S. PATENT DOCUMENTS

| | | | | |
|---|---|---|---|---|
| 11,527,833 B1* | 12/2022 | Yousefi | ............. | H01Q 3/30 |
| 11,804,914 B1* | 10/2023 | Yousefi | ............. | H01Q 3/267 |
| 2004/0155824 A1* | 8/2004 | Nagashima | ............. | G01R 29/10 |
| | | | | 343/703 |
| 2006/0284768 A1* | 12/2006 | Pauplis | ............. | H01Q 9/285 |
| | | | | 455/67.11 |
| 2018/0034566 A1* | 2/2018 | Tankielun | ............. | H04B 17/12 |
| 2018/0375207 A1* | 12/2018 | Dourado | ............. | H04B 17/0085 |
| 2019/0013590 A1* | 1/2019 | Rowell | ............. | H01Q 3/267 |
| 2022/0006185 A1* | 1/2022 | Yetisir | ............. | H01Q 9/0414 |

FOREIGN PATENT DOCUMENTS

EP      3767747 A1      1/2021

* cited by examiner

*Primary Examiner* — Hai V Tran
(74) *Attorney, Agent, or Firm* — Polsinelli PC

(57) ABSTRACT

A method of calibration a transmit (Tx) phased array antenna is provided. The method includes transmitting a first RF signal to a first signal chain associated with a first antenna element of the plurality of antenna elements, wherein the first RF signal is generated in the at least one transmit (Tx) section; transmitting a second RF signal to a second signal chain associated with a second antenna element of the plurality of antenna elements. The method includes determining one or more characteristics associated with propagation of RF signals along a portion of a calibration line disposed between antenna elements and adjusting one or more signal chains associated with the antenna elements based at least in part on determined characteristics associated with propagation of RF signals along a portion of the calibration line.

26 Claims, 27 Drawing Sheets

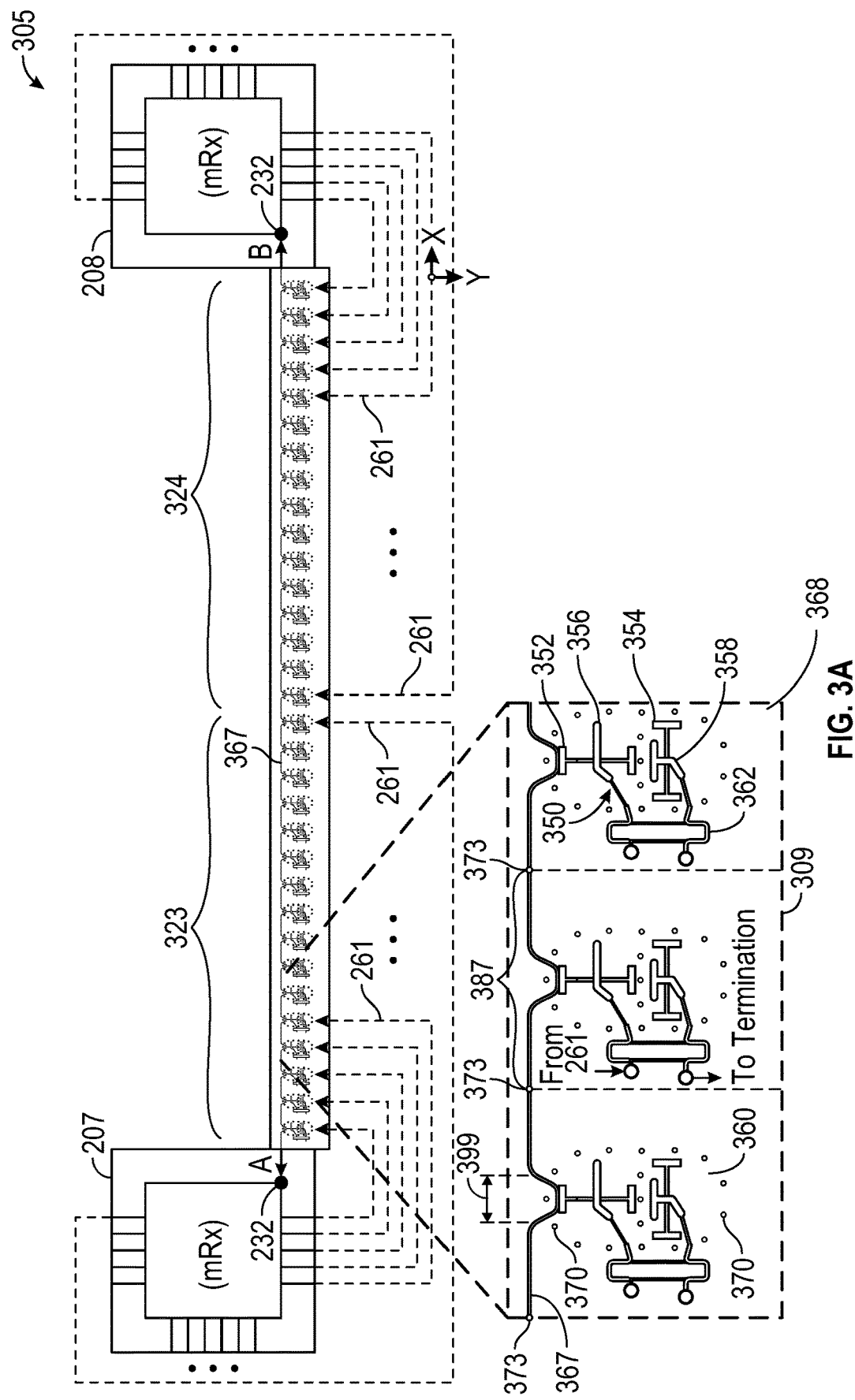

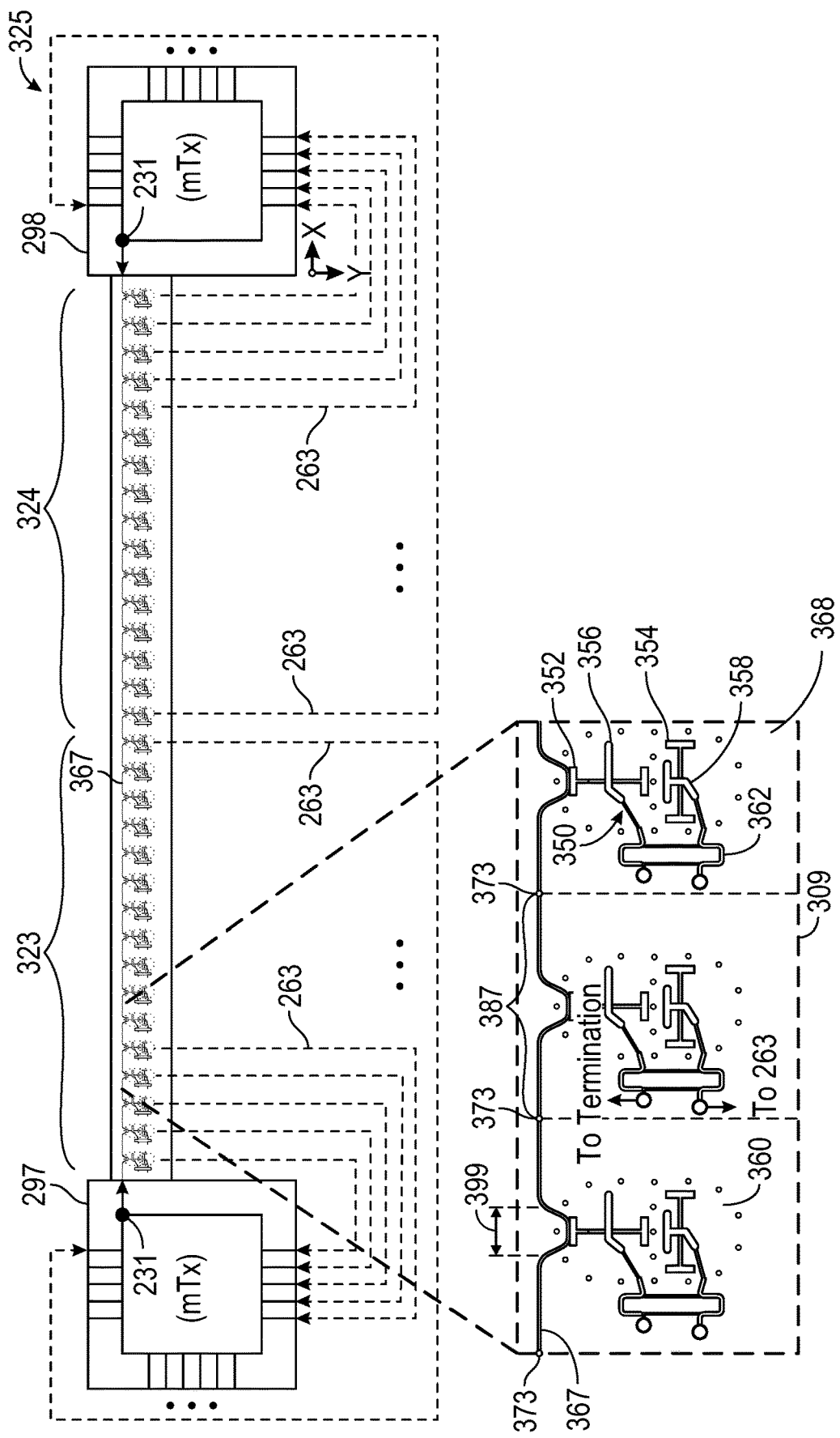

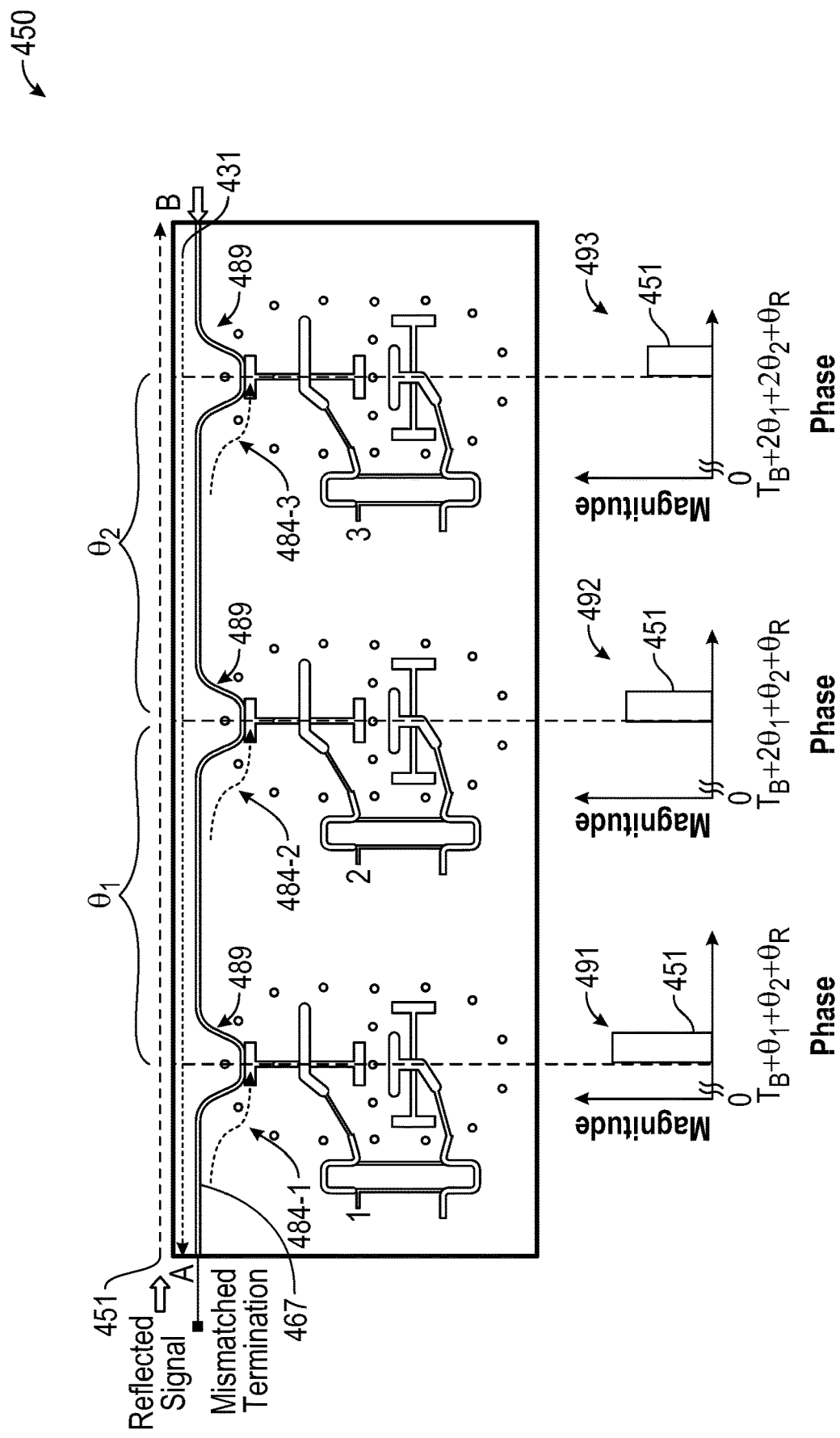

ANTENNA APPARATUS AND IN-LINE CALIBRATION SYSTEM FOR SAME

CROSS-REFERENCE TO RELATED APPLICATION

This application claims the benefit of U.S. Provisional Application No. 63/328,683, filed Apr. 7, 2022, entitled "ANTENNA APPARATUS AND IN-LINE CALIBRATION SYSTEM FOR SAME", the disclosure of which is expressly incorporated by reference herein in its entirety.

TECHNICAL FIELD

The present disclosure pertains to antenna apparatuses for satellite communication systems and calibration architectures for antenna arrays.

BACKGROUND

Satellite communication systems generally involve Earth-based antennas in communication with a constellation of satellites in orbit. Earth-based antennas are, of consequence, exposed to weather and other environmental conditions. Therefore, described herein are antenna apparatuses and their housing assemblies designed with sufficient durability to protect internal antenna components while enabling radio frequency communications with a satellite communication system, such as a constellation of satellites.

Phased array antennas are used in a variety of wireless communication systems such as satellite and cellular communication systems. The phased array antennas can include a number of antenna elements arranged to behave as a larger directional antenna. Moreover, a phased array antenna can be used to increase an overall directivity and gain, steer the angle of array for greater gain and directivity, perform interference cancellation from one or more directions, determine the direction of arrival of received signals, and improve a signal to interference ratio, among other things. Advantageously, a phased array antenna can be configured to implement beamforming techniques to transmit and/or receive signals in a preferred direction without physically repositioning or reorientation.

In some cases, variations in weather and other environmental conditions can change performance characteristics of antenna elements in a phased array antenna such as gain, phase, delay, or the like. Various calibration procedures can be performed during operation of a phased array antenna to compensate for variations in performance characteristics.

SUMMARY

In accordance with one embodiment of the present disclosure, a method of calibration a transmit (Tx) phased array antenna is provided. The method includes: transmitting a first RF signal to a first signal chain associated with a first antenna element of the plurality of antenna elements, wherein the first RF signal is generated in the at least one transmit (Tx) section; transmitting a second RF signal to a second signal chain associated with a second antenna element of the plurality of antenna elements, wherein the second RF signal is generated in the at least one transmit (Tx) section; receiving each of the first and second RF signals from respective signal chains of the first and second antenna elements of the plurality of antenna elements at a calibration receive (mRx) section by a calibration line associated with the plurality of antenna elements; comparing a first received (mRx) RF signal from the first signal chain associated with the first antenna element a second received (mRx) RF signal from the second signal chain associated with the second antenna element, wherein comparing the first received (mRx) RF signal with the second received (mRx) RF signal comprises determining one or more characteristics associated with propagation of at least one of the first and second RF signals along a portion of the calibration line disposed between the first antenna element and the second antenna element; and adjusting one of the first signal chain associated with the first antenna element and the second signal chain associated with the second antenna element relative to the other of the first signal chain associated with the first antenna element and the second signal chain associated with the second antenna element. The adjustment is based at least in part on the determined one or more characteristics.

In accordance with another embodiment of the present disclosure, an antenna calibration system for a receive (Rx) phased array antenna is provided. The antenna calibration system includes a first calibration transmit (mTx) section, a second calibration transmit (mTx) section, and a receive (Rx) section for receiving RF signals and comparing received RF signals for the purpose of calibration; a calibration line RF couplable to the first calibration transmit (mTx) section and the second calibration transmit (mTx) section; and a plurality of antenna elements associated with the calibration line. the first calibration transmit (mTx) section is configured to transmit (mTx) a first RF signal by the calibration line and the second calibration transmit (mTx) section is inactive. The Rx section is configured to compare a first received (Rx) RF signal associated with a first antenna element of the plurality of antenna elements with a second received (Rx) RF signal associated with a second antenna element of the plurality of antenna elements and compare the first received (Rx) RF signal with the second received (Rx) RF signal, wherein the comparing the first received (Rx) RF signal with the second received (Rx) RF signal comprises determining one or more characteristics associated with propagation of at least one of the first and second RF signals along a portion of the calibration line disposed between the first antenna element and the second antenna element; and adjusting one of a first signal chain associated with the first antenna element and a second signal chain associated with the second antenna element relative to the other of the first signal chain associated with the first antenna element and the second signal chain associated with the second antenna element. The adjustment is based at least in part on the determined one or more characteristics.

In accordance with another embodiment of the present disclosure, a phased array antenna system is provided. The phased array antenna system includes: a calibration line oriented along an orientation axis having a first distal end and a second distal end each radio frequency (RF) couplable to a transmitter, a receiver, or a termination, the calibration line including a plurality of calibration line coupling sections equally spaced from one or more adjacent calibration line coupling sections by a spacing distance and arranged along the orientation axis; and a plurality of antennas associated with the calibration line each antenna of the plurality of antennas is associated with a respective antenna coupling section and a respective antenna signal chain, wherein the respective antenna coupling sections are equally spaced by the spacing distance from one or more adjacent antenna coupling sections and arranged along the orientation axis. Each calibration line coupling section is configured to couple to at least one corresponding antenna coupling section.

In accordance with another embodiment of the present disclosure, an antenna calibration system for a transmit (Tx) phased array antenna is provided. The transmit (Tx) phased array antenna includes: a first calibration receive (mRx) section and a second calibration receive (mRx) section for receiving transmitted radio frequency (RF) signals and comparing received signals for the purpose of calibration; a transmit (Tx) section; a calibration line RF couplable to the first calibration receive (mRx) section and the second calibration receive (mRx) section, wherein the calibration line comprises a plurality of coupling sections and each coupling section of the plurality of coupling sections is separated from one or more adjacent coupling sections of the plurality of coupling sections by a calibration line section length; and a plurality of antenna elements. each antenna element of the plurality of antenna elements is configured to RF couple to a corresponding coupling section of the calibration line; and the plurality of antenna elements comprises a plurality of antenna elements RF couplable to the transmit (Tx) section and a plurality of inactive antenna elements each RF coupled to a respective termination. The transmit (Tx) section is configured to transmit a calibration signal to a first signal chain associated with a first antenna element of the plurality of antenna elements and a second signal chain associated with a second antenna element of the plurality of antenna elements; and at least one of the first calibration receive (mRx) section and the second calibration receive (mRx) section is configured to determine one or more characteristics associated with a coupled signal propagating along a portion of the calibration line based on a first calibration signal received from the first signal chain associated with the first antenna element of the plurality of antenna elements and a second calibration signal received from the second signal chain associated with the second antenna element of the plurality of antenna elements.

In accordance with another embodiment of the present disclosure an antenna calibration system for a transmit (Tx) phased array antenna is provided. The antenna calibration system includes: a first calibration receive (mRx) section and a second calibration receive (mRx) section for receiving transmitted RF signals and comparing received signals for the purpose of calibration; a calibration line RF couplable to the first calibration receive (mRx) section and the second calibration receive (mRx) section comprising a plurality of coupling sections, wherein each coupling section of the plurality of coupling sections is separated from one or more adjacent coupling sections of the plurality of coupling sections by a calibration line section length; and a plurality of antenna elements, wherein each antenna element of the plurality of antenna elements is configured to RF couple to a corresponding coupling section of the calibration line. The calibration line section length is configured for one or more of avoiding a band stop behavior over an operating frequency range of the first and second calibration receive (mRx) sections and maintaining a signal to interference and noise ratio (SINR) below a threshold SINR value during calibration measurements.

In accordance with another embodiment of the present disclosure, a method of calibrating a phased array antenna is provided. The method includes: obtaining a first set of calibration measurements from a first grouping of antenna elements of a phased array antenna by a first calibration line; obtaining a second set of calibration measurements from a second grouping of antenna elements of the phased array antenna by a second calibration line. The second grouping of antenna elements includes at least one antenna element in common with the first grouping of antenna elements and at least one different antenna element from the first grouping of antenna elements; calibrating a signal chain of a first antenna element of the first grouping of antenna elements relative to a signal chain of a second antenna element of the first grouping of antenna elements. The method includes: calibrating a signal chain of a first antenna element of the second grouping of antenna elements relative to a signal chain of a second antenna element of the second grouping of antenna elements; and calibrating the signal chain of the first antenna element of the first grouping of antenna elements relative to the signal chain of the first antenna element of the second grouping of antenna elements based on the at least one antenna element common to both the first grouping of antenna elements and the second grouping of antenna elements.

In accordance with another embodiment of the present disclosure, a method of calibrating a phased array antenna is provided. The method includes: obtaining a first set of calibration measurements from a first row of antenna elements of a two-dimensional phased array antenna by a first plurality of split sections of a calibration line; obtaining a second set of calibration measurements from a second row of antenna elements of the two-dimensional phased array antenna by a second plurality of split sections of the calibration line; calibrating a signal chain of a first antenna element of the first row of antenna elements relative to a signal chain of a second antenna element of the first row of antenna elements; calibrating a signal chain of a first antenna element of the second row of antenna elements relative to a signal chain of a second antenna element of the second row of antenna elements; and calibrating the signal chain of the first antenna element of the first row of antenna elements relative to the signal chain of the first antenna element of the second row of antenna elements. The calibration line includes a plurality of combined sections and a plurality of split sections, and a first branch of a split section of the plurality of split sections couples with the first antenna element of the first row of antenna elements and a second branch of the split section of the plurality of split sections couples with the first antenna element of the second row of antenna elements.

In accordance with another embodiment of the present disclosure, a method of calibrating a phased array antenna is provided. The method includes: obtaining a first set of calibration measurements from a first row of antenna elements of a two-dimensional phased array antenna by a first plurality of split sections of a calibration line; obtaining a second set of calibration measurements from a second row of antenna elements of the two-dimensional phased array antenna by a second plurality of split sections of the calibration line; calibrating a signal chain of a first antenna element of the first row of antenna elements relative to a signal chain of a second antenna element of the first row of antenna elements; calibrating a signal chain of a first antenna element of the second row of antenna elements relative to a signal chain of a second antenna element of the second row of antenna elements; and calibrating the signal chain of the first antenna element of the first row of antenna elements relative to the signal chain of the first antenna element of the second row of antenna elements. The calibration line includes a plurality of combined sections and a plurality of split sections, and a first branch of a split section of the plurality of split sections couples with the first antenna element of the first row of antenna elements and a second branch of the split section of the plurality of split sections couples with the first antenna element of the second row of antenna elements.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is an exemplary illustration showing a simplified block diagram of antenna calibration unit cells in a transmit (Tx) phased array antenna system self-calibration configuration, in accordance with some embodiments of the present disclosure;

FIG. 3B is an exemplary illustration showing a simplified block diagram of antenna calibration unit cells in a receive (Rx) phased array antenna system self-calibration configuration, in accordance with some embodiments of the present disclosure;

FIG. 4D is an exemplary illustration of another calibration configuration and calibration procedure for a receiving phased array antenna, in accordance with some examples;

DETAILED DESCRIPTION

Figure 1:
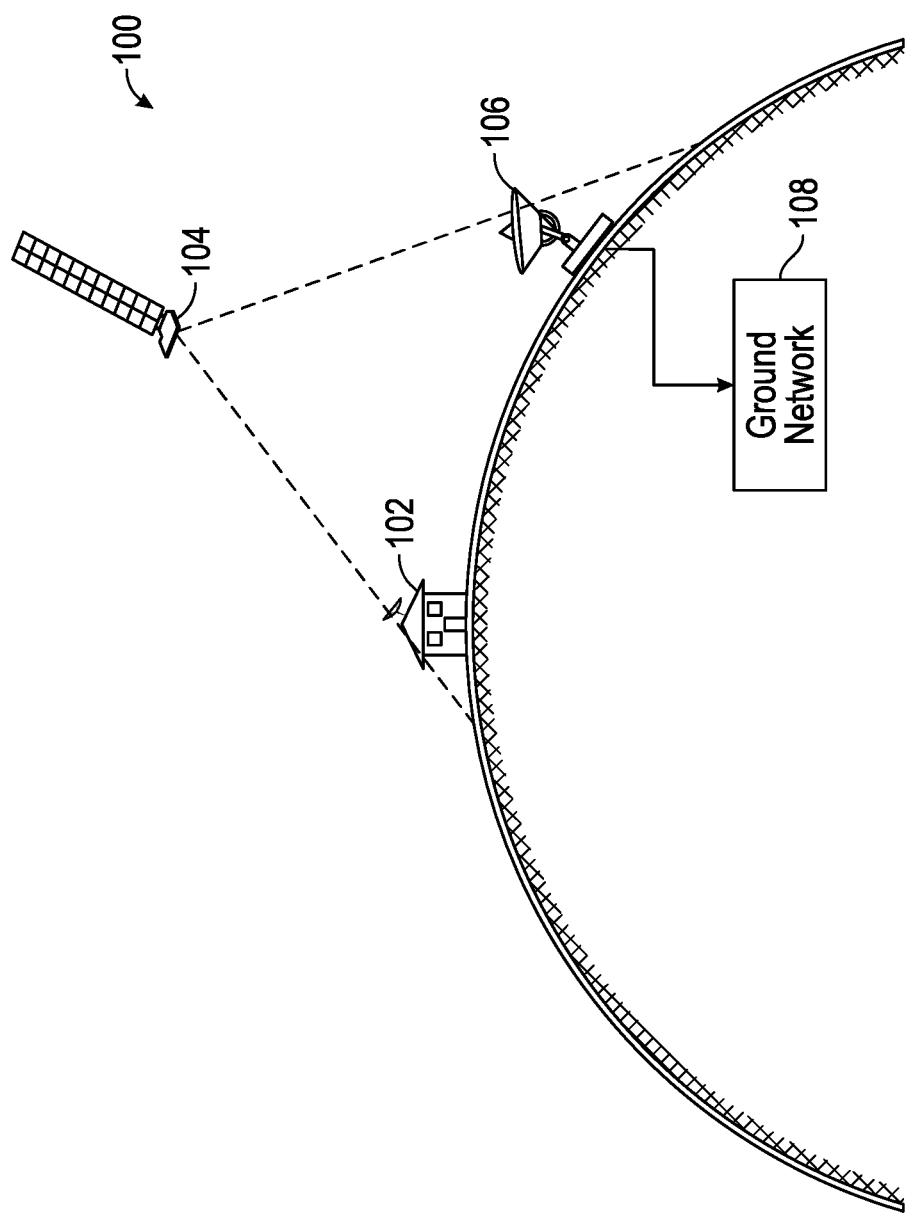
FIG. 1 is a not-to-scale diagram illustrating a simple example of communication in a satellite communication system in accordance with embodiments of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Language such as "top", "bottom", "upper", "lower", "vertical", "horizontal", "lateral", in the present disclosure is meant to provide orientation for the reader with reference to the drawings and is not intended to be the required orientation of the components or to impart orientation limitations into the claims.

The phrase "coupled to" refers to any component that is physically connected to another component either directly or indirectly, and/or any component that is in communication with another component (e.g., connected to the other component over a wired or wireless connection, capacitive or inductive RF coupling scheme, and/or other suitable communication interface) either directly or indirectly.

Embodiments of the present disclosure are directed to antenna apparatuses including antenna systems designed for sending and/or receiving radio frequency signals and calibration architecture for such antenna apparatuses.

The antenna systems of the present disclosure may be employed in communication systems providing high-bandwidth, low-latency network communication via a constellation of satellites. Such constellation of satellites may be in a non-geosynchronous Earth orbit (GEO), such as a low Earth orbit (LEO). FIG. 1 illustrates a not-to-scale embodiment of an antenna and satellite communication system 100 in which embodiments of the present disclosure may be implemented. As shown in FIG. 1, an Earth-based endpoint or user terminal 102 is installed at a location directly or indirectly on the Earth's surface such as house or other a building, tower, a vehicle, or another location where it is desired to obtain communication access via a network of satellites.

A communication path may be established between the endpoint terminal 102 and a satellite 104. In the illustrated embodiment, the first satellite 104, in turn, establishes a communication path with a gateway terminal 106. In another embodiment, the satellite 104 may establish a communication path with another satellite prior to communication with a gateway terminal 106. The gateway terminal 106 may be physically connected via fiber optic, Ethernet, or another physical connection to a ground network 108. The ground network 108 may be any type of network, including the Internet. While one satellite 104 is illustrated, communication may be with and between a constellation of satellites.

Phased Array Antenna System

FIGS. 2A-2E are schematic illustrations of the electronic system of a phased array antenna system 200 in accordance with embodiments of the present disclosure. The phased array antenna system 200 is designed and configured to transmit and/or receive a combined beam composed of signals (also referred to as electromagnetic signals, wavefronts, or the like) in a preferred direction from or to an antenna aperture 212 (see FIG. 2A). Accordingly, the plurality of antenna elements simulates a large directional antenna. An advantage of the phased array antenna is its ability to transmit and/or receive signals in a preferred direction (i.e., the antenna's beamforming ability) without physically repositioning or reorienting the system.

In accordance with one embodiment of the present disclosure, a phased array antenna system 200 may be configured to transmit and/or receive radio frequency (RF) signals. The phased array antenna system 200 includes a phased array antenna including a plurality of antenna elements 213, 214 defining antenna aperture 212, for example, antenna elements 213, 214 distributed in one or more rows and/or columns (see FIG. 2A) and a plurality of phase shifters (not shown) configured for generating phase offsets between the antenna elements 213, 214. As a non-limiting example, a two-dimensional phased array antenna may be capable of electronically steering in two directions.

The plurality antenna elements 213 in the antenna lattice 202 are configured for transmitting signals and/or for receiving signals. The antenna aperture 212 of the phased array antenna system 200 is the area through which the power is radiated or received. A phased array antenna synthesizes a specified electric field (phase and amplitude) across an antenna aperture 212. As described in greater detail below, the antenna lattice 202 defining the antenna aperture 212 may include the plurality of antenna elements 213 arranged in a particular configuration that is supported physically and electronically by a printed circuit board (PCB) (see FIG. 6B).

Figure 2A:
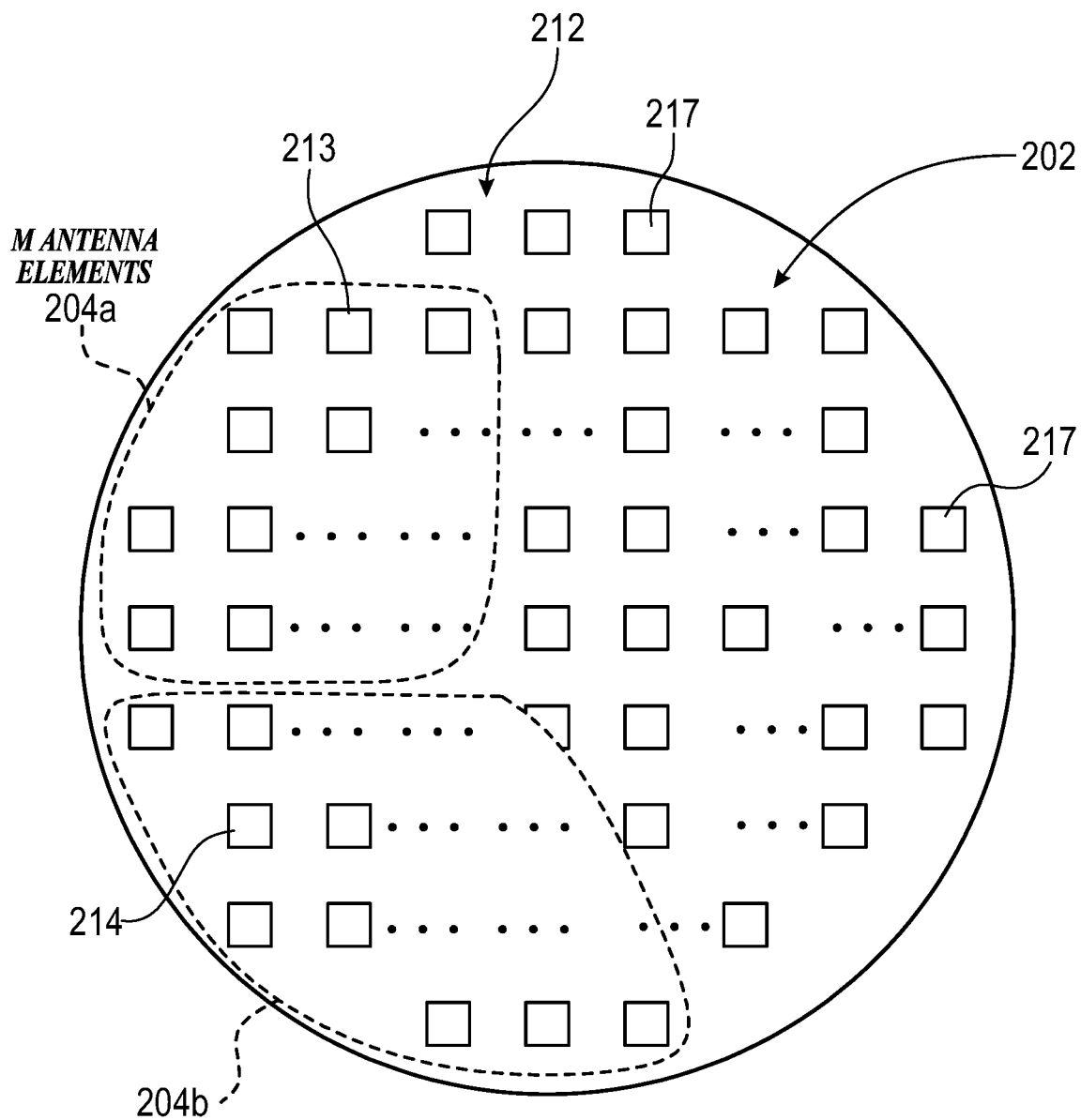
FIG. 2A is an example illustration of a top view of an phased array antenna in accordance with some embodiments of the present disclosure.
Figure 2B:
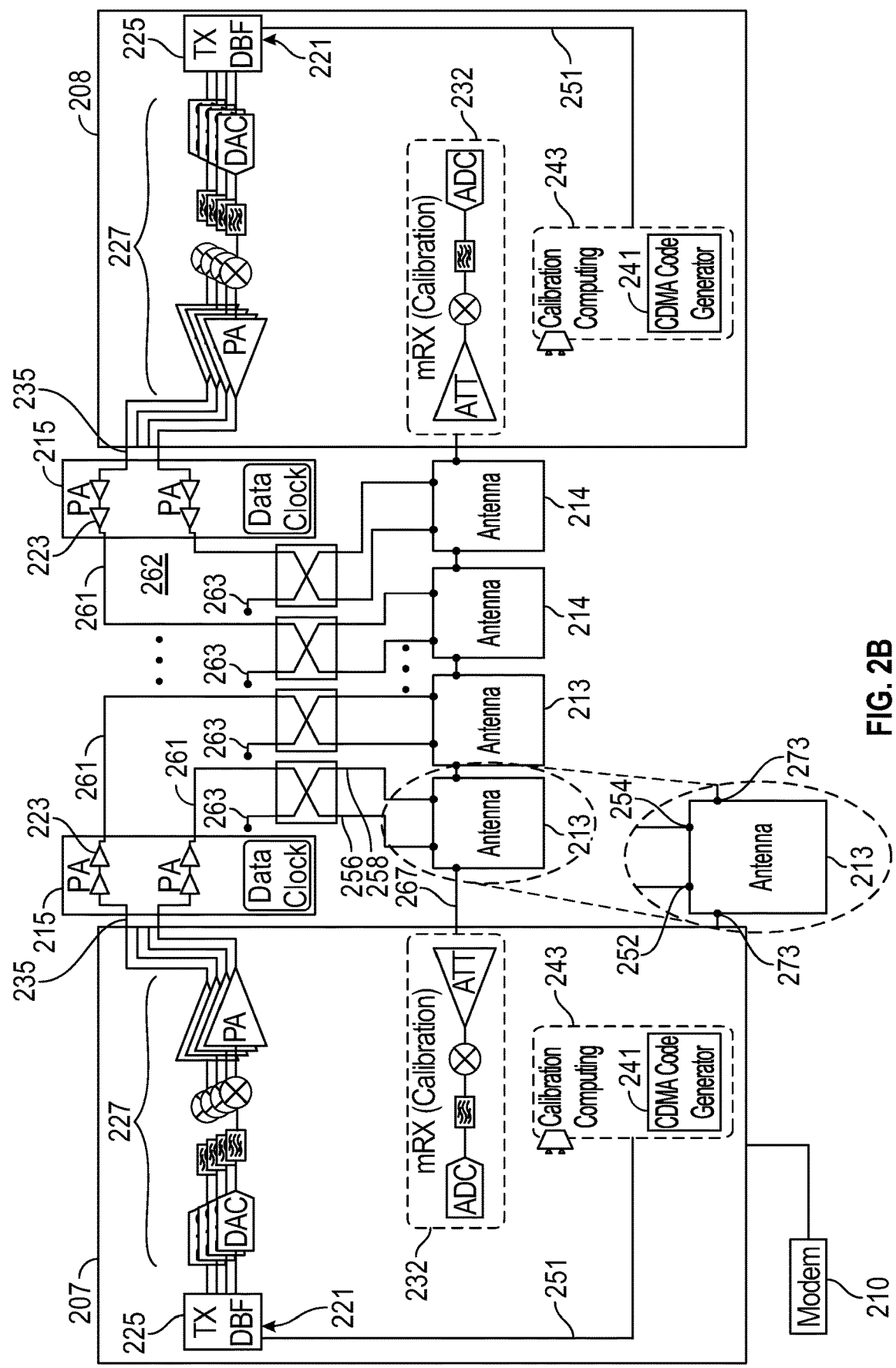
FIG. 2B is an exemplary illustration showing a simplified block diagram of an RF path for a transmitting (Tx) antenna assembly including a dual-linear polarized antenna, 3-dB 90-deg hybrid, Tx front-end-module (FEM) chip, and Tx digital beam former (DBF) chip connected with RF I/O lines, in accordance with some embodiments of the present disclosure.
Figure 2C:
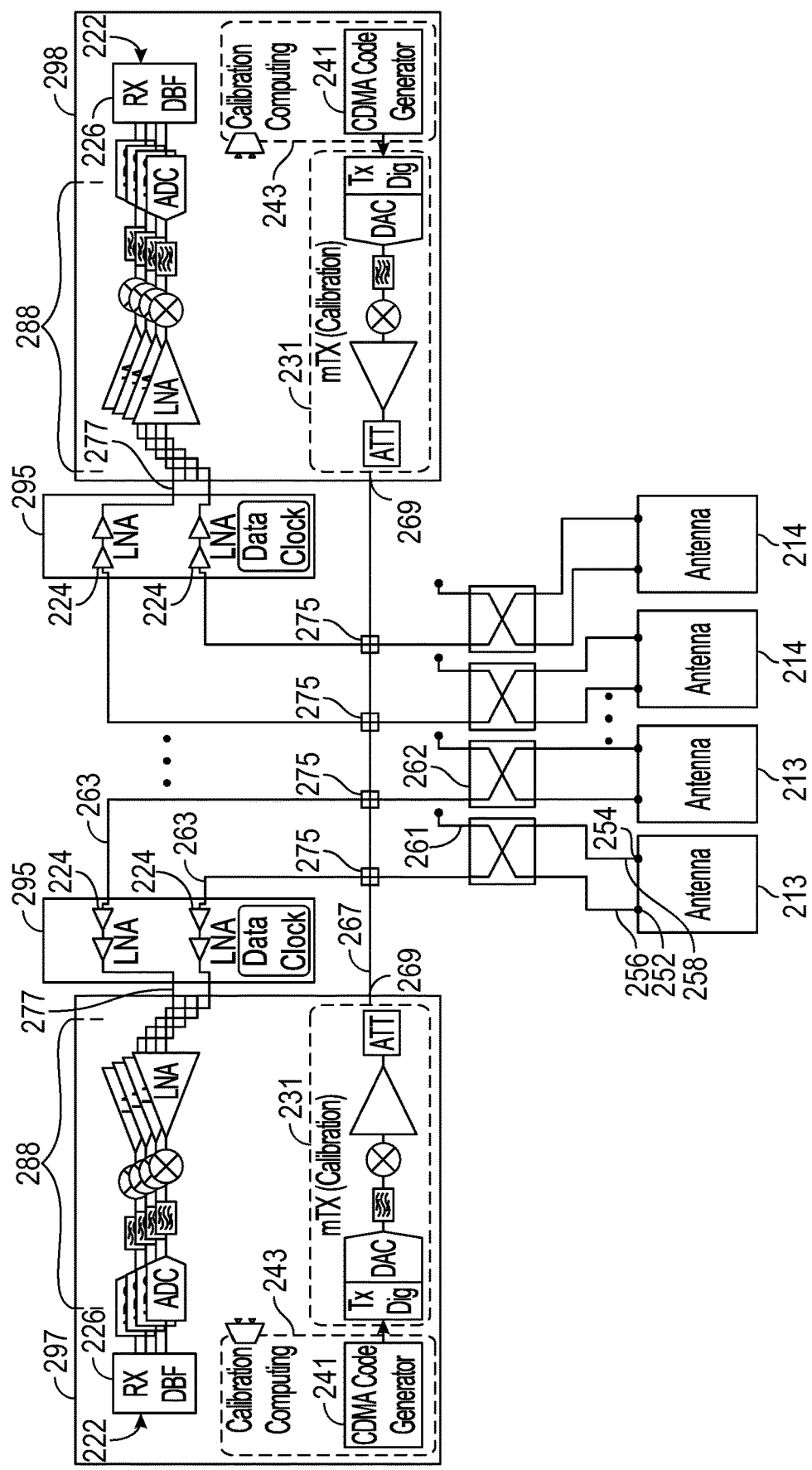
FIG. 2C is an exemplary illustration showing a simplified block diagram of an RF path for a receiving (Rx) antenna assembly including a dual-linear polarized antenna, 3-dB 90-deg hybrid, Rx front-end-module (FEM) chip, and Rx digital beam former (DBF) chip connected with RF I/O lines, in accordance with some embodiments of the present disclosure.
Figure 2D:
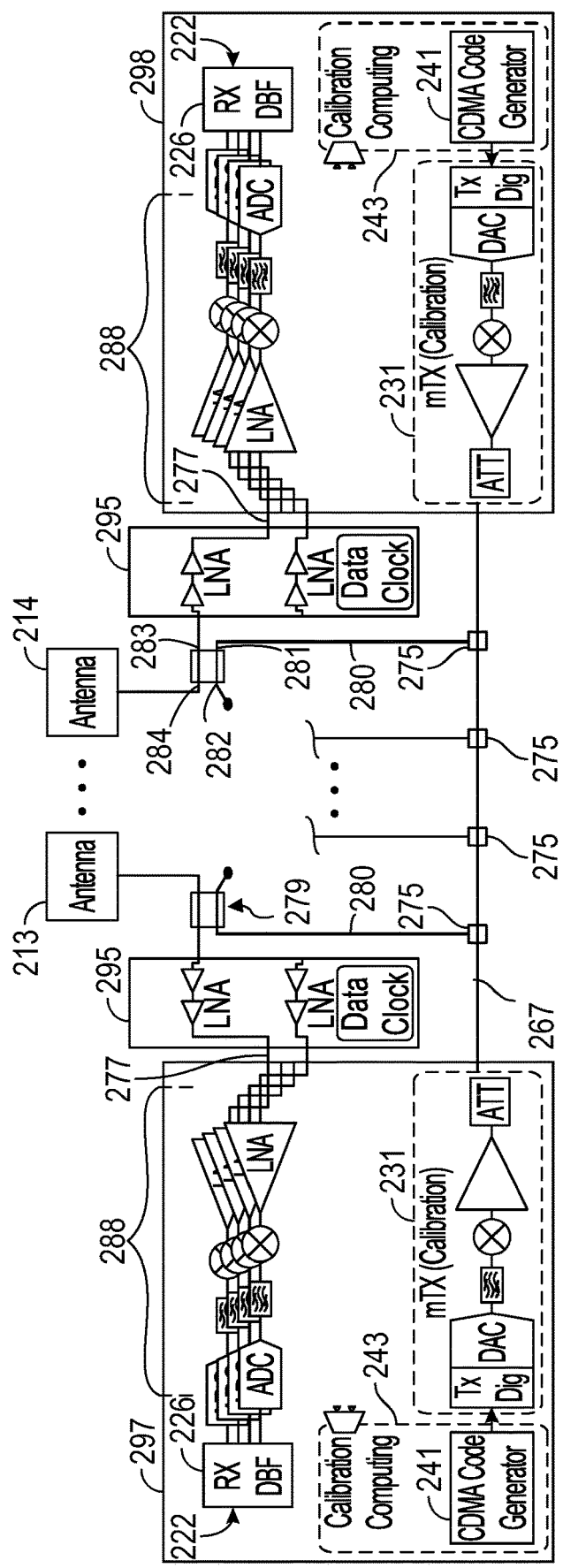
FIG. 2D is a simplified schematic illustrating a two-stage coupling configuration for coupling the calibration line to antenna element signal chains.
Figure 2E:
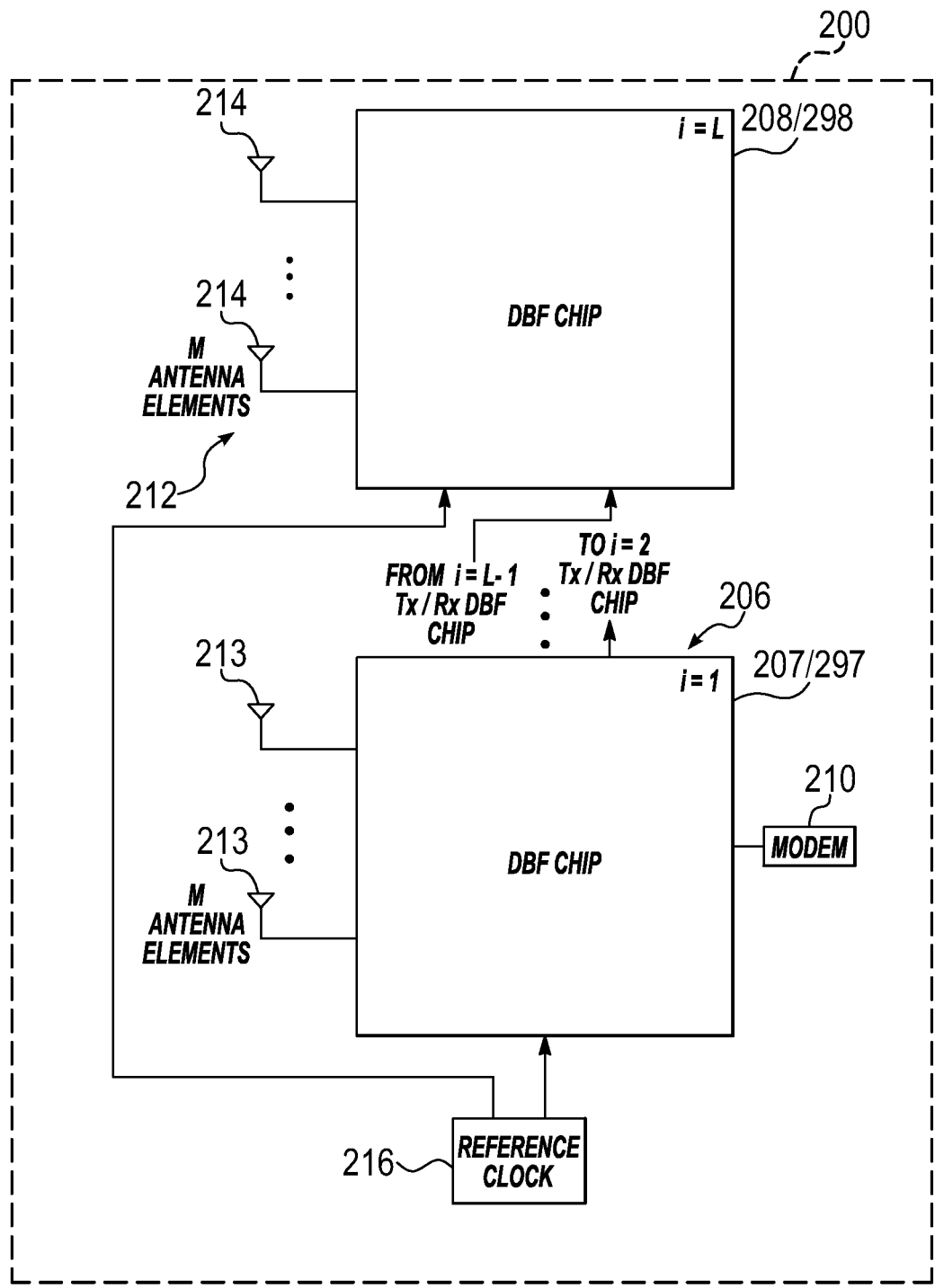
FIG. 2E is an exemplary illustration showing a beamformer lattice associated with a phased array antenna, in accordance with some embodiments of the present disclosure.

Referring to FIG. 2E, the phased array antenna system 200 can be a transmitting (Tx) phased array antenna system as shown in FIG. 2B, a receiving (Rx) phased array antenna system as shown in FIG. 2C, or a transmitting and receiving (Tx/Rx) phased array antenna system (not shown). The illustrated phased array antenna system 200 includes an antenna lattice 202 including a plurality of antenna elements 213, 214 and a digital beamformer lattice 206 including one or more digital beamformer (DBF) chips 207/297, 208/297 (which may be referred to herein as digital beamformers, DBFs, or DBF chips herein) for receiving signals from a modem 210 in the transmit (Tx) direction and/or sending signals to the modem 210 in the receive (Rx) direction. The antenna lattice 202 is configured to transmit and/or receive a combined beam of radio frequency signals having a radiation pattern from or to the antenna aperture 212 (see FIG. 2C). In the illustrated embodiment of FIGS. 2B and 2C, the antenna lattice 202 includes a plurality of antenna elements 213 in a first set or grouping, and a plurality of antenna elements 214 in a second set or grouping.

The configurations shown in FIGS. 2A-2E are provided for the purposes of illustration and provides only one example configuration that can incorporate the in-line calibration techniques described herein. Other configurations can be used without departing from the scope of the present disclosure. For example, a phased array antenna system that utilizes analog beamformers, Referring to FIGS. 2B and 2C, a corresponding plurality of front end module (FEM) chips 215/295 (which may be referred to as front ends (Fes), front end modules (FEMs) or FEM chips herein) are coupled to the plurality of antenna elements 213, 214. The FEM chips may include low noise amplifiers (LNAs) 224 in the receiving direction Rx and/or power amplifiers (PAs) 223 in the transmitting direction Tx. Although shown in the illustrated embodiment of FIG. 2B as a separate chip from the DBF chips 207, 208 and in the embodiment of FIG. 2C as separate DBF chips 297, 298, it should be appreciated that some or all of the components in the FEM chips 215, 295 may be incorporated into an associated DBF chip 207, 208, 297 and/or 298.

The DBF lattice 206 includes a plurality of digital beamformers (DBFs) 207/297, 208/298 (see FIG. 2E) including a plurality of phase shifters (not shown). In the receiving direction (Rx), the beamformer function is to delay the signals arriving from each antenna element such that the signals all arrive to the combining network at the same time. In the transmitting direction (Tx), the beamformer function is to delay the signal sent to each antenna element such that all signals arrive at the target location at the same time. This delay can be accomplished by using "true time delay" or a phase shift at a specific frequency.

In the illustrated embodiment of FIG. 2B each DBF 207, 208 is configured for transmitting (Tx) and in the illustrated embodiment of FIG. 2C, each DBF 297, 298 is configured for receiving (Rx). However, in other embodiments, one or more DBFs of the DBF lattice 206 may be capable of processing both transmit and receive signals. In some embodiments, one or more DBFs of the DBF lattice 206 may be configured to operate in half duplex mode, in which it is capable of receiving or transmitting RF signals/waveforms but not both simultaneously.

Referring to FIG. 2E, a simplified schematic illustration is used for both the Tx phased array antenna of FIG. 2B and the Rx phased array antenna of FIG. 2C. As illustrated, the plurality of DBF chips 207/297, 208/298 in the DBF lattice 206 may include an L number of DBF chips. For example, DBF chip 207/297 comprises the first DBF chip (i=1, where i=1 to L), and so forth, to DBF 208/298 comprising the Lth DBF chip (i=L) of the one or more DBFs of the DBF lattice 206. Each DBF chip of the DBF lattice 206 electrically couples with a group of respective M number of antenna elements of the plurality of antenna elements. In the illustrated example, DBF 207/297 electrically couples with M antenna elements 213 and DBF 208/298 electrically couples with M antenna elements 214. In the illustrated embodiment, the DBF lattice 206 are electrically coupled to each other in a daisy chain arrangement. However, other coupling arrangements are within the scope of the present disclosure.

In some embodiments, each DBF chip of the DBF lattice 206 comprises an IC chip or IC chip package including a plurality of pins, in which at least a first subset of the plurality of pins is configured to communicate signals with its electrically coupled DBF chip(s) (if in a daisy chain configuration) and/or modem 210 in the case of DBF 207/297, a second subset of the plurality of pins is configured to transmit/receive signals with M antenna elements, and a third subset of the plurality of pins is configured to receive a signal from a reference clock 216 and/or a local oscillator (not shown). The DBF lattice 206 may also be referred to as Tx DBF chips, Tx chips, transmitters, DBF transmitters (see 207, 208 of FIG. 2B), Rx DBF chips, Rx chips, receivers, DBF receivers, (see 297, 298 of FIG. 2C) and/or transmit/receive (Tx/Rx) DBF chips, Tx/Rx chips, transceivers, DBF transceivers, (not shown) and/or the like. As described above, the DBF chips may be configured for Rx communication, Tx communication, or both.

Referring to FIG. 2A, the antenna aperture 212 of FIG. 2A may be grouped into subsets 204a and 204b of antenna elements. Each subset 204a, 204b of the plurality of antenna elements can comprise the M antenna elements 213, 214, which may be associated with specific DBF chips 207/297, 208/298, respectively. The remaining antenna elements 217 of the plurality of antenna elements may be similarly associated with other DBF chips (not shown) in the DBF lattice 206.

FIG. 2B is an example illustration showing circuitry or electrical components included in and/or associated with two DBF chips 207, 208 in a transmitting (Tx) phased array antenna configuration in accordance with some embodiments of the present disclosure. In some embodiments, the contents of each of the DBF chips in DBF lattice 206 shown in FIG. 2E are similar to that discussed herein for DBF chips 207, 208.

Referring to FIG. 2B, in some embodiments, DBF chips 207, 208 include, among other components, a transmit (Tx) section 221, and a calibration receive section (mRx) 232. DBFs 207, 208 are configured to generate RF signals (based on data provided by modem 210) to be transmitted by antenna elements 213, 214, calibrate the transmit section 221 (also referred to as a transmitter or transmitter section) using the calibration receive section (mRx) 232 and the calibration line 267. Although the calibration receive (mRx) sections 232 are illustrated as being included in the DBFs 207, 208 in FIG. 2B, the calibration receive (mRx) sections 232 can be separate from the DBFs 207, 208 without departing from the scope of the present disclosure.

The calibration receive (mRx) sections 232 of DBFs 207, 208 are RF coupled to a calibration line 267. Calibration line 267 is configured to RF couple (e.g., by a −20 dB or weaker RF coupling) to a portion of the signal chains associated with each of the antenna elements 213, 214. In some implementations, a −20 dB or weaker RF coupling can be used to minimize impact on the efficiency of the phased array antenna during normal operation. As illustrated in FIG. 2B, the calibration line 267 can RF couple to components of the antenna elements 213, 214 by passing through and/or in close proximity to the physical structure of the components of an antenna element 213, 214. Each of the antenna elements 213, 214 is shown with two calibration line ports 273 (see enlarged view of antenna element 213) with calibration line 267 forming a continuous connection between DBF 207 and DBF 208. Referring to FIG. 2B, the calibration line 267 is shown passing through calibration line ports 273 of the antenna elements 213, 214 to indicate that the coupling occurs with a portion of the structure of the antenna elements. For example, as will be discussed in more detail below with respect to FIGS. 3A-3C and 7A-7C, the calibration line 267 can couple with a cavity and/or a slot feed of the antenna elements 213, 214. In addition, any other technique for coupling the calibration line 267 with the signal chain of antenna elements can be used without departing from the scope of the present disclosure. For example, the calibration techniques described herein can be used with a phased array antenna with antenna elements 213, 214 that do not include a cavity, as long as the calibration line 267 can be coupled to a portion of the signal chain of the antenna elements 213, 214 in a consistent manner for all of the antenna elements 213, 214.

In some embodiments, the transmit (Tx) section 221 includes a transmit digital beamformer (Tx DBF) 225 and a plurality of Tx RF sections 227. Transmit (Tx) RF sections 227 are configured to ready time delay and phase encoded digital signals for transmission. The plurality of the transmit RF sections 227 may include M number of Tx RF sections 227, one for each of the M paths for each antenna element 213, 214. Each Tx RF section 227 may include other components such as a transmit digital front end (Tx DFE), a digital-to-analog converter (DAC), a low pass filter (LPF), a mixer, and a power amplifier (PA).

The amplified RF signal outputted by the PA 223 in the FEM chip 215 is the input to an antenna element 213, 214. In turn, the antenna element 213, 214 radiates the amplified RF signal. Each of the M antenna elements 213, 214 per DBF is configured to radiate an amplified RF signal generated by a respective Tx RF section 227.

In the example of FIG. 2B, transmit (Tx) section 221 of one or both of the DBFs 207, 208 can be configured to transmit a radio frequency (RF) signal to the antenna elements 213, 214. In some cases, a portion of the RF signal transmitted to the antenna elements 213, 214 can couple with coupling sections (see bidirectional couplers 399 in FIGS. 3A through 3C) of the calibration line 267, traverse the calibration line 267 and subsequently be received at the calibration receive (mRx) section 232 of one or both of the DBFs 207, 208. In some cases, the coupling sections can be bidirectional. In some implementations, the couplers can be asymmetric (also referred to herein as a directional coupler). In one example configuration, one calibration receive (mRx) section 232 of the DBFs 207, 208 can be configured to receive and measure the portion of the RF signal coupled to calibration line 267 to obtain a first set of measurements while the other calibration receive (mRx) section 232 of the DBFs 207, 208 can be terminated and/or idle. In some embodiments, the calibration receive (mRx) sections 232 of the DBFs 207, 208 can swap roles so that the calibration receive (mRx) section 232 that was initially terminated/idle can be configured to receive and measure the coupled RF signal from the calibration line 267 to obtain second measurements while the calibration receive (mRx) section 232 that was initially configured to receive and measure the RF signal is terminated. As will be described in more detail below with respect to FIGS. 4A-4E, the coupled RF signals from the calibration line 267 can be used to calibrate the antenna elements 213, 214 without a need for external reference (e.g., a known far-filed source or a flying probe etc.). Such calibration without the need for external reference can be performed in the factory, during operation of the phased array in the field, or any combination thereof.

Accordingly, DBF chips 207, 208 are configured to digitally process a first data signal, stream, or beam of a single channel for transmission by a first plurality of antenna elements.

FIG. 2C is an example illustration showing circuitry or electrical components included in and/or associated with two DBF chips 297, 298 in a receiving (Rx) phased array antenna configuration in accordance with some embodiments of the present disclosure. In some embodiments, the contents of each of the DBF chips of the DBF lattice 206 are similar to that discussed herein for DBF chips 297, 298.

Referring to FIG. 2C, in some embodiments, DBF chips 297, 298 include, among other components, a receive (Rx) section 222, and a calibration section including a calibration transmit (mTx) section 231. DBFs 297, 298 are configured to decode RF signals received by antenna elements 213, 214 to calibrate the receive section 222 (also referred to as a receiver or receiver section) using the calibration transmit (mTx) section 231 and the calibration line 267. Although the calibration transmit (mTx) sections 231 are illustrated as being included in the DBFs 297, 298 of FIG. 2C, the calibration transmit (mTx) sections 231 can be separate from the DBFs 297, 298 without departing from the scope of the present disclosure.

In some embodiments, the receive (Rx) section 222 of each DBF 297, 298 includes a plurality of Rx RF sections 288 and a single receive digital beamformer (Rx DBF) 226. Each Rx RF section 288 includes components such as a low noise amplifier (LNA), a mixer, a low pass filter (LPF), an analog-to-digital converter (ADC), and a receive digital front end (Rx DFE). In the FEM chip 215, LNA 224 is configured to perform low noise amplification of the analog RF signal received at the respective antenna element 213.

The calibration transmit (mTx) sections 231 of DBFs 297, 298 are RF coupled to calibration line 267. Calibration line 267 is configured to RF couple (e.g., by a −20 dB or weaker RF coupling) to a portion of the signal chains associated with each of the antenna elements 213, 214. In some cases, the −20 dB or weaker coupling can minimize impact on efficiency of the antenna elements 213, 214. As illustrated in FIG. 2C, the calibration line 267 can couple to a component and/or trace in the signal chain of an antenna element 213, 214. For example, as illustrated in FIG. 2C, the calibration line 267 crosses over the feed lines 263, and couplers 275 indicate that calibration line 267 may couple with feed lines 263 connecting antenna elements 213 to LNA 223 and connecting antenna elements 214 to LNA 224. In addition, any other technique for coupling the calibration line 267 with the signal chain anywhere between the LNA and antenna elements can be used without departing from the scope of the present disclosure.

In some cases, the CDMA code generator 241 can generate a CDMA code for an RF calibration signal transmitted by the section 231. The calibration line 267 can inject a small portion of this calibration signal (e.g., a CDMA encoded signal) by a coupler (e.g., bidirectional coupler 399 of FIGS. 3A and 3B) coupled to respective signal chains of the antenna elements 213, 214. Coupling can occur at different parts of the signal chain, such as an antenna cavity, slot feeds, feed lines, or 90-degree hybrid combiner/splitters (as described in more detail below with respect to FIGS. 3A-3C and 7A-7C). The coupled signal can pass through the signal chain and eventually reach LNA 224. In some embodiments, the couplers can be bidirectional. In some embodiments, the couplers can be directional couplers. Example couplers in accordance with embodiments of the present disclosure are described in greater detail below with reference to FIGS. 3A-3C. In one example configuration, one calibration transmit (mTx) section 231 can be configured to transmit an RF signal to the calibration line 267 while the other calibration transmit (mTx) section 231 of the DBFs 297, 298 can be terminated and/or idle. In some examples, the calibration transmit (mTx) sections 231 of the DBFs 297, 298 can swap roles so that the calibration transmit (mTx) section 231 that was initially terminated/idle can be configured to transmit the RF signal to the calibration line 267.

Accordingly, DBF chips 297, 298 are configured to receive a data signal, stream, or beam of a single channel using a plurality of antenna elements and to digitally recover/reconstitute the original data signal underlying the received signal.

Each antenna element of the phased array antenna and its associated transmit or receive circuitry undergoes a similar calibration procedure periodically during operation. Such measurements and calibration based on the measurements can be performed simultaneously with or independent of normal operation of the phased array antenna (e.g., during transmission and receiving of regular or normal signals in the phased array antenna). In some embodiments, the calibration process incorporates a calibration code generator 241 electrically coupled to the transmit section 221 and the calibration receive (mRx) section 232 (see FIG. 2B) and/or the receive section 222 and the calibration transmit (mTx) section 231 (see FIG. 2C) for correlation and calibration. For example, a calibration code generator 241 can be used in a calibration configuration that performs calibration with code division multiple access (CDMA) encoded signals.

Referring to FIG. 2E, in accordance with one embodiment of the present disclosure, a phased array antenna system 200 includes a DBF lattice 206 including a plurality of DBF chips 207/297, 208/298, a front end module (FEM) lattice including a plurality of FEM chips 215, and an antenna lattice 202 including a plurality of antenna elements 213, 214 and 90-degree hybrid combiner/splitter 262 disposed between each antenna element 213, 214 and each FEM chip 215.

FIG. 2B shows a schematic block diagram of exemplary DBFs 207, 208 used in controlling the phase and amplitude of the RF signals going into the antenna elements 213, 214 (hence creating the "beam"). The DBFs 207, 208 have functional RF Tx sections 221 (including various components such as Tx DBF sections 227, PAs, mixers, filters and DAC, see components of Tx RF section 227), dedicated RF paths for calibration and measurement (mRx) 232, and a calibration computing section 243 including a calibration code generator 241 (also referred to as a CDMA code generator herein). In the illustrated embodiment, coded calibration signals from the CDMA code generator 241 are shown to be distributable by the RF input/output (RFIO) lines 235 (see line 251 to Tx DBF section 225) as explained in greater detail below with reference to FIG. 5A.

Signal paths between the functional RF input/outputs of the DBFs 207, 208 connected to RFIO lines 235 and the calibration receive ports (mRx) 268 connected to the calibration line 267 are shown in FIG. 2B. In one non-limiting example, the DBF 207 may include 16 functional RF input/outputs (RFIO), such that each DBF 207, 208 is coupled to and can control 16 antenna elements 213, 214. Pinouts from the DBFs 207, 208 for a common local oscillator, clock, analog/digital power, high-speed communication, and digital control are not shown in FIG. 2B.

Referring to FIG. 2B, the front-end modules (FEMs) 215 are chips or circuitry disposed between the DBFs 207, 208 and the plurality of antenna elements 213, 214. FIG. 2B shows a front-end module (FEM) 215 and DBFs 207, 208 connected to each other via their RFIO lines 235. As described in FIG. 6B below, in one embodiment of the present disclosure, the connecting RFIO lines 235 are connecting traces routed inside a PCB assembly 342. As a non-limiting example, there are two PAs 223 in each the FEM chip 215 for coupling with two antenna elements 213, 214 (the PAs 223 shown as 2-stage amplifiers with digitally controlled first and second stages).

In some embodiments (not shown), each antenna element 213, 214 can be a dual (linearly) polarized antenna, having two separate ports (e.g., one per linear polarization). Using a 3 dB, 90-deg hybrid combiner/splitter 262, a circularly polarized antenna element is created. In such an embodiment, two isolated ports of the 90-deg hybrid 362 are connected to the antenna ports via feed lines, such as feed lines 256, 258 in FIGS. 2B and 2C. One of the remaining two isolated ports of the 90-deg hybrid 362 are connected to the TX ports of the FEM via traces 261. The final isolated port can be coupled to a termination via traces 263.

As a non-limiting example, the 16 RFIO of the DBF 207 can control 8 FEM chips 215 (with 2 PA pairs in each) and 16 dual-port antenna elements 213 together which can be called a DBF "block". Similarly, DBF 208 can control 8 FEM chips 215 and 16 dual-port antenna elements 214 in a DBF block. Those numbers can change, depending on the FEM and DBF chip size (and the number of RFIO lines).

Returning to FIG. 2B, the calibration receive (mRx) sections 232 in the DBFs 207, 208 are coupled to calibration line 267. The calibration line 267 is coupled to the signal chain of each antenna element 213, 214 by couplers (see bidirectional coupler 399 of FIGS. 3A-3B, bidirectional coupler 499 of FIGS. 4A-4B, coupler 489 of FIG. 4D, couplers 1089 of FIG. 10).

Referring to FIG. 2C, in accordance with one embodiment of the present disclosure, a phased array antenna system 200 includes a DBF lattice 206 including a plurality of DBF chips 297, 298, a front end module (FEM) lattice including a plurality of FEM chips 295, and an antenna lattice 202 (see FIG. 2A) including a plurality of antenna elements 213, 214 and 90-degree hybrid combiner/splitters 262 disposed between each antenna element 213, 214 and each FEM chip 295.

FIG. 2C shows a schematic block diagram of exemplary DBFs 297, 298 used in controlling the phase and amplitude of the RF signals coming from the antenna elements 213, 214 (hence creating the "beam"). The DBFs 297, 298 have functional RF Rx sections 222 (including various components such as Rx DBF 226, LNAs, mixers, filters and ADC, see components of Rx RF sections 288), dedicated RF paths for calibration and measurement (mTx) 231, and a calibration computing section 243 including a calibration code generator 241.

Signal paths between the functional RF input/outputs (RFIO) for the DBFs 297, 298 coupled to RFIO lines 277 and the calibration transmit (mTx) ports 269 of the calibration transmit (mTx) section 231 are shown in FIG. 2C. In one non-limiting example, the DBFs 297, 298 may include 16 functional RFIOs, such that each DBF 297, 298 is coupled to 16 antenna elements 213, 214.

Referring to FIG. 2C, the front-end modules (FEMs) 295 are chips or circuitry disposed between the DBFs 297, 298 and the plurality of antenna elements 213, 214. FIG. 2C shows front-end modules (FEM) 295 and DBFs 297, 298 connected to each other via the RFIO lines 277. As described in FIG. 6B below, in one embodiment of the present disclosure, the connecting RFIO lines 277 are connecting traces routed inside a PCB assembly 342. As a non-limiting example, there are two LNAs 224 in each the FEM chip 295 for coupling with two antenna elements 213, 214 (the LNAs 224 shown as 2-stage amplifiers with digitally controlled first and second stages). The FEM chip 295 has a pin for its LNA output to RFIO line 277.

In the illustrated embodiment of FIG. 2C, each antenna element 213, 214 may have dual output ports 252, 254 coupled to a 3 dB, 90-deg hybrid combiner/splitter 262. Using the 3 dB, 90-deg hybrid combiner/splitter 262, the signals from the two ports 252, 254 of the antenna elements can be combined and coupled to the RX pins of the FEMs 295 by traces 263 (also referred to herein as feed lines). In the illustrated example, the remaining port of the 3 dB, 90-deg hybrid combiner/splitter 262 is terminated with a load via traces 261. In some implementations, the remaining port of the 3 dB, 90-deg hybrid combiner/splitter 262 can be terminated with a load. In some cases, the termination for the remaining port of the 3 dB, 90-deg hybrid combiner/splitter 262 may not be a matched termination. For example, in a Tx/Rx phased array antenna, the termination may represent inactive circuitry including, without limitation, a power amplifier when the Tx/Rx phased array antenna is operating in a receive mode.

In some embodiments (not shown), each antenna element 213, 214 can be a dual (linearly) polarized antenna (not shown), having two separate ports (one per polarization). Using a 3 dB, 90-deg hybrid combiner/splitter 262, a circularly polarized antenna element can be created.

In such an embodiment, two isolated ports of the 90-deg hybrid are connected to the antenna ports via feed lines, such as feed lines 256, 258 in FIG. 2C. One of the remaining two isolated ports can be connected to the RX ports of FEMs 295 of FIG. 2C via traces 263. The final isolated port can be coupled to a termination via traces 261.

As a non-limiting example, the 16 RFIO of the DBF 297 can control 8 FEM chips 295 (with 2 LNA pairs in each) and 16 dual-port antenna elements 213 together which can be called a DBF "block". Similarly, DBF 298 can control 8 FEM chips 295 and 16 dual-port antenna elements 214 in a DBF block. Those numbers can change, depending on the FEM and DBF chip size (and the number of RF input lines).

FIG. 2E shows the block diagram of a plurality of DBF blocks 207/298 and 208/298 and a modem 210 connected to each other via a serial high-speed communication link and the central reference (clock 216 and local oscillator) being distributed by a fan-out (H-network) to each DBF chip. Before going into the H-network, the local oscillator and clock signals are created separately and combined with a diplexer on the PCB assembly (not shown). FIG. 2E provides an illustrative example configuration that can be used with the calibration techniques described herein. Other configurations can be used without departing from the scope of the present disclosure. For example, without limitation, a phased array antenna system that includes analog beamformers and/or a combination of digital and analog beamformers (e.g., a hybrid configuration), can be used with the calibration techniques described herein without departing from the scope of the present disclosure.

In some embodiments, a phased array antenna system can include both Tx and RX functionality. For example, a Tx/Rx DBF can include Tx Portion 227 of FIG. 2B and Rx RF section 288 of FIG. 2C. In some embodiments, a Tx/Rx DBF can operate in a half-duplex mode with the Rx and Tx array sharing the same antenna aperture 212. The FEMs (e.g., FEMs 215 of FIG. 2B or FEMs 295) can include both PAs and LNAs and be electrically coupled to RF input/outputs (RFIOs) of the DBF FIG. 2C by RFIO lines 235, 277. In some embodiments, during operation, the system might be periodically in Rx mode, Tx mode, or idle mode. To maintain coherent operation of each of the RF paths (from antenna to DBF), the system may perform Rx and Tx calibration, which can be performed during any of those modes. In Rx mode, the Rx paths in the FEMs and the DBFs will be activated. Likewise, in Tx mode, the Tx paths in the FEMs and the DBFs will be activated. During the Rx and Tx calibration processes, some of the Rx and Tx paths might be active simultaneously. As a non-limiting example, in a given DBF some of the RFIOs can be in Rx mode when one of them is in Tx mode or when the mTx is also active (which would indicate that the device is trying to calibrate its functional Rx array).

In some embodiments, each antenna element 213, 214 can be a dual (linearly) polarized antenna, having two separate ports (one per polarization). Using a 3 dB, 90-deg hybrid combiner/splitter 262, a dual circularly polarized antenna element is created. In such an embodiment, two isolated ports of the 90-deg hybrid are connected to the antenna ports via feed lines, such as feed lines 256, 258 in FIGS. 2B and 2C. The remaining two isolated ports may be connected to Rx and Tx pins of an Rx/Tx FEM (not shown) via traces 261 and 263.

The goal in the system design is to make mutual coupling measurements between functional (Tx or Rx) antennas and the calibration lines such that there is enough redundancy in those measurements to eliminate the requirement for an external reference (flying probe, far-field source etc.). In some implementations, calibration measurements from a calibration operation can be stored for later use. In some cases, the stored calibration measurements can be used to avoid redundant capture of measurements during operation of the phased array antenna. In some cases, reducing the number of measurements performed during calibration can speed up the calibration process. In one illustrative example, measurements from an initial self-calibration can be stored and reused during subsequent calibrations. In some cases, calibration measurements can be performed from scratch (e.g., without considering previous calibration measurements) during each calibration operation. For example, a phased array antenna system may perform calibration periodically during operation to keep the phased array elements aligned/calibrated.

FIG. 2D is a simplified schematic illustrating a two-stage coupling configuration for coupling the calibration line to antenna element signal chains. The configuration shown in FIG. 2D a signal chain for a receive (Rx) phased array antenna similar to the configuration shown in FIG. 2C. In the illustrated example of FIG. 4D, antenna elements 213, 214 are single port antenna elements coupled to the LNAs included in FEM chips 295 by a directional coupler 279. As shown in FIG. 2D, bidirectional couplers 275 can couple to the calibration line 267 similar to the configuration shown in 2C. However, as shown in FIG. 2D, the bidirectional coupler does not directly connect to the feedlines of the antenna elements (e.g., feed lines 263 of FIG. 2C). Instead, the bidirectional couplers 275 can couple to calibration feed lines 280, which in turn couple to an input port 281 of a respective directional coupler 279. In the configuration shown in FIG. 2D, the through port 282 of the directional coupler 279 can be terminated. The antenna elements 213, 214 can be connected to the isolated port 284 of the directional coupler 279. The coupled signal from the calibration line 267 coupled by the bidirectional couplers 275 to the calibration feed lines 280 can be coupled to the LNAs by the return port 283 of the directional coupler 279 as illustrated in FIG. 2D. In some cases, including the directional couplers 279 in the signal chain of the calibration configuration can isolate the antenna elements 213, 214 from the RF signals used during calibration.

Main Lobe and Side Lobes Emanating from a Phased Array Antenna

Figure 2F:
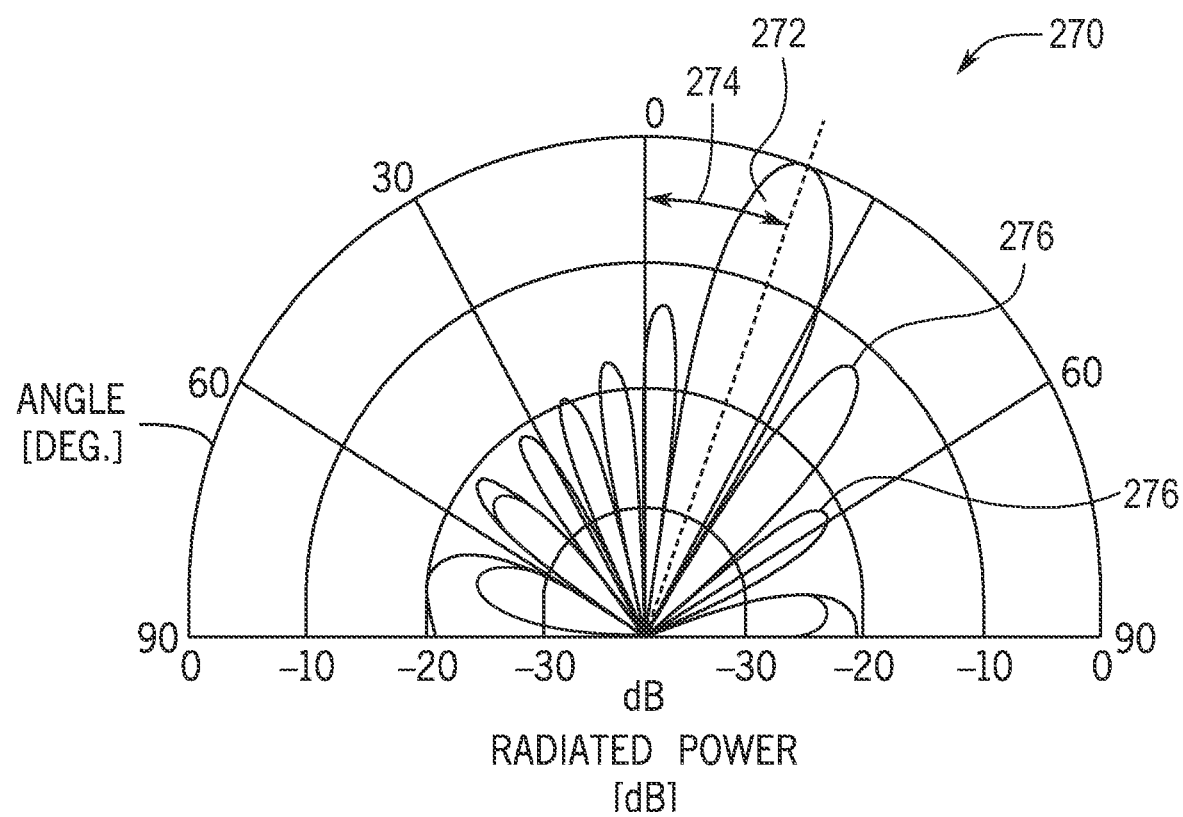
FIG. 2F is an example polar plot showing an exemplary main lobe and side lobes emanating from an exemplary phased array antenna apparatus, in accordance with some embodiments of the present disclosure.

FIG. 2F shows an example schematic 270 showing an exemplary main lobe 272 and side lobes 276 emanating from an exemplary antenna apparatus. The schematic 270 may represent a polar plot, whereby the main lobe 272 and the various side lobes 276 represent a radiation pattern, or effective isotropic radiation pattern (ETRP), of the antenna apparatus. As illustrated in FIG. 2F, the main lobe 272 may have a larger field strength compared to other lobes (e.g., side lobes 276) resulting from the transmission of the signal. The main lobe 272 may correspond to the steering direction 274 of the signal from the antenna apparatus to a satellite. The other lobes, or side lobes 276, may be the result of the size/shape of the array aperture and any kind of excitation taper (e.g., amplitude taper) applied to the antenna array. These sidelobes might be worse in the case of an imperfect calibration resulting in systematic and/or random errors in the individual antenna signals (magnitude and/or phase). Therefore, the overall ETRP mask and the achievable sidelobe levels depends on the accuracy/quality of the calibration of the antenna array.

In-Line Self Calibration
Calibration Configurations

Figure 3C:
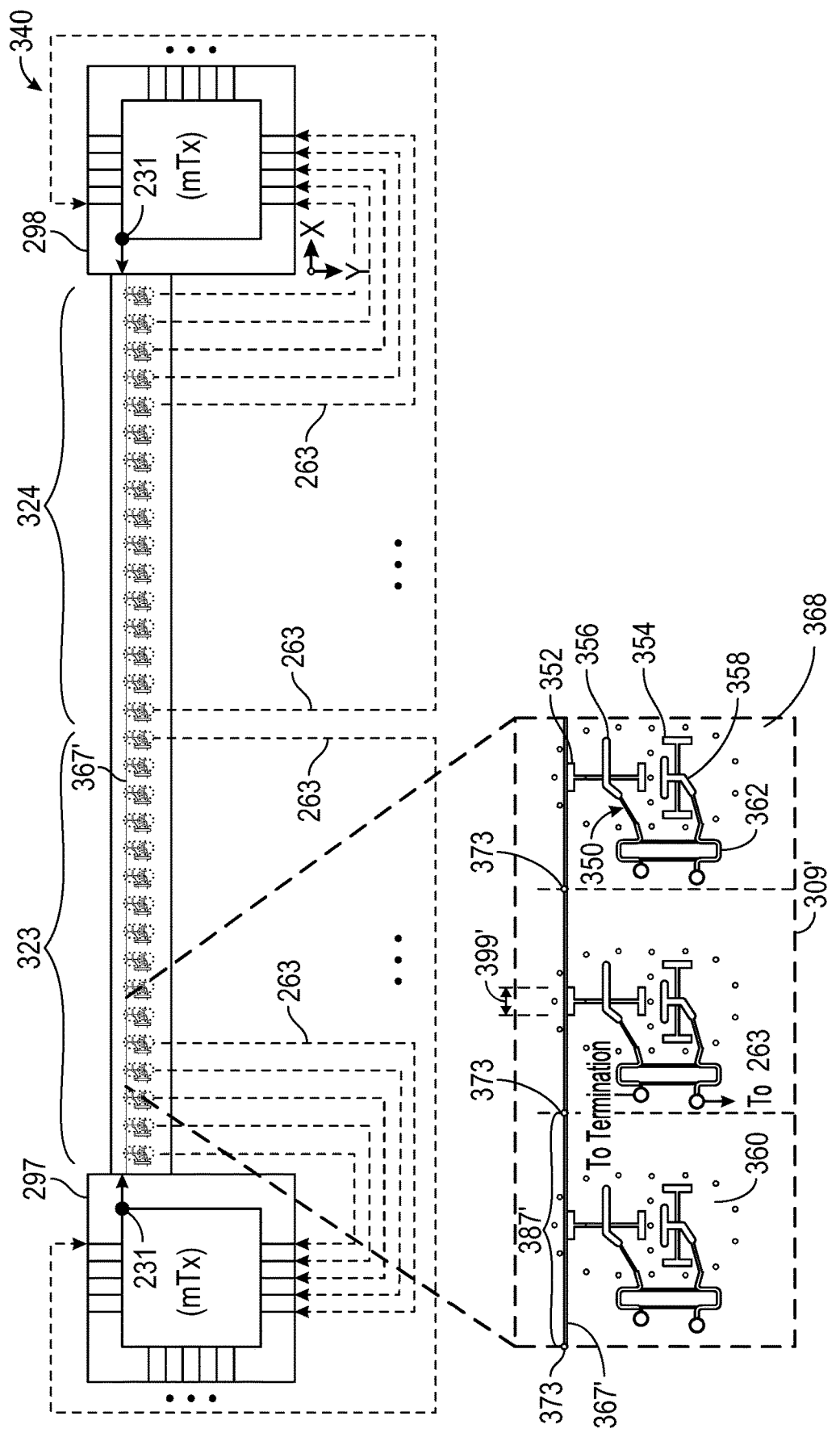
FIG. 3C is another exemplary illustration showing a simplified block diagram of antenna calibration unit cells in a receive (Rx) phased array antenna system self-calibration configuration, in accordance with some embodiments of the present disclosure.

FIGS. 3A through 3C illustrate exemplary calibration configurations for calibrating transmitting (Tx) and/or receiving (Rx) phased array antenna systems. Similar calibration configurations can also be used for calibrating transmitting/receiving (Tx/Rx) phased array antenna systems without departing from the scope of the present disclosure.

FIG. 3A illustrates an example calibration configuration 305 for a transmitting (Tx) phased array antenna system including DBFs 207 and 208 as described above with respect to FIG. 2B. In the illustrated example of FIG. 3A, calibration line 367 can correspond to calibration line 267 of FIG. 2B. As illustrated, the calibration line 367 extends between and couples to calibration receive (mRx) section 232 of transmit (Tx) DBF 207 (also labeled as port A) and calibration receive (mRx) section 232 of transmit (Tx) DBF 208 (also labeled as port B).

As shown in the illustrated example of FIG. 3A, antenna calibration unit cells 309 (also referred to herein as unit cells) are arranged in a linear array running along the same axis as the calibration line 367. The antenna calibration unit cells 309 each include an antenna element from either a first group 323 of antenna elements (see antenna elements 213 of FIG. 2B) or a second group 324 of antenna elements (see antenna elements 214 of FIG. 2B). As illustrated, each antenna element of the first group 323 of antenna elements is RF coupled to transmit RFIO lines (e.g., RFIO lines 235 of FIG. 2B) of transmit (Tx) DBF 207 by traces 261 and a corresponding FEM chip 215 as shown in FIG. 2B. Similarly, each antenna element of the second group 324 of antenna elements is RF coupled to RFIO lines of transmit (Tx) DBF 208 by traces 261 and a corresponding FEM chip 215 as shown in FIG. 2B. As illustrated, the antenna calibration unit cells 309 each share an identical footprint, resulting in uniformly spaced antenna elements along the calibration line 367. While not required, utilizing antenna calibration unit cell 309 with an identical footprint can reduce the number of variables in calibration calculations as explained in more detail below with respect to FIGS. 4A-4E.

Referring to FIG. 3A, an antenna element of each calibration unit cell 309 includes, without limitation, a slot feed 350 (including orthogonal coupling slots 352, 354), a 90-degree hybrid combiner/splitter 362, and feed lines 356, 358. Coupling slots 352, 354 can correspond to and perform similar functions to dual output ports 252, 254 of FIG. 2B. Feed lines 356, 358 can correspond to and perform similar functions to feed lines 256, 258 show in FIG. 2B. The antenna element configuration shown in FIG. 3A is discussed in greater detail with respect to FIGS. 7A-7C below. In the illustrated example, one port of each respective 90-degree hybrid combiner/splitter 362 can be coupled to a corresponding trace 261 and routed to the RFIO lines 277 of a corresponding DBF 207, 208. In some cases, FEM chips 215 (e.g., if the LNAs 224 are not included within DBFs 207, 208) may amplify the signals on each corresponding trace 261 before it reaches the RFIO lines 277 of the corresponding DBF 207, 208. In the illustrated example, the remaining port of the 90-degree hybrid combiner/splitter 362 can be coupled to a termination as shown in FIG. 2B.

FIG. 3A illustrates an enlarged view of three antenna calibration unit cells 309 from corresponding to the first group 323 of antenna elements. As illustrated, the calibration line 367 includes a plurality of periodically repeating calibration line sections 387 spanning each antenna calibration unit cell 309. For the purpose of performing calibration, each antenna calibration unit cell 309 can be modeled as including two ports 373 located where each end of a corresponding calibration line section 387 intersects the edge of the antenna calibration unit cell 309. Each calibration line section 387 includes a bidirectional coupler 399 that provides coupling between the calibration line 367 and the antenna element of each corresponding antenna calibration unit cell 309. As illustrated, the bidirectional coupler 399 is positioned symmetrically relative to coupling slot 352 of the antenna element included in antenna calibration unit cell 309 to form a bidirectional coupler with identical coupling coefficients for either direction of travel of an RF calibration signal on calibration line 367. In some cases, a calibration line 367 with directional couplers (not shown) can be used without departing from the scope of the present disclosure as discussed in more detail below with respect to FIG. 4D. As a result of the periodically repeating structure of calibration line 367, each unit cell 309, and more particularly, each bidirectional coupler 399, is separated by a section of the calibration line 367 having an identical geometry.

FIG. 3B illustrates an example calibration configuration 340 for a receiving (Rx) phased array antenna system including DBFs 297 and 298 as described above. In the illustrated example of FIG. 3B, the mode of operation of the calibration ports and the functional RF/antenna ports are similar to FIG. 2C. However, the means of coupling between calibration lines and the functional RF chain shown in FIG. 3B is different from the coupling shown and described with respect to FIG. 2C. In the illustrated example of FIG. 3B, calibration line 367 can correspond to calibration line 267 of FIG. 2C. As illustrated, the calibration line 367 extends between and RF couples to calibration transmit section (mTx) 231 of receive (Rx) DBF 297 (also labeled as port A) and calibration transmit section (mTx) section 231 of receive (Rx) DBF 298 (also labeled as port B). In the illustrated example, the calibration line 367 can be identical to the calibration line 367 of FIG. 3A, except that each end of the calibration line 367 in FIG. 3C is RF coupled to calibration transmit (mTx) sections 231 of respective receiving (Rx) DBFs 297, 298 instead of calibration receive (mRx) sections 232 of transmitting (Tx) DBFs of FIG. 3A. In some implementations (not shown) calibration line 367 can be terminated with a power divider/combiner coupled to both the mTx section 231 and mRx section 232 can make it possible for calibration line 367 to be a dual-use line for both Tx & Rx array calibration.

As shown in the illustrated example, antenna calibration unit cells 309 are arranged in a linear array running along the same axis as the calibration line 367. The antenna calibration unit cells 309 each include an antenna element from either a first group 323 of antenna elements (see antenna elements 213 of FIG. 2C) or a second group 324 of antenna elements (see antenna elements 214 of FIG. 2C). As illustrated, each of the first group 323 of antenna elements are RF coupled to receive RFIO lines (e.g., RFIO lines 277 of FIG. 2C) of receive (Rx) DBF 297 by traces 263 as shown in FIG. 2C. Similarly, each of the second group 324 of antenna elements are RF coupled to RFIO lines of receive (Rx) DBF 298 by traces 263. Routing traces 263 couple one port of each of the 90-degree hybrid combiner/splitters 362 to an RFIO port of one of the DBFs 297, 298 as illustrated in the example. As shown, antenna elements from a first group 323 of antenna elements are coupled to RFIO ports of the transmitting (Tx) DBF 297, while antenna elements from a second group of antenna elements 314 are coupled to RFIO ports of the transmitting (Tx) DBF 298 as shown in FIG. 2C. As illustrated, the antenna calibration unit cells 309 each share an identical footprint, resulting in uniformly spaced antenna elements along the calibration line 367.

Referring to FIG. 3B, the antenna element of each calibration unit cell 309 includes, without limitation, a slot feed 350 (including orthogonal coupling slots 352, 354), a 90-degree hybrid combiner/splitter 362, and feed lines 356, 358. As illustrated, the coupling slots 352, 354). Feed lines 356, 358 can correspond to and perform similar functions to feed lines 256, 258 shown in FIG. 2B. The antenna element configuration shown in FIG. 3B is discussed in greater detail with respect to FIGS. 7A-7C below. One port of each of the 90-degree hybrid combiner/splitter 362 can be coupled to a corresponding feed line 263 and routed to the corresponding DBF 297, 298. In the illustrated example, the remaining port of the 90-degree hybrid combiner/splitter 362 can be coupled to a termination as shown in FIG. 2C.

FIG. 3B illustrates an enlarged view of three antenna calibration unit cells 309. As illustrated, the calibration line 367 includes a plurality of periodically repeating calibration line sections 387 spanning each antenna calibration unit cell 309. For the purpose of performing calibration, each antenna calibration unit cell 309 can be modeled as including two ports 373 located where each end of a corresponding calibration line section 387 intersects the edge of the antenna calibration unit cell 309. Each calibration line section 387 includes a bidirectional coupler 399 that provides coupling between the calibration line 367 and the antenna element of each corresponding antenna calibration unit cell 309. As illustrated, the bidirectional coupler 399 is positioned symmetrically relative to coupling slot 352 of the antenna element included in antenna calibration unit cell 309 to form a bidirectional coupler with identical coupling coefficients for either direction of travel of an RF calibration signal on calibration line 367. As a result of the periodically repeating structure of calibration line 367, each unit cell 309, and more particularly, each bidirectional coupler 399, is separated by a section of the calibration line 367 having an identical geometry. In some cases, a calibration line 367 with directional couplers (see, e.g., directional couplers 279 of FIG. 2D) can be used without departing from the scope of the present disclosure as discussed in more detail below with respect to FIG. 4D. As a result of the periodically repeating structure of calibration line 367, each unit cell 309, and more particularly, each bidirectional coupler 399, is separated by a section of the calibration line 367 having an identical geometry.

FIG. 3C illustrates a calibration configuration 340 for a receiving (Rx) phased array antenna that is similar to and performs similar functions to the calibration configuration 325 of FIG. 3B. As illustrated in FIG. 3C, the calibration line 367' is implemented as a completely straight line conductor disposed between the mTx section 231 of DBF 297 and the mTx section 231 of DBF 298. The bidirectional coupler 399' of the calibration line 367' is positioned in proximity to the cavity 360 and slot 352 of the slot feed 350 of each antenna element included in the antenna calibration unit cells 309'. As illustrated, similar to bidirectional couplers 399 of FIGS. 3A and 3B, the bidirectional couplers 399' of FIG. 3C are routed in proximity to and at a uniform distance from the slot 352 to form a bidirectional coupler with identical coupling coefficients for either direction of travel of an RF signal on calibration line 367. FIG. 3C illustrates that no explicit discontinuity (e.g., the curvature of bidirectional couplers 399 of FIG. 3A) of the calibration line 367' is required to achieve coupling between the calibration line 367' and the signal chain of the antenna element in each antenna calibration unit cell 309'. In the illustrated example of FIG. 3C, the calibration line sections 387' can have a different effective length when compared with the calibration line sections 387 of FIGS. 3A, and 3B.

Controlling Calibration Line Section Length

Although FIG. 3C illustrates that curvature of bidirectional couplers 399 is not required, there are several reasons a calibration line 367/367' may include different deviations from a straight line. For example, the curvature of the bidirectional coupler 399 of calibration line 367 shown in FIGS. 3A and 3B provides clearance between vias 370 and the calibration line 367. In addition, as discussed in more detail below, calibration line sections 387 with deviations from a perfectly straight line (e.g., calibration line 367') can include, without limitation, curvature, such as the curvature of bidirectional coupler 399 shown in FIGS. 3A and 3B, or any other type of signal routing that does not follow straight line path (see calibration lines 1067 of FIG. 10).

In some cases, the curvature of the calibration line 367 can be used to control the length (e.g., electrical length L) of the calibration line and keep it in a desired range across the full operational frequency bandwidth (e.g., for broadband systems) of the phased array antenna. For example, the calibration line section 387 length can be configured to avoid any half wavelength multiples of the operational frequencies of the phased array antenna. In this scenario, the small reflections from each calibration will add constructively at the input sides (mTx/mRx sides) and will present as very high (almost 0 dB) return loss (RL) and cause unpredictable coupling between calibration lines and functional RF/antenna paths. As noted above, this condition can also occur when the length of the calibration line sections 387 is an integer multiple of the half wavelength (n $\lambda_g/2$, where n is integer and $\lambda_g$ is guided wavelength) at a particular operational frequency of the phased array antenna. Therefore, it would be desirable to keep the calibration line sections between those discrete values.

In some implementations, a calibration configuration using ultra low loss PCB laminates or metallic/air-filled waveguide structures can be particularly susceptible to the constructive interference effects. In some cases, when the calibration lines are more lossy (e.g., fabricated by lower grade PCB materials), the destructive effect of the condition caused by calibration line sections 387 having a length that is a multiple of the half wavelength becomes less pronounced. In such cases, the RL at the input of the calibration line 367 is still higher for the frequency with a half wavelength multiple matching the calibration line section 387 length than other frequencies. However, as a result of the loss in the calibration line 367, the RL can have a smaller effect. For example, a calibration transmit (mTx) section (e.g., calibration transmit (mTx) section 231 of FIG. 2C) may be able to inject a calibration signal into the calibration line 367 if the calibration line has sufficient loss. In such a case, the main effect at the relevant frequency will be a gradual change in the impedance behavior along the calibration line 367 from its edges towards its center. In some cases, this gradual impedance change can cause a slight taper from antenna elements closest to an active calibration port toward the opposite end of the calibration line as measured in the amplitude and phase of the measurements performed by the mRx/mTx ports. In some cases, the resulting sidelobe levels are acceptable. In some cases, the tapering effect can be corrected since it can be predictable (e.g., as a function of the loss of each calibration line section 387) and slowly changing from antenna element to antenna element.

As an illustrative and non-limiting example, an example periodic array of antenna elements of a phased array antenna can have a free space element spacing (e.g., center to center spacing of antenna elements 213) equal to 0.6 times the wavelength $\lambda_H$ of the highest operational frequency of the phased array antenna. In addition, due to meandering and/or curvature of the calibration line 367, the physical length of the calibration line sections 387 becomes equal to 0.8 times $\lambda_H$. In the example, the dielectric coefficient of the printed circuit board (PCB) Dk can be equal to 3.5. The resulting effective length L (e.g., the guided wavelength) of the calibration line sections 387 is equal to $0.8 \times \sqrt{3.5} \approx 1.5 \lambda_H$ which is three times the half wavelength $\lambda_H/2$ at the highest operational frequency of frequency band BW. The lower end of the frequency band can be selected by lowering the frequency from the upper frequency to a frequency where $L=\lambda_L$ of the lower frequency. The resulting fractional bandwidth is 1.5-to-1 or approximately 40%. In some embodiments, the upper frequency of the frequency band BW can be lowered and the lower frequency can be raised to provide a margin from the half-wavelength frequencies, resulting in a usable bandwidth slightly less than 40%. As described above, in some cases, this constraint can be ignored if there is enough loss along the calibration lines to avoid a complete stop-band effect at frequencies where $L=n\ \lambda_g/2$.

Another reason to control the length of the calibration line 367/367' is that the periodic structure of the calibration line 367/367' coupled to the signal chains of the antenna elements of the first group 323 and second group 324 can act as a series fed array (or a leaky wave) antenna. As used herein, a leaky wave antenna is a directional antenna with a scanning direction that depends on the applied frequency and the effective length (e.g., electrical length L) of the periodic calibration line sections 387. If the leaky wave antenna steering direction is the same or similar to the steering angle of the phased array antenna, then the realized gain of the phased array antenna can be slightly reduced. In some cases, the degree of realized gain reduction can depend on the relative strength or weakness of the couplers (e.g., bidirectional couplers 399/399' of FIGS. 3C, 3D) along the calibration lines 367/367'. In some embodiments, the effective length L of the calibration line sections 387/387' can be selected such that the steering direction of the leaky wave antenna is outside the operational scan range of the phased array antenna. For example, if the phased array antenna is configured to steer between +/−60 degrees of broadside, the effective length L of the leaky wave antenna can be selected to produce a steering direction between 70 and 85 degrees or −70 and −85 degrees from broadside.

In some implementations, the scanning direction of the leaky wave antenna formed by the calibration line sections 387/387' of the calibration line 367/367' may cause the phased array antenna to violate one or more radiation mask constraints and/or interfere with other communications systems, when the calibration lines are excited by the calibration transmit (mTx) ports. Illustrative examples of one or more constraints on a phased array antenna may include minimum transmitted power in the direction of the steering angle and/or minimum receiving sensitivity in the direction of the steering angle. Illustrative examples of interference with other communications systems may include one or more of the following: potential interference with geostationary (GEO) communication systems; potential interference with other (e.g., non-GEO) potential satellite communication systems, and regulatory constraints, such as FCC frequency allocations. In addition, there may be other constraints on the system to be defined in the future that can be affected by the beam direction of a leaky waved antenna formed by a calibration line configuration in a phased array antenna system.

In some embodiments, the scan direction of the leaky wave antenna formed by the calibration line can be set such that the scan direction does not radiate energy in any direction that has constraints on radiated power. In some cases, it may not be possible to design the scan direction of the leaky wave antenna toward a direction that is not constrained and/or with a small enough power level not to violate any constraints. In some embodiments, the length of calibration line sections (e.g., calibration line sections 387 of FIG. 3A) for different calibration lines (e.g., belonging to different antenna rows, columns, and/or any other grouping) in the phased array antenna can be varied such that the leaky wave antenna formed by each calibration line has a slightly different steering direction. As a result, the power from the leaky wave antennas can be spread out over a larger range of directions, thereby avoiding sending an amount of power in any single direction that violates a constraint (e.g., a regulatory requirement). In some embodiments, the amount of variation between calibration line sections for different calibration lines can be varied slowly to avoid sharp differences in coupling patterns of the functional antenna elements of the phased array antenna.

Self-Calibration Techniques

Figure 4A:
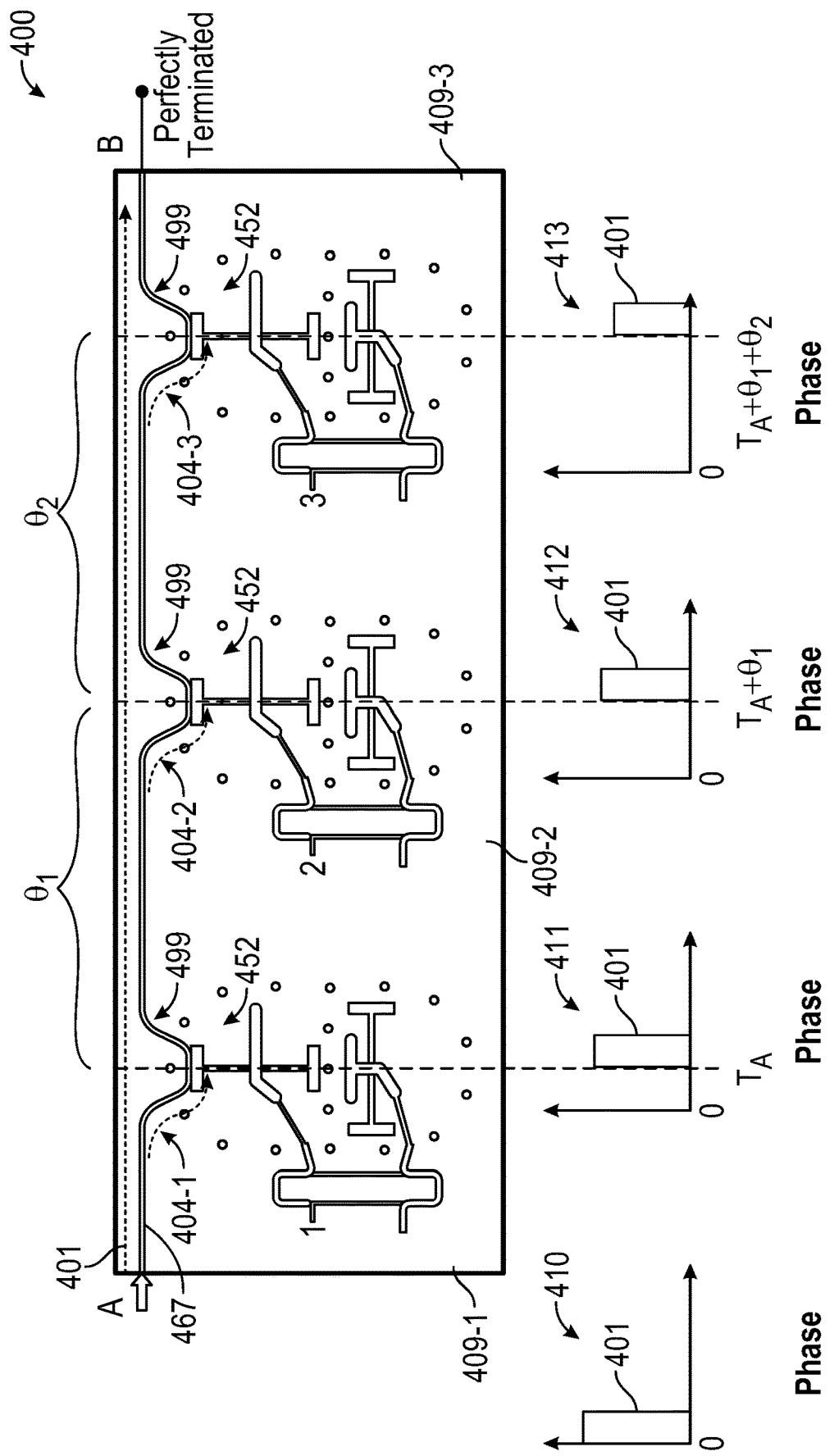
FIG. 4A and FIG. 4B are exemplary illustrations of a calibration configuration and calibration procedure for a receiving phased array antenna, in accordance with some examples.
Figure 4B:
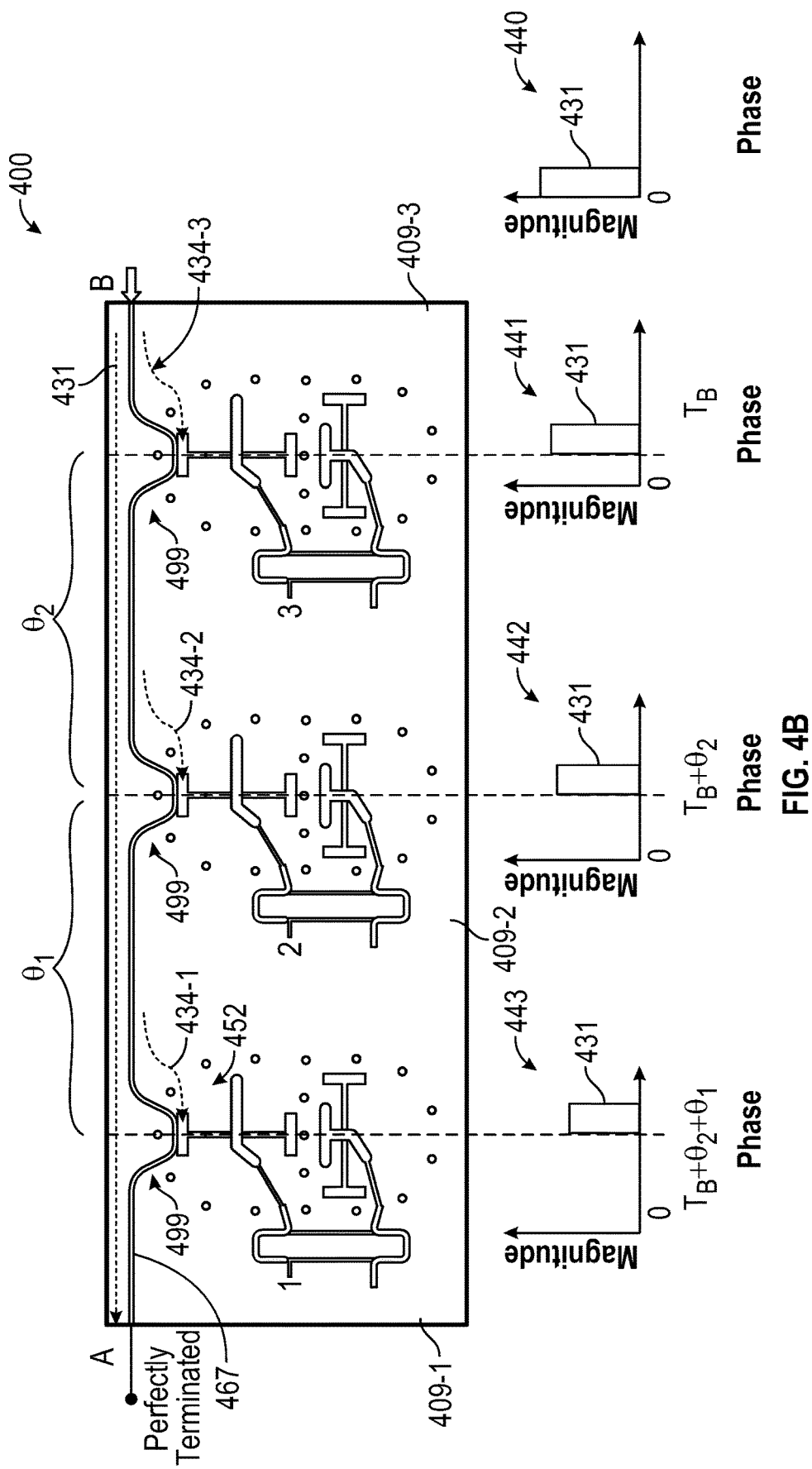

FIGS. 4A and 4B illustrate a simplified calibration configuration and calibration technique for a receiving (Rx) phased array antenna. For the purposes of illustration, the example calibration configuration 400 includes only three antenna calibration unit cells 409-1, 409-2, and 409-3 (collectively referred to herein as antenna calibration unit cells 409), which can each correspond to antenna calibration unit cells 309 of FIGS. 3A-3C. Referring to FIGS. 4A and 4B, the calibration line 467 is terminated at calibration ports A and B. Calibration line 467 can correspond to calibration line 367 of FIGS. 3A and 3B or calibration line 367' of FIG. 3C. In one illustrative embodiment, calibration port A can correspond to mTx section 231 of DBF 297 in FIGS. 3B and 3C and calibration port B can correspond to mTx section 231 of DBF 298 of FIGS. 3B and 3C.

Referring to FIG. 4A, in a first step of the example calibration procedure, an RF calibration signal 401 is transmitted from calibration transmit (mTx) port A and travels along the calibration line 467 as indicated by an arrow running parallel to the calibration line 467. As the RF calibration signal 401 travels down the calibration line 467, a portion of the RF energy in the RF calibration signal 401 couples to the respective slots 452 of each antenna calibration unit cell 409. For example, coupling between the RF calibration signal 401 and unit cell 409-1 is illustrated by arrow 404-1, coupling between the RF calibration signal 401 and unit cell 409-2 is illustrated by arrow 404-2, and so on. The coupled portion of the RF calibration signal 401 at each antenna calibration unit cell 409-1, 409-2, 409-3 can be routed (e.g., by traces 263 of FIG. 3B) to and received by a corresponding receive (Rx) RF section (e.g., Rx RF section 288 of FIG. 2C) of a corresponding DBF (e.g., DBF 297, 298 of FIG. 2C) coupled to each respective antenna calibration unit cell 409-1, 409-2, 409-3. In turn, the DBF that receives the coupled portion of the RF calibration signal from each antenna calibration unit cell 409 can measure the signal received at each of the antenna calibration unit cells 409-1, 409-2, 409-3 to produce measurement values M(A1), M(A2), M(A3). M(A1) is the complex measurement value when RF calibration signal 401 transmitted from port A and received by unit cell 409-1, M(A2) is the complex measurement value when RF calibration signal 401 transmitted from port A and received by unit cell 409-2, and M(A3) is the complex measurement value when RF calibration signal 401 transmitted from port A and received by unit cell 409-3.

As the RF calibration signal 401 travels down the calibration line 467, the phase of the signal also changes according to the frequency (e.g., the center frequency) of the RF calibration signal 401 and the electrical distance travelled along the calibration line 467. Accordingly, the phase of the coupled RF calibration signal received at each antenna calibration unit cell 409 (and eventually by a corresponding DBF) can differ by a phase shift θ. In addition, the RF calibration signal 401 attenuates as it travels down the calibration line 467. Plots 410, 411, 412, and 413 illustrate magnitude (on the y-axis) and unwrapped phase (on the x-axis) of the RF calibration signal 401 at different points along the calibration line 367. For purposes of illustration, the RF calibration signal 401 is illustrated as a rectangular pulse. However, the RF calibration signal 401 can included any suitable type of signal, including, without limitation, a single tone (e.g., a very narrowband signal), a CDMA signal, or a gaussian pulse. The values of the magnitude and phase in plots 410-413 are not to scale and are shown only relative to an initial reference phase 0 and an initial magnitude of the RF calibration signal 401 rectangular pulse at the time of transmission as illustrated in plot 410. Plot 411 illustrates the phase and magnitude of the RF calibration signal 401 at the bidirectional coupler 499 of unit cell 409-1.

Plot 411 of FIG. 4A illustrates the state of the RF calibration signal 401 after transmission from port A, traversing a portion of the calibration line 467, and being received at the first antenna calibration unit cell 409-1. As shown, the RF calibration signal 401 arrives at the coupler of first antenna element with a phase shift of $T_\alpha$ degrees. The phase shift $T_\alpha$ is common between all the measurements that calibration port A performs, and as a result can be canceled out during calculation of calibration errors. Similarly, plot 412 illustrates the phase and magnitude of the RF calibration signal 401 after further traversing the portion of the calibration line 467 between first antenna calibration unit cell 409-1 and a second antenna calibration unit cell 409-2. The RF calibration signal 401 can couple to the bidirectional coupler 499 of unit cell 409-2, further attenuated by a factor $\alpha_1$ and shifted relative to plot 411 by a phase shift $\theta_1$, resulting in total unwrapped phase shift of $T_\alpha+\theta_1$. Plot 413 illustrates the phase and magnitude of the RF calibration signal 401 at the bidirectional coupler 499 of unit cell 409-3. The plot 413 shows the RF calibration signal 401 further attenuated by an attenuation factor $\alpha_2$ and phase shifted by a phase shift $\theta_2$.

Referring to FIG. 4B, in a second step of the calibration procedure, an RF calibration signal 431 is transmitted from calibration transmit (mTx) port B and travels along the calibration line 467 as indicated by an arrow running parallel to the calibration line 467. As the RF calibration signal 431 travels down the calibration line 467, a portion of the RF energy in the RF calibration signal 431 couples to the respective slots 452 of each antenna calibration unit cell 409. For example, coupling between the RF calibration signal 431 and unit cell 409-1 is illustrated by arrow 434-1, coupling between the RF calibration signal 431 and unit cell 409-2 is illustrated by arrow 434-2, and so on. The coupled portion of the RF calibration signal 431 at each antenna calibration unit cell 409-1, 409-2, 409-3 can be routed (e.g., by traces 263 of FIG. 3B) to and received by a corresponding receive (Rx) RF section (e.g., Rx RF section 288 of FIG. 2C) of a corresponding DBF (e.g., DBF 297, 298 of FIG. 2C). In turn, the DBF that receives the coupled portion of the RF calibration signal 431 from each antenna calibration unit cell 409 can measure the signal received at each of the antenna calibration unit cells 409-1, 409-2, 409-3 to produce measurement values M(B1), M(B2), M(B3). Measurement value M(B1) is the value due to RF calibration signal 431 transmitted from port B and received by unit cell 409-1, measurement value M(B2) is the value due to RF calibration signal 431 transmitted from port B and received by unit cell 409-2, and measurement value M(B3) is the value due to RF calibration signal 431 transmitted from port A and received by unit cell 409-3.

Plot 440 illustrates an initial state of the RF calibration signal 431 transmitted from port B with an initial magnitude and reference phase of zero (0). Plot 441 illustrates the RF calibration signal 431 with an attenuation contribution from the port B as well as a phase contribution of $T_b$ received at antenna calibration unit cell 409-3. Plot 442 of FIG. 4B illustrates the state of the RF calibration signal 431 after transmission from port B, traversing a portion of the calibration line 467, and being received at the second antenna calibration unit cell 409-2. As shown in plot 442, the RF calibration signal 431 can couple to the bidirectional coupler 499 of unit cell 409-2, further attenuated by a factor $\alpha_2$ and shifted by a phase shift $\theta_2$ relative to plot 441. Similarly, plot 443 illustrates the RF calibration signal 431 experiencing a phase shift $\theta_1$ and attenuation by factor $\alpha_1$ between unit cells 409-2 and 409-1.

After obtaining the measurements described at the unit cells 409-1, 409-2, 409-3 in the first calibration step shown in FIG. 4A and the second calibration step in FIG. 4B, the collected measurements M(A1), M(A2), M(A3), M(B1), M(B2), M(B3) can be used to perform a relative calibration between the antenna elements of unit cells 409-1, 409-2, 409-3. For the purposes of illustration, a technique for determining a phase and magnitude offset between unit cell 409-1 and 409-2 will be described in more detail below.

Because the calibration line 367 shown in FIG. 4A includes periodically repeating sections (e.g., calibration line sections 387 of FIGS. 3A and 3B), Equations (1)-(12) below assume that the attenuation factor for every calibration line section is equal to $\alpha_1$ and the phase shift is equal to value $\theta_1$. This assumption reduced the total number of variables required to determine the magnitude and phase offsets between antenna calibration unit cell 409. However, in some cases, the attenuation factor and/or phase shift from different sections of the calibration line can differ without departing from the scope of the present disclosure.

The measured values M(A1), M(A2), M(B1), M(B2) can be expressed in terms of parameters of the calibration configuration 400 and can include, without limitation, phase and magnitude contributions to the measured signal values M(A1), M(A2), M(B1), M(B2) from port A, port B, sections of the calibration line 467, and the antenna calibration unit cells 409-1, 409-2 as shown in Equation (1) to Equation (4) below:

$$M(A1)=m_1 S(A1) e^{-j(T_a+T_1)} \tag{1}$$

$$M(B1)=m_1 S(B1) e^{-j(T_b+T_1)} \tag{2}$$

$$M(A2)=m_2 S(A2) e^{-j(T_a+T_2)} \tag{3}$$

$$M(B2)=m_2 S(B2) e^{-j(T_b+T_1)} \tag{4}$$

Where $m_1$, $m_2$ are the magnitude contributions and $T_1$, $T_2$ are the phase contributions due to the antenna calibration unit cells 409-1, 409-2 respectively, $T_a$, $T_b$ are the phase contributions of calibration ports A, B to the complex measurements M(A1), M(A2), M(B1), M(B2), $\theta_1$ is the phase change experienced by the calibration signal as it travels along a section of the calibration line 367 spanning adjacent unit cells (e.g., 409-1 and 409-2), and $\alpha_1$ is an attenuation factor between 0 and 1 representing the attenuation experienced by the calibration signal traveling along the section of the calibration line 367. The values S(XY) are the complex coupling factors between port X and antenna calibration unit cell 409-Y, which contributes to the complex measured value M(XY) in addition to the magnitude and phase contributions of the port X, antenna calibration unit cell 409-Y, and calibration line 367 as noted above.

The Equations (1)-(4) above also assume that during the first calibration step described with respect to FIG. 4A, the port B is perfectly terminated resulting in no reflected signal and similarly during the second calibration step described with respect to FIG. 4B, the port A is perfectly terminated resulting in no reflected signal.

Because each unit cell 409-1, 409-2 is designed to have identical characteristics and the corresponding attenuation factors $\alpha_1$ and phase shifts $\theta_1$ are assumed to be equal, the coupling factor S(A2) can be expressed as the coupling factor S(A1) multiplied by the attenuation factor $\alpha$ and shifted by the phase shift corresponding to $\theta_1$ as shown in Equation (5):

$$S(A2) = S(A1)\alpha_1 e^{-j\theta_1} \tag{5}$$

As noted with respect to FIG. 4B, the signal transmitted from port B arrives at antenna calibration unit cell 409-2 first and subsequently arrives at antenna calibration unit cell 409-1. As a result, the coupling factor S(B2) can be expressed as the coupling factor S(B1) divided by the attenuation factor $\alpha$ and shifted by the phase shift corresponding to $-\theta_1$ as shown in Equations (6a) and (6b):

$$S(B1) = S(B2)\alpha_1 e^{-j\theta_1} \tag{6a}$$

$$S(B2) = S(B1)t_{,?} e^{j\theta_1} \tag{6b}$$

By replacing S(A2) with the right-hand side of Equation (3) and replacing S(B2) with the right-hand side of Equation (4b), the measurements M(A2), M(B2) can all be expressed in terms of S(A1), S(B1), as shown in Equation (7 and Equation 8

$$M(A2) = \alpha_1 m_2 S(A1) e^{-j(T_a + T_2 + \theta_1)} \tag{7}$$

$$M(B2) = \frac{m_2}{\alpha_1} S(B1) e^{-j(T_b + T_2 - \theta_1)} \tag{8}$$

The expressions for M(A1), M(A2), M(B1), M(B2) in Equations (1), (2), (7), (8) can be algebraically combined to remove the contributions of the ports A and B and the complex coupling parameters S(XY) as shown in Equations (9) and (10):

$$\frac{M(A2)M(B1)}{M(A1)M(B2)} = \alpha_1^2 e^{-2j\theta_1} \tag{9}$$

$$\frac{M(A1)M(B1)}{M(A2)M(B2)} = \left(\frac{m_1}{m_2}\right)^2 e^{-2j(T_1 - T_2)} \tag{10}$$

The magnitude ratio between $$\frac{m_1}{m_2}$$

unit ell 409-1 and unit cell 409-2 and the phase difference $T_1 - T_2$ are the quantities that can be used to calibrate unit cell 409-1 and unit cell 409-2 relative to one another and can be obtained by taking the square root of both sides of Equation (10) as shown in Equation (11):

$$\sqrt{\frac{M(A1)M(B1)}{M(A2)M(B2)}} = \sqrt{\left(\frac{m_1}{m_2}\right)^2 e^{-2j(T_1 - T_2)}} = \pm \frac{m_1}{m_2} e^{-j(T_1 - T_2)} \tag{11}$$

Alternatively, by taking the square root of both sides of Equation (9), the attenuation factor $\alpha_1$ and phase $\theta_1$ for each calibration line 467 section can be determined as shown in Equation (12):

$$\sqrt{\frac{M(A2)M(B1)}{M(A1)M(B2)}} = \sqrt{\alpha_1^2 e^{-2j\theta_1}} = \pm \alpha_1 e^{-j\theta_1} \tag{12}$$

However, there is ambiguity in the solutions to equations (11) and (12) resulting from the square root of the left hand side of each equation, leaving two mathematically valid solutions while only one of the two valid solutions provides a solution that will result in a correctly calibrated phased array antenna. Referring to equation (11), the magnitude $$\frac{m_1}{m_2}$$

has no uncertainty while the phase relationship $T_1 - T_2$ has two solutions with 180 degree phase difference. If the expected phase relationship $T_1 - T_2$ is approximately known, then the ambiguity in the solution to Equation (11) can be resolved. For example, if the actual phase value $T_1 - T_2$ is known due to reliability of the construction and/or component repeatability of a phased array antenna system, then the solution to equation 11 that mostly closely matches to the expected phase values can be selected for calibrating the phased array antenna system.

Referring to Equation (12), a similar approach can be used to resolve ambiguity between the two solutions with 180 degree phase difference. Again, the magnitude factor $\alpha$ has no ambiguity, while the ambiguity is in the choice between phase values $e^{-j\theta_1}$ and $-e^{-j\theta_1}$. In some embodiments, the phase $\theta_1$, which is an amount of phase shift experienced by the RF calibration signals 401, 431 traversing an expected effective length L of the calibration line 467, can be approximately known beforehand to resolve the ambiguity between the two potential solutions. This is because the physical length of periodically repeating sections (see calibration line sections 387 of FIGS. 3A-3C) of the calibration line 467 can be known with high accuracy due to PCB manufacturing tolerances. In one illustrative example, the physical length of each repeating section can be known with accuracy better than 0.1 millimeter (mm). The effective length L of the periodically repeating sections of calibration line 467 also depends on the dielectric constant Dk of the PCB. As an example, the dielectric constant of a PCB is usually within 5% of its expected value. As a result, the expected unwrapped phase shift experienced by an RF calibration signal traversing the length of each periodically repeating section can be known within ±2.5% of the expected value. If the ±2.5% error is much smaller than 90 degrees (e.g., less than 80 degrees, less than 45 degrees, less than 15 degrees, less than 5 degrees), then the one of the two potential solutions closest to the expected phase shift can be selected as the correct one.

As an illustrative and non-limiting example, a calibration line 467 can be designed to have a physical length of 25 mm for each periodically repeating section and an expected dielectric constant Dk of 3.8. In the illustrative example, for an RF signal with a center frequency of 15 gigahertz (GHz), this corresponds to 2.437 λ, which is effectively 157 degrees (wrapped) when measured. If the actual dielectric constant of the PCB is 3.99 (corresponding to a +5% error), the phase shift associated with the RF calibration signal traversing one periodically repeating section of the calibration line 467 will be 899 degrees unwrapped which is effectively 179 degrees (wrapped) when measured. In the illustrative example, the difference between the actual and expected phase shifts is 21 degrees, which is significantly lower than 90 degrees. As a result, the solution to Equation (12) that is closest to the expected phase shift can be selected.

In some embodiments, as the uncertainty of the dielectric constant and/or the physical length of each periodically repeating section increases, the phase difference between expected and actual phase can also increase proportionally. If the resulting phase uncertainty approaches or exceeds 90 degrees, then the expected phase can no longer be used to choose the correct solution to Equation (12).

In another example embodiment, the first and second set of calibration measurements described above can be repeated at multiple closely spaced frequencies, and the measurements can be used to estimate the slope of the phase $\theta_1$ vs frequency. Using the calculated slope, the expected unwrapped phase value of $\theta_1$ can be calculated at each frequency and used to choose the correct solution of Equation (12). For example, Equations (13)-(14) below illustrate an example calculation that can used to determine the unwrapped phase value of $\theta_1$. First, derivatives with respect to frequency f can be performed on ratios of two measurement values from each respective transmitting calibration port as shown in Equations (13a)-(13b).

$$\frac{\partial}{\partial f}\arg\left[\frac{M(A1)}{M(A2)}\right] = \frac{\partial}{\partial f}[T_2 - T_1 + \theta_1] \quad (13a)$$

$$\frac{\partial}{\partial f}\arg\left[\frac{M(B1)}{M(B2)}\right] = \frac{\partial}{\partial f}[T_2 - T_1 - \theta_1] \quad (13b)$$

Equations (13a) and (13b) can be combined to obtain the slope of the phase with respect to the frequency as shown on the right hand side of Equation (14) below.

$$\frac{1}{2}\frac{\partial}{\partial f}\arg\left[\frac{M(A1)M(B2)}{M(A2)M(B1)}\right] = \frac{\partial}{\partial f}\theta_1 \quad (14)$$

In some embodiments, the slope of $\theta_1$ can be multiplied by the measurement frequency f to find the expected unwrapped phase, and the closest solution between the two possible solutions to Equation (12) can be selected as the correct phase. This approach assumes behavior from the calibration line sections such that they have almost "pure" time delay as if they are just a uniform line section. Such an assumption can be reasonable when the couplers are weak (e.g., with a coupling factor less than −20 dB)

However, this approach can require an increased number of measurements (e.g., measurements at multiple frequencies) to calibrate the antenna elements.

In some cases, calibrating a phased array antenna (e.g., phased array antenna system 200 of FIG. 2A) can include matching magnitude values $m_1$, $m_2$ and/or the phase values $T_1$, $T_2$ in pair-wise fashion. In some cases, calibrating the phased array antenna includes minimizing an aggregate error in the phase and magnitude values of antenna elements (e.g., antenna elements 213, 214 of FIG. 2A) across the entire antenna array (e.g., antenna lattice 202 of FIG. 2A) using a matrix of linear set of measurements. In some cases, the magnitude values and/or the phase values can be calibrated within subsets of the antenna elements (e.g., subsets 204a, 204b of FIG. 2A). In some implementations, those subsets can be aligned among each other as a secondary-level calibration. In some cases, the approach of calibrating subsets of antenna elements can be used as a compromise between the number of equations to be solved simultaneously and the number of separate steps to be performed. Although illustrative example combinations of numbers of simultaneous equations and numbers of steps for performing calibration in a phased array antenna are described above, other numbers of equations, numbers of steps, or any combination thereof for performing calibration in a phased array antenna can be used without departing from the scope of the present disclosure.

The Equations (1)-(12) assume that the coupling between the calibration line 467 and the antenna calibration unit cells 409-1, 409-2, 409-3 is bidirectional and symmetric. However, this assumption is not required as long as a coupling ratio between the calibration line 467 and the antenna calibration unit cells 409-1, 409-2, 409-3 in each direction (e.g., from port A toward port B and from port B toward port A) can be reliably known. If the coupling ratio is known, using a directional coupler instead of a bidirectional coupler may not create any additional unknowns that require additional equations to account for as shown in Equations (15)-(22) below.

Figure 4C:
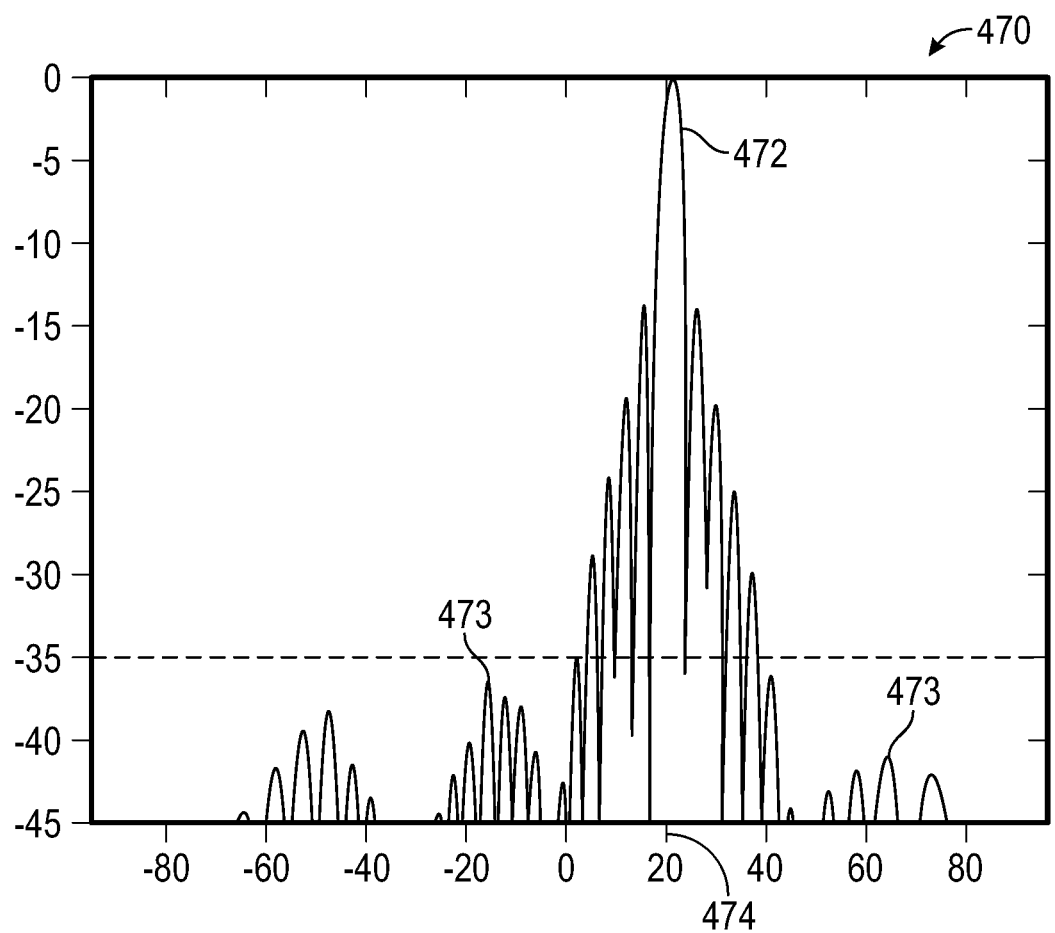
FIG. 4C is an exemplary plot showing main lobes and side lobes of an exemplary calibrated phased array antenna, in accordance with some examples.

FIG. 4C illustrates an example plot 470 of a normalized array pattern for a simulated 32-element phased array antenna calibrated according to the calibration technique described above with respect to FIGS. 4A and 4B. In the simulated 32-element phased array antenna, the inactive calibration port was terminated with a matched load, consistent with the assumptions of FIG. 4A and FIG. 4B. In the illustrated example, the main lobe 472 shows a peak at a selected steering angle of 20 degrees from broadside. The plot 470 further illustrates that side lobes 473 peak around −50 degrees, −15 degrees and 65 degrees from broadside. As shown in FIG. 4C, the resulting far side lobes after calibration using the calibration configuration 400 of FIG. 4A and FIG. 4B have a magnitude of 35 dB below the peak magnitude of main lobe 472.

As noted above, the Equations (1)-(12) include several assumptions based on expected physical properties of a phased array antenna. However, in some cases, one or more of the assumptions of Equations (1)-(12) may not hold. For example, achieving a perfectly matched termination at port A may be impractical. As discussed in more detail below a mismatched termination at port A during transmission of the RF calibration signal 431 by port B may result in a reflection of the RF calibration signal (e.g., RF calibration signal 431 of FIG. 4B). In some embodiments, a bidirectional coupler such as bidirectional coupler 499 of FIGS. 4A and 4B may not be used. In some cases, the effective length of each section of calibration line (e.g., calibration line sections 387 of FIG. 3A) may not be equal. For example, temperature gradients in a phased array antenna may cause the dielectric constant to vary across different sections of the calibration line 467 and as a result, the phase shift can be different. The Equations (15)-(22) discussed with respect to FIG. 4D illustrate an example technique for calibrating a phased array antenna when one or more of the assumptions of Equations (1)-(12) do not hold and/or the resulting performance degradation from making those assumptions becomes too large.

FIG. 4D illustrates an example simplified calibration configuration 450 and technique where the termination at port A is no longer assumed to be perfectly matched during the measurement of a RF calibration signal 431 transmitted from port B. FIG. 4D illustrates the behavior of a reflected RF calibration signal 451 which is a reflection of the RF calibration signal 431 transmitted from port B after reaching the mismatched termination at port A. In some cases, a mismatched termination of port A can cause a portion of the RF calibration signal 431 incident upon port A to be reflected back onto the calibration line 467 and travel in the opposite direction of RF calibration signal 431. The reflected RF calibration signal 451 can have an unknown phase shift and attenuation that can be modeled as a complex reflection coefficient R.

In the illustrative example described in Equations (15)-(22) below, the reflection coefficient R is referenced relative to the junction between antenna calibration unit cell 409-1 and calibration line 467 (e.g., at coupler 489 of antenna calibration unit cell 409-1). In addition to accounting for the reflected RF calibration signal 451, Equations (15)-(22) below also include terms to account for a coupler 489 that has differing coupling coefficients depending on the direction of travel of the RF calibration signal 401 (e.g., an anisotropic coupling). In the illustrative example provided herein, coupling coefficient $C_L$ is the coupling parameter for a wave (e.g., reflected RF calibration signal 451) traveling in the direction from port A to port B, and $C_R$ is the coupling parameter for a wave (e.g., RF calibration signal 431) traveling in the direction from port B to port A. Equations (15)-(22) below also do not assume that the attenuation factor or the phase shift for each periodic section of calibration line 467 is identical. Accordingly, $\alpha_1$, $\theta_1$, $\alpha_2$, $\theta_2$, ... $\alpha_N$, $\theta_N$ are magnitude and phase contributions due to the first, second, and Nth section of the calibration lines, starting from the antenna calibration unit cell nearest to port A and moving toward port B. Because the port B is assumed to be terminated with a matched termination while port A transmits an RF calibration signal (e.g., RF calibration signal 401 of FIG. 4A), the behavior of the RF calibration signal 401 travelling down the line and the measured values can be the same as in FIG. 4A. In some cases, the assumption of a matched termination can be applied to antenna elements that are close to the transmitting calibration port, far away from the inactive port where the reflection occurs.

In Equations (15)-(22) below, the values $m_1$, $m_2$ are the magnitude contributions and the phase values $T_1$, $T_2$ are the phase contributions due to the antenna calibration unit cells 409-1, 409-2 respectively. The value $m_N$ is the magnitude contribution and $T_N$ is the phase contribution of the Nth antenna calibration unit cell 409-N(not shown) for any number N of calibration unit cells calibrated by the calibration line 467. Each antenna calibration unit cell 409 can also be referenced by a numerical index n, for example unit cell 409-1 corresponds to n=1, unit cell 409-2 corresponds to n=2, and so on. In the illustrative embodiments of FIGS. 4A, 4B, and 4D, the value of N is equal to three (3) and accordingly the Nth antenna calibration unit cell is 409-3 (which corresponds to n=3). In the embodiments of FIGS. 3A-3C, the value of N is equal to thirty-two (32). In the embodiments of FIGS. 3A-3C, the measurement antenna calibration unit cell with index 1 (also referred to herein as the first antenna calibration unit cell) can be nearest to port A, and the antenna calibration unit cell with index n=N=32 (also referred to herein as the last antenna calibration unit cell) can be nearest to port B, with the remaining thirty antenna calibration unit cells being sequentially numbered in between. Accordingly, the Equations (15)-(22) can be applied to a calibration configuration with a number N of antenna calibration unit cells 409. In some cases, the maximum value for N can be arbitrarily large as long as the attenuation of periodic structure of the calibration line 467 does not become restrictively high. For example, as the length of the calibration line 467 increases, antenna calibration unit cell 409 far from the transmitting calibration port A and/or B may not receive a coupled signal with sufficient signal level to be accurately measured by the DBFs 297, 298 of FIG. 2C.

In a first step of the calibration procedure, measurements of an RF calibration signal transmitted from port A can occur in a similar fashion to corresponding measurements of RF calibration signal 401 of FIG. 4A. Accordingly, the measured values M(A1), M(A2), M(AN) correspond to measured values due to the RF calibration signal 401 from port A coupled to each respective antenna calibration unit cell 409-1 through 409-N by respective couplers 489. The measured values M(A1), M(A2), M(AN) for an RF calibration signal (e.g., RF calibration signal 401 of FIG. 4A) transmitted from port A can be expressed in terms of parameters of the calibration configuration 450 as shown in Equations (15)-(18) below.

$$M(A1) = m_1 m_a C_L e^{-j(T_a + T_1)} \tag{15}$$

$$M(A2) = a_1 m_2 m_a C_L e^{-j(T_a + T_2 + \theta_1)} \tag{16}$$

$$M(AN) = m_N M_a C_L \alpha_{Cal} e^{-j(T_a + T_N + \theta_{Cal})} \tag{17}$$

$$M(An) = m_n m_a C_L (\Pi_{i=1}^{n-1} \alpha_i) e^{-j(T_a + T_N + \Sigma_{i=1}^{n-1} \theta_1)} \tag{18}$$

Where aca, is the attenuation for the RF calibration signal travelling across the full length of calibration line 467, which is equal to the product of the attenuation factor for each section of the calibration line 467 such that $\alpha_{Cal} = \Pi_{i=1}^{N-1} \alpha_i$. The phase shift $\theta_{cal}$ is the phase shift experienced by the RF calibration signal travelling across every section of calibration line 467, which is equal to the sum of the phase shifts for each section such that $\theta_{Cal} = \Sigma_{i=1}^{N-1} \theta_i$. $C_L$ is the coupling factor from calibration lines to the antenna ports, for a signal approaching the couplers from left side (from side of port A) along 467. In some cases, because the termination at port B can be assumed to be well matched as shown in FIG. 4A, the form of Equations (15)-(18) closely resembles the form of Equations (1)-(2) described above. The assumption of a well matched termination is most applicable to the antenna elements closest to port A, which travel the greatest length of the calibration line and experience the most attenuation. Equation (18) generalizes Equations (15)-(17) for any antenna calibration unit cell 409 with index value of n.

Referring to FIG. 4D, in a second step of the calibration procedure, an RF calibration signal 431 is transmitted from calibration transmit (mTx) port B and travels along the calibration line 467 as indicated by an arrow running parallel to the calibration line 467. As the RF calibration signal 431 travels down the calibration line 467, a portion of the RF energy in the RF calibration signal 431 couples to the respective slots 452 of each antenna calibration unit cell 409. For example, coupling between the RF calibration signal 401 and unit cell 409-1 is illustrated by arrow 434-1, coupling between the RF calibration signal 431 and unit cell 409-2 is illustrated by arrow 434-2, and so on (see FIG. 4B). The RF calibration signal 431 at each antenna calibration unit cell 409-1, 409-2, 409-3 can be routed (e.g., by traces 263 of FIG. 3B) to and received by a corresponding receive (Rx) RF section (e.g., Rx RF section 288 of FIG. 2C) of a corresponding DBF (e.g., DBF 297, 298 of FIG. 2C).

In the case of FIG. 4D, the mismatched termination at port A also causes a reflected RF calibration signal 451 to couple back to the calibration line 467. The reflected calibration signal can couple through each of the coupler 489 of the antenna calibration unit cells 409 in a similar fashion to the RF calibration signal 401 of FIG. 4A. The reflected RF calibration signal 451 can also include an unknown phase shift and attenuation factor contributed by the mismatched termination at port A and expressed as the complex reflection coefficient R.

As the reflected RF calibration signal 451 travels down the calibration line 467, a portion of the RF energy in the reflected RF calibration signal 451 couples to the respective slots 452 of each antenna calibration unit cell 409. For example, coupling between the reflected RF calibration signal 451 and unit cell 409-1 is illustrated by arrow 484-1, coupling between the reflected RF calibration signal 451 and unit cell 409-2 is illustrated by arrow 484-2, and so on.

Measurement value M(B1) is the measured value due to RF calibration signal 431 transmitted from port B and received by unit cell 409-1, measurement value M(B2) is the value due to RF calibration signal 431 transmitted from port B and received by unit cell 409-2, measurement value M(BN) is the value due to RF calibration signal 431 transmitted from port A and received by the Nth unit cell 409-N(e.g., unit cell 409-3 in FIG. 4D). Equation (22) generalizes Equations (19)-(21) for any antenna calibration unit cell 409 with index value of n. Each of the measurement values M(B1)-M(BN) can include a component corresponding to the reflected RF calibration signal 451.

Referring to FIG. 4D, plot 491 illustrates the reflected RF calibration signal 451 with an attenuation contribution from the reflection at port A as well as a phase contribution of $\theta_R$ received at antenna calibration unit cell 409-1. In the present example, the attenuation and phase contributions from the reflection are included in reflection coefficient R as noted above. Plot 492 of FIG. 4D illustrates the state of the reflected RF calibration signal 451 after reflection from port A, traversing a portion of the calibration line 467, and being received at the second antenna calibration unit cell 409-2. As shown in plot 492, the RF calibration signal 431 can couple to the bidirectional coupler 499 of unit cell 409-2, further attenuated by a factor $\alpha_2$ and shifted by a phase shift $\theta_2$ relative to plot 491. Similarly, plot 493 illustrates the RF calibration signal 431 experiencing a phase shift $\theta_1$ and attenuation by factor $\alpha_1$ between unit cells 409-2 and 409-1. As indicated in the plots 491-493 by curled lines, the phase axis continues after the RF calibration signal 431 of FIG. 4B reaches the bidirectional coupler 499 of antenna calibration unit cell 409-1. In addition, the magnitude component is not shown to scale, and the magnitude of reflected RF calibration signal 451 in plot 491 is less than the magnitude of the RF calibration signal 431 received at antenna calibration unit cell 409-3 as shown in plot 443 of FIG. 2B as a result of attenuation from the reflection at port A.

As illustrated above with respect to FIG. 4D, in the case of a mismatched termination at port A while the calibration parameters are being measured based on RF calibration signal 431 transmitted from port B, a reflection can occur when RF calibration signal 431 arrives at port A and a reflected RF calibration signal 451 can travel along calibration line 467 in the opposite direction of reflected RF calibration signal 451. The reflected RF calibration signal 451 can couple to the N number of antenna unit calibration cells 409 through the couplers 489 of each respective antenna calibration unit cell 409. The measured values M(B1), M(B2), M(BN) due to an RF calibration signal (e.g., RF calibration signal 431 of FIG. 4D) transmitted from port B can be expressed in terms of parameters of the calibration configuration 450 as shown in Equations (19a)-(21) below.

$$M(B1) = m_1 m_b C_R e^{-j(T_b + T_1)} + R m_1 m_b C_L e^{-j(T_b + T_1)} \quad (19a)$$

$$= m_1 m_b e^{-j(T_b + T_1)}[C_R + RC_L] \quad (19b)$$

$$M(B2) = m_2 m_b \frac{C_R}{\alpha_1} e^{-j(T_b + T_2 - \theta_1)} + \alpha_1 R m_2 m_b C_L e^{-j(T_b + T_2 + \theta_1)} \quad (20a)$$

$$= \frac{1}{\alpha_1} m_2 m_b e^{-j(T_b + T_2 - \theta_1)}[C_R + RC_L \alpha_1^2 e^{-2j\theta_1}] \quad (20b)$$

$$M(BN) = \frac{m_N m_b}{\alpha_{Cal}} e^{-j(T_b + T_N - \theta_{Cal})}[C_R + RC_L(\alpha_{Cal})^2 e^{-2j(\theta_{Cal})}] \quad (21)$$

$$M(Bn) = \frac{m_n m_b}{\prod_{i=1}^{n-1} \alpha_i} e^{-j(T_b + T_n - \sum_{i=1}^{n-1} \theta_i)}\left[C_R + RC_L\left(\prod_{i=1}^{n-1} \alpha_i\right)^2 e^{-2j(\sum_{i=1}^{n-1} \theta_i)}\right] \quad (22)$$

In Equation (19a), the first term $m_1 m_b C_R e^{-j(T_b+T_1)}$ of the right-hand side of equation corresponds to the RF calibration signal 431 transmitted from port B and has a similar form to Equation (2). The second term of Equation (19a) corresponds to the reflected RF calibration signal 451, which can be modeled as a signal transmitted from port A with an unknown magnitude and phase expressed by the complex value R. As a result, the second term of equation (19a) has a form that is similar to Equation (15) multiplied by R. Equation (19b) simplifies the representation of M(B1) by factoring out common terms. Equation (20a) similarly expresses the measurement M(B2) as a component corresponding to RF calibration signal 431 and a component corresponding to reflected RF calibration signal 451 and Equation (20b) factors out common terms to simplify the equation.

Accordingly, the reflected RF calibration signal 451 can be modeled as a second transmitted RF signal of unknown phase and magnitude transmitted from port B. As shown in FIG. 4D, a coupler 489 can couple a portion of the reflected RF calibration signal 451 into the signal chain of each of the antenna calibration unit cells 409-1, 409-2, 409-3. Plot 491 illustrates an initial state of the reflected RF calibration signal 451 as if transmitted from the port B. As described above with respect to Equations (5) and (6), each section of the calibration line 467 can contribute an attenuation factor $\alpha$ and a phase shift $\theta$. Similar to the expression of Equation (6), the magnitude and phase values in Equations (20a), (20b), and (21) are expressed relative to the measurement value M(B1).

As a result of the additional variable R appearing in the Equations (19a)-(21), the technique shown above with respect to Equations (1)-(12) utilizing four total measurements to calibrate antenna calibration unit cells lacks sufficient equations to solve for all of the unknowns. In some cases, more than four equations can be considered to solve for R.

Although the examples of FIGS. 4A-4B and 4D illustrate calibration configurations including three antenna calibration unit cells 409, in some implementations, more antenna calibration unit cells 409 can be calibrated at once using a single calibration line 467. For example, the embodiments of FIGS. 3A-3C show 32 antenna calibration unit cells 409 associated with a single calibration line 367/367'. The number of antenna calibration unit cell 409 calibrated with a single calibration line 467 can depend on the total attenuation of the RF calibration signal 401 over the length of the calibration line 467. As the length of the calibration line 467 and/or the attenuation of RF calibration signal 401 traversing the calibration line 467 increases, the strength of the RF calibration signal 401 received at the antenna calibration unit cell 409 far away from the transmitting measurement port A can become too small to differentiate from noise. Because the RF calibration signal 401 travels the full length of calibration line 467 before reaching port B, the RF calibration signal 401 arriving at port B will be attenuated by a factor greater than $\alpha^n$ where n is the total number of antenna calibration unit cells 409 along the calibration line 467. Accordingly reflected RF calibration signal 451 may most strongly affect the coupled RF signal received by antenna calibration unit cell 409 closest to port B, while having a relatively small effect on the antenna calibration unit cells 409 closest to port A.

Assuming finite reflection at port A and not port-B is practically valid only when the antenna cells that are closer to the port A are being considered; reflection from port B would have to travel a long distance along the calibration-lines to affect the measurements on those antennas and therefore assumed to be very small or non-existent. So, using equations 19-21 and antenna elements closer to port A are enough to estimate the reflection from port A. The same procedure can be applied to port B, when the antennas closer to port B are being measured. In this case, port A side has no reflection since the actual/physical measurement port A is far away on the other side of the calibration lines and only the reflection from port B will have impact. Then the equations 19-21 could be modified to accommodate reflection on port B side and not on port A side. Of course, one can always assume finite reflection on both sides simultaneously, which does not cause any fundamental change in the solution approach, but increases the complexity of the procedure. The exact process to be chosen will be a matter of optimization of the mathematical solver, which is beyond the scope of this application.

Plots 491-493 illustrate the changes in phase and magnitude of the reflected RF calibration signal 451 starting at the point of reflection and traversing down the calibration line 467. Plot 491 illustrates the RF calibration signal as it reaches the coupler 489 of the unit cell 409-1. As indicated by curled lines in the plots 491-493 the phase axis values continue from the unwrapped phased value of the RF calibration signal 401 after the RF calibration signal 401 of FIG. 4A reaches port B. In some cases, using a bidirectional coupler 499 with symmetric coupling in each direction of propagation of the RF calibration signal 401 (and reflected RF calibration signal 451), the phase shift θ and attenuation a of the reflected RF calibration signal 451 between each unit cell 409-1 through 409-3 can be assumed to be identical. In the illustrated embodiment, the phase shift and attenuation of the reflected RF calibration signal 451 between successive plots 491-493 is the same as phase shift and attenuation relationships between successive plots 440-443 of FIG. 4B.

Figure 4E:
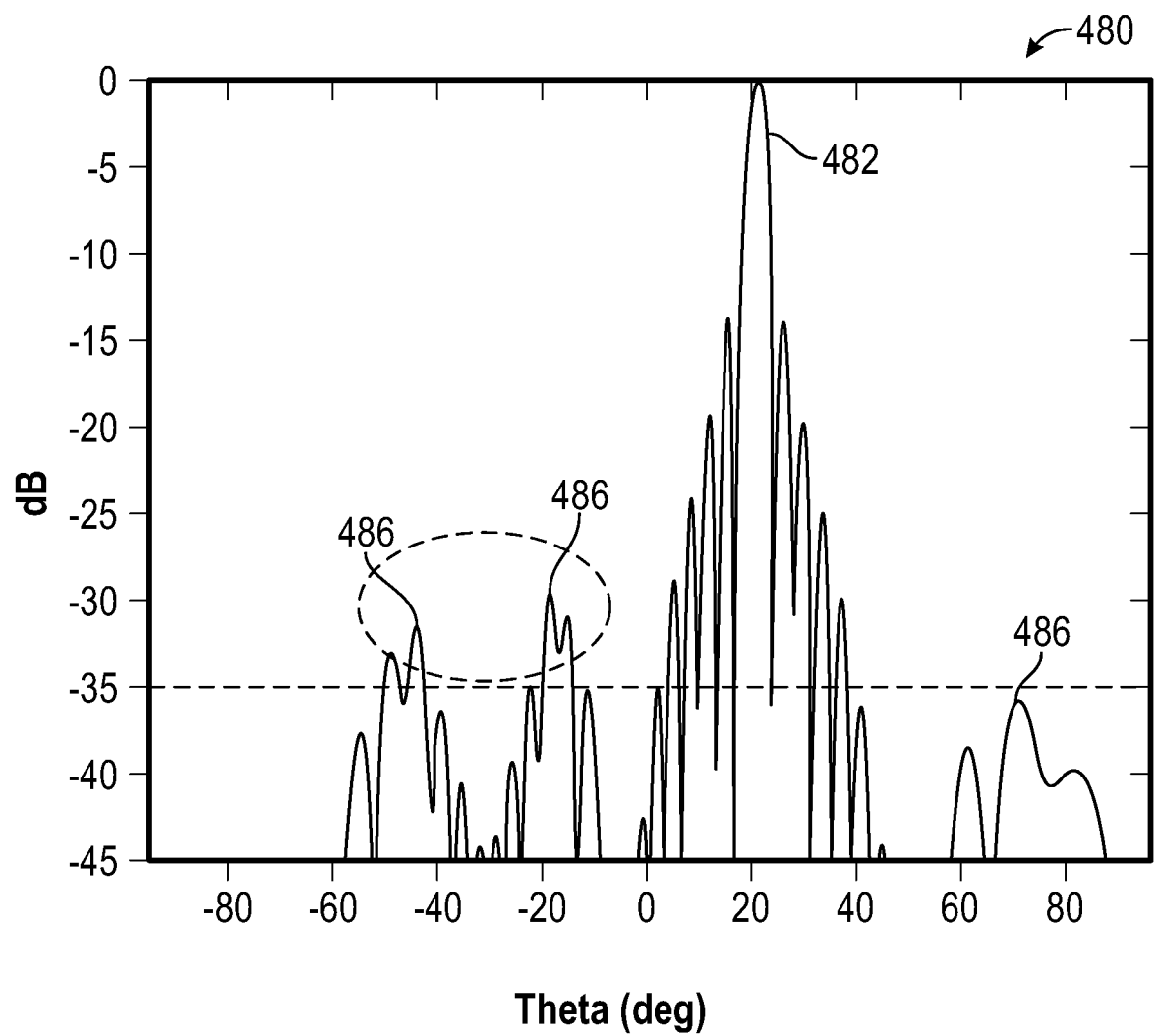
FIG. 4E is an exemplary plot showing main lobes and side lobes of an exemplary calibrated phased array antenna with a mismatched calibration line termination, in accordance with some examples.

FIG. 4E illustrates an example plot 480 of a normalized array pattern for a simulated 32-element (e.g., N=32) phased array antenna calibrated according to the calibration technique described above with respect to FIG. 4A and FIG. 4B. In the simulated 32-element phased array antenna, port A was terminated with a mismatched load resulting in a −11 dB maximum magnitude of R. However, simulated calibration was performed using Equations (1)-(12), which include the assumption that the inactive port is perfectly terminated during measurement. In the illustrated plot 480, the main lobe 482 shows a peak at a selected steering angle of 20 degrees from broadside. The plot 480 further illustrates side lobes 486 at approximately −50 degrees, −15 degrees from broadside, that have about −30 dB magnitude relative to the peak of the main lobe 482. As shown in FIG. 4E, the effect of a mismatched termination at port A can result in degraded performance of the phased array antenna system. The angle of one or more of the higher sidelobes 486 can depend on the electrical length θ of the calibration line sections.

In the illustrated example, the array pattern shown in plot 480 can be viewed as a superposition of a designed array pattern (e.g., based on the excitation taper and/or antenna lattice design) and an array pattern corresponding to a systematic phase and/or magnitude error in individual antenna element excitations, caused by the assumption that the ports are perfectly terminated calibration. In some cases, this kind of calibration error can be avoided by using Equations (15)-(22) instead of (1)-(12), in case the RL at calibration ports A & B is not high enough (for the side lobe level requirements of the array). The importance of having a low RL on calibration ports and/or using Equations (15)-(22) becomes increases as the loss per unit length along the calibration lines 467 becomes smaller (meaning α is almost 1). As noted above, this can occur when the calibration lines are implemented with ultra low loss PCB laminates, air-filled waveguides, or any other low loss implementation. In such a scenario, the reflected calibration signal from either port A or port B can travel a long distance away from the point of reflection and can affect the measurements of more antenna elements when compared to a lossy calibration line.

Antenna-to-Antenna Coupling

As described above, the Equations (15)-(22) can remove the effects of reflections from the calibration ports on the accuracy of determining the correct calibration factors to perform calibration on the signal chains of the antenna elements (e.g., antenna elements 213, 214) of a phased array antenna. However, in some implementations, Equations (15)-(22) may not account for other sources of RF signals that may affect the accuracy of determining the correct calibration factors, especially at the edge elements along calibration lines (e.g., calibration line 267). For example, antenna-to-antenna coupling between antenna elements (e.g., antenna elements 213, 214) of the phased array antenna may result in signals injected onto the calibration lines that may not be accounted for by any of the Equations (1)-(22) above.

Referring to FIG. 2C the calibration line 267 couples to the feed lines 263 with bidirectional couplers 275. In some cases, the coupled calibration signal will reach both the LNAs (224) as well as the antenna elements 213, 214. When the coupled calibration signal reaches the antenna, a portion of the signal may be reflected from the antennas and this reflected signal can then reach the LNAs 224 with a different phase and/or magnitude. As a result, the coupled calibration signal received at the LNAs can include a component that is not accounted for in Equations (1)-(22). Because of attenuation (e.g., α) of the calibration signal travelling along the calibration line 267, the calibration lines excite the antenna elements 213, 214 with an amplitude taper and uniform phase separation equal to the phase shift of each calibration line 267 section (e.g., θ), the reflection from the antennas will be similar to "active" reflection at the ports of a series-fed one-dimensional phased array antenna. This active impedance (sometimes referred as scan impedance) of antenna elements will be mostly uniform across the calibration line 267, except at the edges of the phased array. As a result, the modification of the coupling phase and/or magnitude to the corresponding LNAs 224 will also be different for the edge elements. These phase modifications are not accounted for in Equations (1)-(22) and as a result there will be errors in the calculated magnitude (m1, m2, . . . , mN) and phase (T1, T2, . . . ,TN) of the antenna elements 213, 214.

Figure 4F:
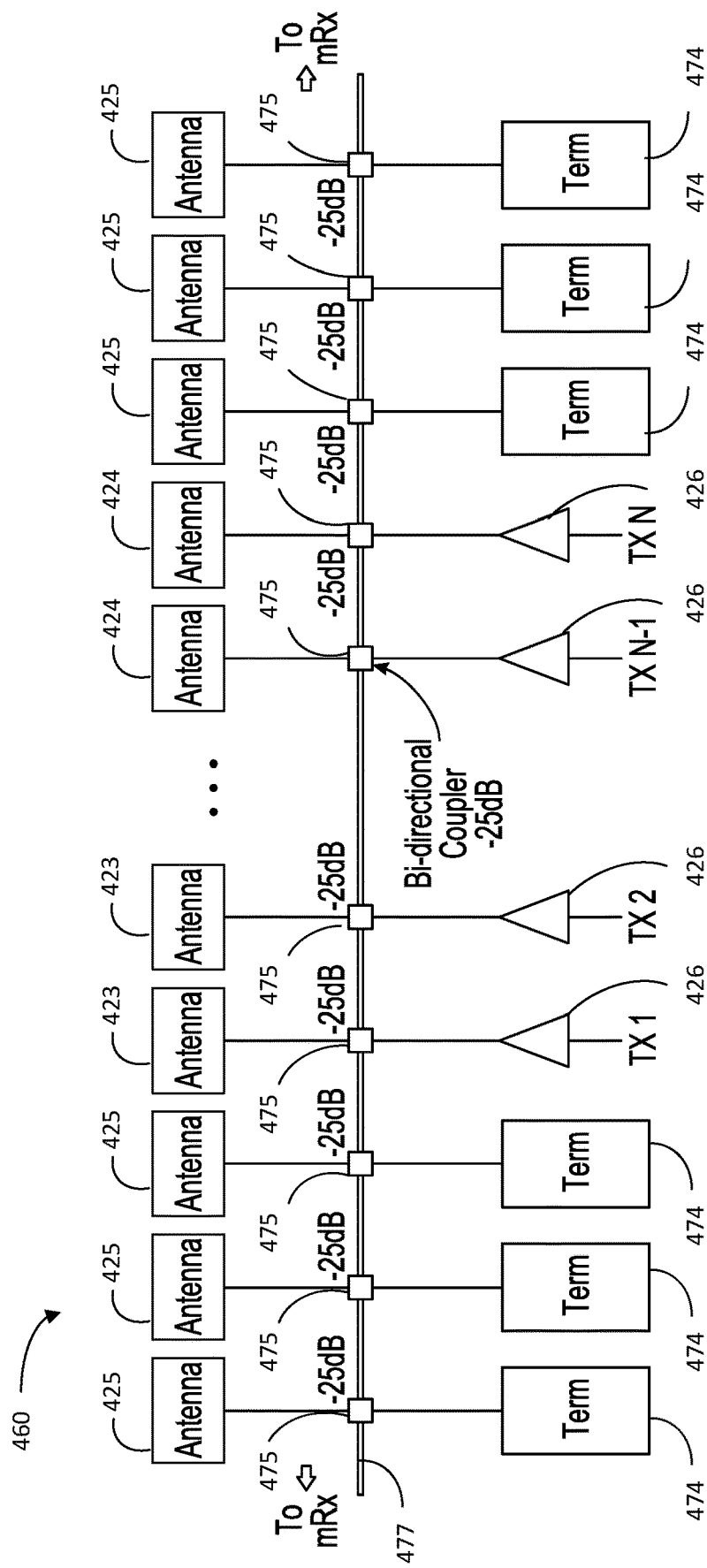
FIG. 4F is an exemplary illustration of a calibration configuration utilizing inactive antenna elements, in accordance with some examples.

Referring to FIG. 4F, an example antenna array 460 illustrates the use of terminated antenna elements 425 (also referred to as dummy antenna elements herein) to mitigate non-uniformity across the active antenna elements 423, 424 of the antenna array 460. In the illustrated example of FIG. 4F, a calibration line 477 is connected between two measurement receive (mRx) sections of a transmit phased array antenna. The calibration line 477 can correspond to the calibration line 267 of FIG. 2C and the active antenna elements 423, 424 can correspond to antenna elements 213, 214, respectively. Similar to the example of FIG. 2C, the calibration line 477 is coupled by couplers 475 to feed lines of the active antenna elements 423, 424. As illustrated in FIG. 2F, the calibration line 477 is also coupled by couplers 475 to feed lines of the inactive antenna elements 425. In the illustrated example, three inactive antenna elements are included at each end of the calibration like 477. Fewer or more inactive antenna elements 425 at the ends of the calibration line can be used without departing from the scope of the present disclosure. In some implementations, the inactive antenna elements 425 can be terminated to terminations 474. As illustrated, there can be a number N of active antenna elements 423, 424 each one driven by an amplifier 426 (e.g., a power amplifier). In the example of FIG. 4F, each of the couplers 475 has a coupling level of −25 dB, uniformly for both the active antenna elements 423, 424 and the inactive antenna elements 425.

Figure 4G:
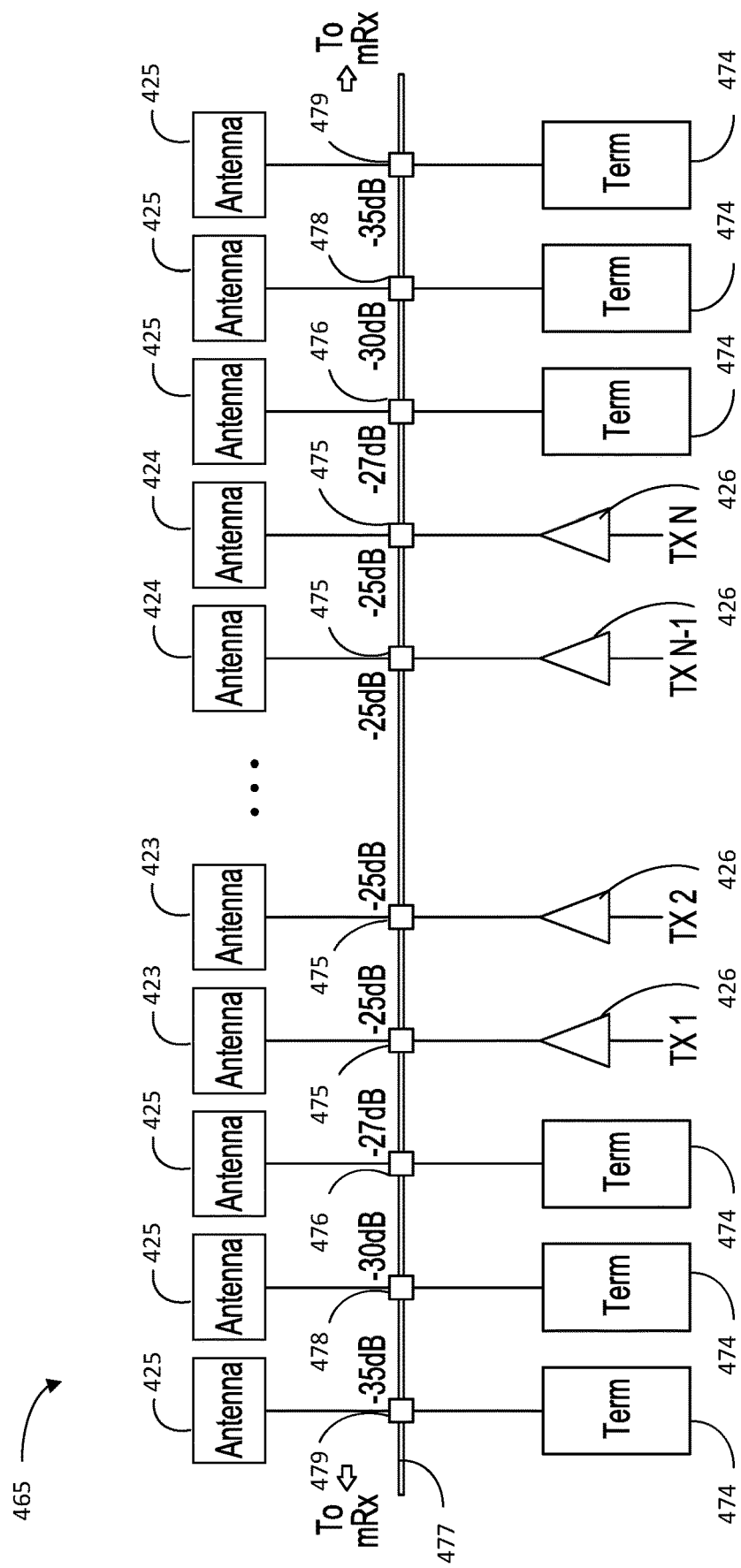
FIG. 4G is another exemplary illustration of calibration configuration utilizing inactive antenna elements, in accordance with some examples.

Referring to FIG. 4G, another example array 465 the utilizes a similar configuration of calibration line 477 coupled to feed lines of active antenna elements 423, 424 and inactive antenna elements 425. The active antenna elements 423, 424 are driven by amplifiers 426 (e.g., PAs). Similar to FIG. 4F, the feed lines of the active antenna elements 423, 424 are coupled to the calibration line 477 by couplers 475. In one illustrative, the coupler 475 can be bidirectional couplers with a coupling factor of −25 dB. In contrast to FIG. 4F, the feed lines of the inactive antenna elements 425 are coupled to the calibration line by couplers 476, couplers 478, and 479. The feed lines of the inactive antenna elements 425 closest to the active antenna elements 423, 424 at either end of the line are coupled to the calibration line 477 by couplers 476. The feed lines of the inactive antenna elements 425 closest to the receive calibration (mRx) ports at either end of the line are coupled. The feed lines of the remaining inactive antenna elements 425 are coupled to calibration line 477 by couplers 478. In some implementations, the coupling factor to the couplers 476, 478, 479 can be tapered to reach a minimum value at the far edges of the calibration line. In one illustrative example, the couplers 476 have a coupling factor of −27 dB, the couplers 478 have a coupling factor of −30 dB, and the couplers 479 have a coupling factor of −35 dB as shown in FIG. 4G. In some cases, tapering the coupling factor to the edge antenna elements can provide a similar effect to an excitation amplitude taper that can be used to improve side lobe signal level. In addition or alternatively, tapering the coupling factor can stabilize the "active impedance" on the active antenna ports due to the calibration lines, hence improve the uniformity in the coupling factor.

In addition or as an alternative to the configurations shown in FIGS. 4F and 4G, active reflection can be mitigated by isolating the active antenna elements 423, 424 from the RF signals transmitted on the calibration line. FIG. 2D above provides one illustrative example configuration for isolating the active antenna elements 423, 424 and the inactive antenna elements 425 utilizing two-stage coupling. In some cases, by using a two-stage coupling configuration, the RF signals used for calibration can be directed to the LNAs (e.g. LNAs included in FEM chips 295 of FIG. 2D) without being transmitted over the air by the active antenna elements 423, 424 and/or the inactive antenna elements 425 and coupling back into nearby antenna elements. In some cases, a portion of the RF calibration signals coupled from the calibration line may still reach the antenna elements 423, 424 and/r the inactive antenna elements 425 due to RL of the LNAs (e.g., LNAs included in FEM chips 295 of FIG. 2D).

Calibration Considerations During Panel Operation

Using the techniques described herein, antenna elements of a phased array antenna can be calibrated during operation. In some cases, while at least one antenna element is being calibrated, other antenna elements can be used to transmit and/or receive a data beam of non-calibration data. In the case of a transmitting (Tx) phased array antenna (see FIGS. 2B. 3A), one antenna element associated with a calibration line (e.g., 267, 367) may be configured to transmit a calibration signal while the remaining antenna elements associated with the same antenna element may be configured to transmit a data beam of non-calibration data. Although the calibration signal may be the only signal of interest to be read out at calibration receive (mRx) sections (e.g., calibration receive (mRx) sections 232 of FIGS. 2B,3A) of DBFs (e.g., DBFs 207, 208 of FIGS. 2B, 3A) coupled to the calibration line (e.g., calibration lines 267, 367 of FIGS. 2B, 3A, respectively), the data beam transmitted by the remaining antenna elements will also couple to the calibration line. The coupled signals from the antenna elements transmitting the data beam will appear as interference in the measurement of the calibration signal at the calibration receive (mRx) sections. In some embodiments, to limit the signal to interference and noise ratio (SINR) at the calibration receive (mRx) sections, the transmitting (Tx) phased array antenna can be configured to avoid scanning in the same direction as the beam direction of the leaky wave antenna formed by the calibration line as discussed above. For example, if the transmitting (Tx) phased array antenna scan direction matches the leaky wave antenna scan direction, the coupled portion of the transmitted (Tx) data beam from each antenna element can constructively add up in the measurement port mRx, and the resulting interference can overwhelm the calibration signal coupled from the antenna element to be calibrated.

In some embodiments, the scanning direction of the transmitting (Tx) phased array antenna can be monitored and the calibration procedure might be performed only when the (TX) phased array is not radiating in the scanning direction of the leaky wave antenna during calibration.

Equations (23)-(25) below illustrate the effects of the leaky wave antenna structure of the calibration line on SINR:

$$A_{cal} = G\alpha^k e^{-j(k\theta+\gamma)} \quad (23)$$

$$A_{int} = \sum_{\substack{m=1 \\ m \neq k}}^{N} \alpha^n e^{-jn(\theta-\beta)} \quad (24)$$

$$\text{maximize}\left(\frac{|A_{cal}|^2}{|A_{noise}|^2 + |A_{int}|^2}\right) \quad (25)$$

Where G is the processing gain of the RF calibration signal relative to the gain (of the coupling path from the related antenna to the mRx port) of the transmitting (Tx) antenna elements transmitting the data beam, N is the number of antenna elements associated with the calibration line, k is the index of the antenna element being measured, m is the index of every other antenna element associated with the same calibration line as antenna element k, such that m=1, 2, ... k−1, k+1, k+2 ... N, θ is the phase contribution of each calibration line section, β is the progressive phase shift between two successive transmitting (Tx) antenna elements along the calibration line, γ is the phase of the element k, and $A_{noise}$, $A_{cal}$, $A_{int}$ are the signal levels due to noise, the calibration signal, and the interference signals (from the transmitting (Tx) antenna elements), respectively. In some cases, the phase γ can be referenced as zero, as it is not relevant for the calculation of SINR.

When θ=β+p*(2π), where p, is an integer, as shown in Equation (25), the term $A_{int}$ can take its largest value, meaning that the SINR for calibration measurements is at a minimum. On the other hand, peak values for SINR can be achieved for values of β that make the term $A_{int}$=0. In such examples, the Tx elements (e.g., with index n) transmitting a data beam may not produce any interference in the calibration measurement of the Tx element k. In some cases, a phased array antenna system can be trained to avoid performing calibration of antenna elements when the steering direction of the data beam is at (or near, e.g., within 2 degrees, 5 degrees, or any chosen number of degrees) a minimum SINR value of Equation (25) and/or can perform calibration measurements only when the steering direction of the data beam is at (or near) a maximum SINR value of Equation (25). In such an implementation, the amount of time required to perform antenna element calibration may be increased due to calibration being limited to specific calibration intervals (e.g., when the beam steering direction is within a specific range or group of ranges) rather than being continuous. In some cases, the calibration accuracy may be improved due to better SINR values during the calibration measurements.

In some embodiments, the calibration line sections (e.g., 387 of FIG. 3A) can be designed so that the steering direction of the leaky wave antenna is always outside of the functional transmitting (Tx) phased array antenna scan area. In such an example, there is no need to monitor the steering direction of the transmitting (Tx) phased array antenna since the scanning direction of the leaky wave antenna and the functional array are designed not to coincide.

Similar calculations to those shown in Equations (23)-(25) also apply to a receiving phased array antenna (e.g., as shown in FIGS. 2C and 3B-3C). In some embodiments, an RF calibration signal transmitted by calibration transmit (mTx) ports (e.g., calibration transmit (mTx) sections 231 of FIGS. 2C and 3B-3C) can interfere with receiving (Rx) antenna elements that are receiving a data beam during the calibration of one or more antenna elements associated with the same calibration line (e.g., calibration line 267 of FIG. 2C, calibration line 367, 367' of FIGS. 3B, 3C, calibration line 467 of FIGS. 4A-4B and 4D). Equations (23)-(25) can also be used to determine the scan directions of maximum SINR to either avoid by not performing calibration when the scan direction of the receiving (Rx) phased array antenna is within 2 degrees (or 5 degrees, or any other chosen number of degrees), and/or by ensuring that the scan direction of the leaky wave antenna is outside of the range of scan directions of the functional receiving (Rx) phased array antenna.

Calibration of a Phased Array Antenna System

Figure 5A:
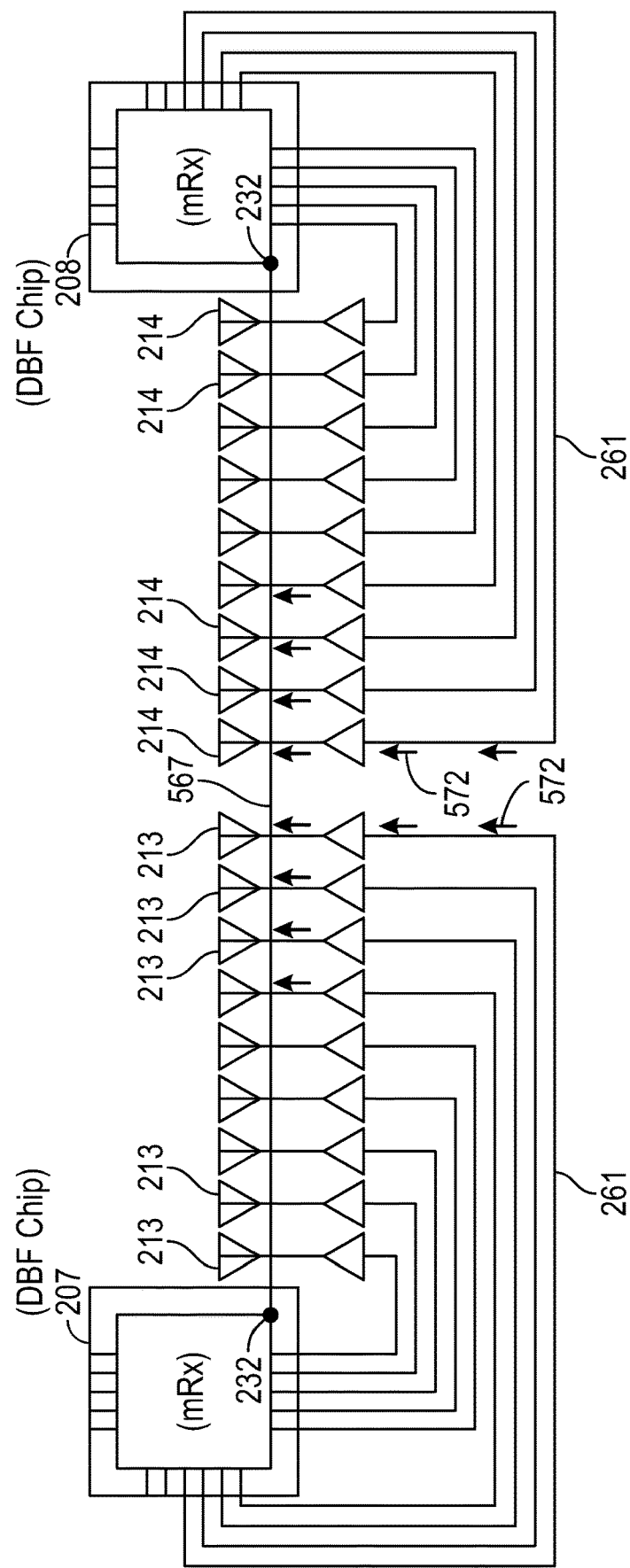
FIG. 5A is an exemplary simplified schematic illustrating a transmit (Tx) phased array antenna and self-calibration configuration, in accordance with some examples.
Figure 5B:
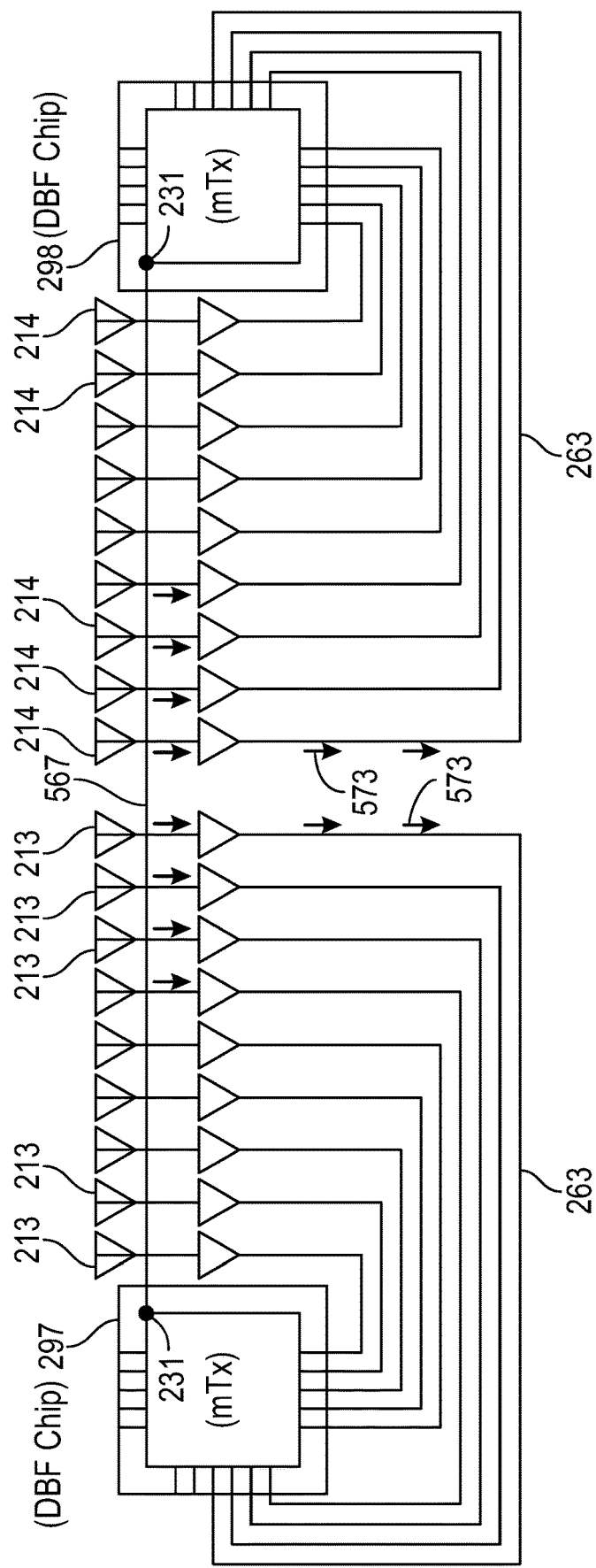
FIG. 5B is an exemplary simplified schematic illustrating a receiving (Rx) phased array antenna and self-calibration configuration, in accordance with some examples.

FIGS. 5A and 5B illustrate for in-line self-calibration configurations for a transmitting (Tx) phased array antenna and a receiving (Rx) phased array antenna, respectively. In the case of calibrating a Tx phased array with the mRx sections 232 of DBFs 207, 208 (see FIG. 2B), FIG. 5A illustrates the mode of operation for DBFs 207, 208 and FEMs 215 and the signal flow indicated by arrows 572 along different paths. As illustrated, all the FEMs 215 are operated in Tx mode, and the mRx section 232 of a first measurement DBF of the DBFs 207, 208 is configured to measure coupling signals coupled between the signal chains of the antenna elements 213, 214 and the calibration line 567. While the first mRx port is configured to measure coupling signals, the second calibration receive (mRx) section of the DBFs 207, 208 can be off or in idle mode.

As shown in FIG. 2B, an attenuator ATT included in the calibration receive (mRx) section 232 can prevent the calibration receive (mRx) section 232 from being saturated by Tx signals coupled to the calibration line 567 at a signal level configured for over the air data transmission. In addition, the coupling between calibration line 567 and the signal chain of the antenna elements can be a weak coupling (e.g., −20 dB or less) as described above with respect to FIGS. 3A-3C, thereby further preventing saturation of the mRx section 232 by the RF signals.

In the illustrated example, all of the RFIOs (e.g., RFIO lines 235 of FIG. 2B) are in Tx mode. During calibration, each of the antenna elements 213, 214 can be stimulated by corresponding Tx RF sections 227 (see FIG. 2B) of DBFs 207, 208 to radiate RF calibration signals, sequentially, in parallel, or any combination thereof. For example, the sequence of transmitting calibration signals can depend on how many independent CDMA signals can be created (e.g., by CDMA code generator 241 of FIG. 2B) and/or processed (e.g., in calibration receive (mRx) sections 232 of FIG. 2B) in the DBFs 207, 208 at a time. In some cases, one or more single tone calibration signals may be used (e.g., a continuous wave signal). In such cases, the number of independent tones that can be generated/processed simultaneously can affect the sequence of transmitting calibration signals in a similar way. The RF calibration signals transmitted by the antenna elements 213, 214 couple (e.g., by bidirectional couplers 499 of FIGS. 4A-4B, couplers 489 of FIG. 4D, couplers 1089 of FIG. 10) to the calibration line 567 and the coupled signal can traverse the calibration line into the mRx section 232 (then calibration computing section) of a first DBF of DBFs 207, 208 over the traces 261 to complete the measurement and acquire a first set of coupling data for a signal chain of each antenna element 213, 214. During measurement of the coupled RF calibration signals by the calibration receive (mRx) section 232 of the first DBF of DBFs 207, 208, the second DBF of DBFs 207, 208 can be off or in idle mode. As used herein, the DBF of DBFs 207, 208 that is measuring the coupled RF calibration signal is referred to as the active DBF while the DBF of DBFs 207, 208 that is idle is referred to as the inactive DBF.

After a first set of measurements is collected by a first mRX port of the DBFs 207, 208 while the second mRx port is idle, the first and second DBFs can reverse roles and the second mRx port can capture coupling data between each of the antenna elements 213, 214 and the calibration line 567 while the calibration receive (mRx) section 232 of the first DBF is terminated. Similar to the first set of measurements, each of the antenna elements 213, 214 can be stimulated by corresponding Tx RF sections 227 (see FIG. 2B) of DBFs 207, 208 to radiate RF calibration signals, sequentially, in parallel, or any combination thereof. For example, the sequence of transmitting calibration signals can depend on how many independent CDMA signals can be created (e.g., by CDMA code generator 241 of FIG. 2B) and/or processed (e.g., in calibration receive (mRx) section 232 of FIG. 2B) in the DBFs 207, 208 at a time. The RF calibration signals transmitted by the antenna elements 213, 214 couple (e.g., by bidirectional couplers 499 of FIGS. 4A-4B, couplers 489 of FIG. 4D, couplers 1089 of FIG. 10) to the calibration line 567 and the coupled signal can traverse the calibration line into the mRx section 232 (then calibration computing section) of a corresponding DBF 207, 208 over the traces 261 to complete the measurement and acquire a second set of coupling data for a signal chain of each antenna element 213, 214.

In some embodiments, once the first and second sets of coupling data are obtained, the magnitude and phase offsets between the antenna elements 213, 214 can be determined. In some embodiments, the magnitude and phase offsets between antenna elements 213, 214 can be calibrated according to Equations (1)-(12). For example, in some embodiments, if the inactive DBF of DBFs 207, 208 is terminated with a sufficiently well-matched termination, the reflections can be ignored. In some cases, the sufficiency of the termination can be determined based on the side lobe levels resulting from calibration using the technique of Equations (1)-(12). For example, if the side lobe levels resulting from calibration using the assumptions of Equations (1)-(12) exceed a target side lobe level (e.g., −20 dB, −35B, or the like), then the reflections may be ignored. However, in some cases, the magnitude and phase offsets between antenna elements 213, 214 can be calibrated according to Equations (15)-(22). For example, Equations (15)-(22) can be used if the calibration will also account for reflections from a mismatched calibration line termination as described with respect to FIG. 4D and/or if a coupler (e.g., coupler 489 of FIG. 4D) with different coupling coefficients depending on the direction of travel of the RF calibration signal (e.g., a directional coupler) is used for coupling the calibration line to the signal chains of the antenna elements being calibrated.

In the case of calibrating an Rx phased array antenna with the mTx sections 231 of DBFs 297, 298 (see FIG. 2C), FIG. 5B illustrates the mode of operation for DBFs 297, 298 and FEMs 295 and the signal flow indicated by arrows 573 along different paths. As illustrated, all the FEMs 295 are in Rx mode, and the calibration transmit (mTx) section 231 of a first DBF of the DBFs 297, 298 is configured to transmit an RF calibration signal onto the calibration line 567. While the calibration transmit (mTx) section of the first DBF is configured to transmit coupling signals, the second DBF of the DBFs 297, 298 can be terminated. Although a matched termination can be preferable for the DBF that is not performing measurements, in practice a perfect match may not always be achieved. In such cases, a calibration model that accounts for reflections at the end of the calibration line can be used.

As shown in FIG. 2C, an amplifier included in the calibration transmit (mTx) section 231 of the DBFs 297, 298 can produce an RF calibration signal with a magnitude that does not saturate the Rx RF sections 288 (see FIG. 2C) of the DBFs 297, 298. In some implementations, the amplifier included in the calibration transmit (mTx) section 231 can have a tunable gain and/or attenuation. In the illustrated example, all of the RFIOs (e.g., RFIOs 277 of FIG. 2C) of DBFs 297, 298 are in Rx mode. During calibration, the signal chain of each of the antenna elements 213, 214 will be coupled by a coupler (with the RF calibration signal transmitted by the calibration transmit (mTx) section 231 of the first DBF of the DBFs 297, 298 and read out by the Rx RF sections (e.g., Rx RF sections 288 of FIG. 2C) of both DBFs 297, 298 sequentially, in parallel, or any combination thereof. The RF calibration signals can traverse the calibration line 567, coupling (e.g., by bidirectional couplers 499 of FIGS. 4A-4B, couplers 489 of FIG. 4D, couplers 1089 of FIG. 10) to each of the signal chains of the antenna elements 213, 214 along the calibration line 567, as illustrated in FIGS. 3A-3C. The coupled RF calibration signal from each signal chain of antenna elements 213, 214 can subsequently be routed by traces 263 into the Rx RF sections 288 of the DBFs 207, 208 to complete the measurement and acquire a first set of coupling data. As noted above, the coupling between calibration line 567 and the signal chain of the antenna elements can be a weak coupling (e.g., −20 dB or less) thereby further preventing saturation of the Rx RF sections 288 by the transmitted calibration signals.

After a first set of measurements is obtained based on transmission of the RF calibration signal by a first DBF of the DBFs 297, 298 while the mRx section 232 of the second DBF is idle, the first and second DBFs can reverse roles and the second DBF can transmit an RF calibration signal on the calibration line 567 while the mRx section 232 of the first DBF is idle. Similar to the first set of measurements, the signal chain of each of the antenna elements 213, 214 will be coupled (e.g., by bidirectional couplers 499 of FIGS. 4A-4B, couplers 489 of FIG. 4D, couplers 1089 of FIG. 10) with the RF calibration signal transmitted by the calibration transmit (mTx) section 231 of the second DBF of the DBFs 297, 298 and read out by the Rx sections of both DBFs 297, 298 sequentially, in parallel, or any combination thereof. In some embodiments, once the first and second set of measurements are obtained, the magnitude and phase offsets between the antenna elements 213, 214 can be determined. In some embodiments, the magnitude and phase offsets between antenna elements 213, 214 can be calibrated according to Equations (1)-(12). For example, in some embodiments, if the inactive DBF of DBFs 297, 298 is terminated with a matched termination while the active DBF of DBFs 297, 298 is transmitting, the reflections can be ignored. In some embodiments, the magnitude and phase offsets between antenna elements 213, 214 can be calibrated according to Equations (15)-(22) and/or additional techniques described with respect to FIG. 4D if the calibration will also account for reflections from a mismatched calibration line termination and/or if a coupler with different coupling coefficients depending on the direction of travel of the RF calibration signal (e.g., an anisotropic coupler) is used for coupling the calibration line to the signal chains of the antenna elements being calibrated.

In addition, in some embodiments, a transmitting and receiving (Tx/Rx) phased array antenna can include transmitting (Tx) (e.g., transmit section 221 of FIG. 2B), receiving (Rx) (e.g., receive section 222 of FIG. 2C), calibration transmit (mTx) (e.g., calibration transmit section 231 of FIG. 2C) and calibration receive (mRx) sections (e.g., calibration receive section 232 of FIG. 2B) in a single Tx/Rx DBF. In some embodiments, calibration line 267 can couple to a shared calibration I/O port (not shown) of a Tx/Rx DBF that is shared by both the calibration transmit (mTx) section and the calibration receive (mRx) section. Example techniques for sharing the calibration I/O port include, without limitation, switching and power divider/combiners.

In some embodiments, one or more DBFs of the DBF lattice 206 (see FIG. 2D) may be configured to operate in half duplex mode, in which a half duplex mode DBF is capable of receiving or transmitting RF signals/waveforms but not both simultaneously. In some embodiments, a Tx/Rx DBF operating in a half-duplex mode can be calibrated according to the calibration configuration of FIG. 5A when operating in a transmitting configuration and according to the calibration configuration of FIG. 5B when operating in a receiving configuration.

Antenna Assembly Stack

Figure 6A:
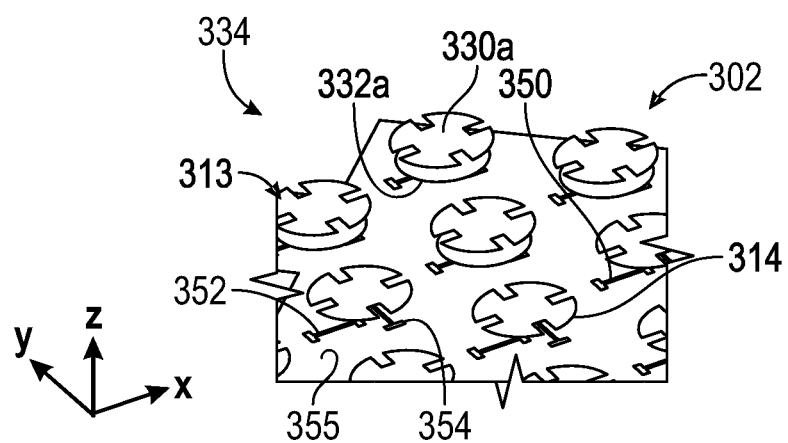
FIG. 6A is a close-up isometric view of an antenna stack assembly in accordance with some embodiments of the present disclosure.
Figure 6B:
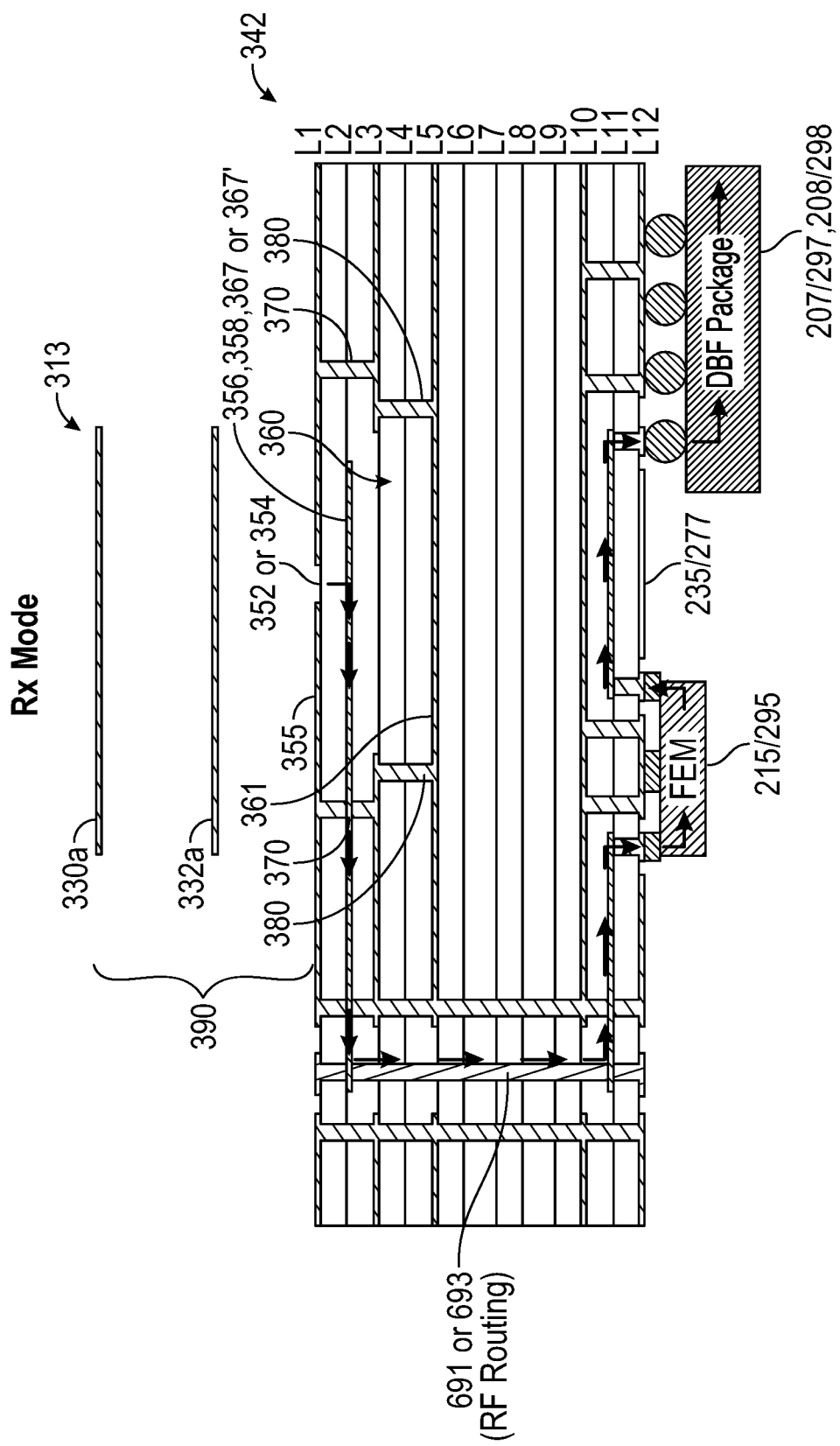
FIG. 6B is a close-up cross-sectional view of an antenna apparatus including a twelve-layer PCB assembly stack-up and DBF, FEM and antenna cavity routing inside PCB assembly layers in accordance with some embodiments of the present disclosure.

Referring to FIGS. 6A and 6B, an antenna stack assembly 334 will now be described in greater detail. In the illustrated embodiment, the antenna array is a stack patch antenna assembly designed to meet various goals of antenna performance, heat transfer, and manufacturability. A patch antenna is generally a low-profile antenna that can be mounted on a flat surface, including a first flat sheet (or "first patch") of metal mounted over, but spaced from, a second flat sheet (or "second patch") of metal, the second patch defining a ground plane. The two metal patches together form a resonant structure.

Referring to FIG. 6A, in a close-up isometric view of individual antenna elements 313, 314, the patch antenna assembly 334 includes upper and lower antenna patches 330a and 332a spaced from each other to achieve the desired tuning of the patch antenna assembly 334. Antenna elements 313, 314 can correspond to antenna elements 213, 214 shown in FIGS. 2A through 2E. The individual antenna elements 313, 314 shown in FIG. 6A are part of a plurality of antenna elements forming an array of antenna elements (see FIG. 2A).

As seen in FIG. 6A, the individual lower patch layer elements 332a are configured to align with the individual upper patch antenna elements 330a, for example, in a vertical stack. The lower patch antenna elements 332a may be the same as or similar in shape and configuration as the upper patch antenna elements 330a. In the illustrated embodiment, the upper patch elements 330a are generally circular in configuration and include a plurality of slots for antenna polarization or tuning effects. The lower patch antenna elements 332a are generally circular in configuration.

As seen in FIG. 6A the upper patch antenna layer 330 is spaced from the lower patch antenna layer 332 using an antenna spacer (not shown). Each of a plurality of apertures in the antenna spacer may include a vertical pathway to align with each lower patch element 332a (at the bottom) and each upper patch antenna element 330a (at the top) to define a plurality of individual antenna elements 313, 314 in the antenna lattice 302.

The upper antenna patch layer 330 and the lower patch antenna layer 332 may be formed on standard PCB layers with etched copper or other suitable substrates (e.g., mylar with printed conductive ink). In one embodiment, the upper and lower patch antenna layers 330 and 332 are PCB substrates having a respective plurality of antenna patch elements 330a and 332a. The features of the upper and lower patch antenna layers 330 and 332 may be formed by suitable etching or printing process to obtain the desired conductive patterns and shapes. In some embodiments, the lower patch antenna layer 332 may include a grid (not shown) of conductive material between lower patch antenna elements 332a to create an anisotropic dielectric layer. In an alternate embodiment, the patches may be printed, for example, using a conductive ink, on the patch layers.

An array of multiple patch antennas on the same substrate can be used to make a phased array antenna for which the antenna beam can be electronically steered. The antenna stack assembly 334 of FIG. 6A provides only one illustrative example antenna system that can be included in a phased array antenna that utilizes the calibration techniques described herein. Other types of antenna elements can be used without departing from the scope of the present disclosure.

In some cases, the patch antenna assembly 334 may be separate from but mechanically and electrically supported by a printed circuit board (PCB) assembly 342. The PCB assembly 342 is generally configured to connect electronic components using conductive tracks, pads and other features etched from one or more sheet layers of copper laminated onto and/or between sheet layers of a non-conductive substrate. The PCB assembly 342 may be a single or multilayer assembly with various layers copper, laminate, substrates and may have various circuits formed therein. In FIG. 6A, the top layer 355 of the PCB assembly 342 is shown including the slot feed 350.

In an example embodiment, a continuous dielectric layer (not shown) provides an electrical insulator between the patch antenna assembly 334 and the PCB assembly 342. The dielectric layer may have a low dielectric constant (which may be referred to as relative permittivity), for instance in the range of about 1 to about 3, or about 2 to about 3 at room temperature. When the dielectric constant is high, for example, higher than 3, it may create a scan angle problem for the phased array antenna, unless the antenna density is also increased.

In an alternate embodiment, a continuous layer dielectric layer may be replaced with an array of discrete spacers, such as circular puck spacers. The puck spacers may be positioned under the individual stacked patch antenna elements. Puck spacers have overall less material than a continuous dielectric layer, resulting in less overall dielectric loading and allowing for a larger scan angle. Puck spacers may be formed from suitable materials, such as plastic, to provide a suitable dielectric constant and low loss tangent to conform with the performance of the patch antenna assembly. As one non-limiting example, the puck spacers may be formed from a polycarbonate plastic.

In typical PCB construction, individual PCB layers are made up of fiberglass material surrounding a pattern of copper traces defining electrical connections. The copper and fiberglass having similar CTE values and generally have no purposeful air gaps within the structure. Therefore, the various layers defining a multi-layer PCB can be laminated together under high heat and pressure conditions. In typical patch antenna assemblies, the upper patch layer, the lower patch layer, and the spacing therebetween may be formed using a conventional PCB lamination process.

As described above, materials used in the spacing components of the antenna stack assembly 334 may include plastic materials. Suitable adhesives in accordance with embodiments of the present disclosure are capable of bonding to plastics and may have a dielectric constant of less than 3.0 and a thermal conductivity in the range of 0.1 to 0.5 W/m-K.

Referring to FIG. 6A, each antenna element 313, 314 illustrated herein is an implementation of a dual polarized slot-coupled stacked patch antenna. A conductive layer 355 in PCB assembly 342 serves as the antenna ground, with a slot feed 350 (including two orthogonally oriented slots 352 and 354) cut out in the layer 355. The slots 352 and 354 are disposed under two conductive patches 330a and 332a stacked on top of each other with a controlled spacing between the upper and lower patches and the lower patch and the slots (see FIG. 6A).

The slots 352 and 354 have feed lines 356, 358 (see FIGS. 3A-3C, 7B and 7C) aligned with the slots 352, 354 of slot feed 350 to create an electric field across the slots 352 and 354. The induced electric field couples to the lower patch 332a to excite the stacked patch antenna pair 330a and 332a. To remove back radiation, another conductive layer 361 (see FIG. 6B) backs the slots with enough distance (so that slots are not short-circuited) below the feed lines 356, 358 and slots 352 and 354 (see FIG. 6B). The second conductive layer should be spaced far enough from the feed lines 356, 358 such that the feed lines 356, 358 primarily use the first conductive layer (having the slots) as the ground plane, without being perturbed by the presence of the backing conductor layer.

This type of antenna is capable of achieving impedance bandwidths in excess of 50%. To achieve such performance, some of the design guidelines are as follows: using a low dielectric constant (less than 3 or in the range of about 2 to about 3) for the dielectric spacer (not shown) disposed between the slots 352, 354 of slot feed 350 and the lower patch 332a and even a lower dielectric constant (air gap or foam-like material) for the antenna spacer (not shown) disposed between the lower patch 332a and the upper patch 330a. Other low dielectric materials can be used as the within a device including the antenna assembly, which may function as impedance tuning superstrates.

Another performance metric of a phased array antenna designed in accordance with embodiments of the present disclosure is the maximum angular range possible for beam-steering without any blind angle/direction. This metric typically means as little dielectric loading over the ground plane as possible to avoid trapping the electromagnetic signals (to be radiated) along the array surface (hence creating well-known "surface waves," which do not leave the antenna aperture 212 of FIG. 2A). Low dielectric loading can be achieved by low dielectric constants and low thicknesses of an antenna spacer (not shown) and other dielectric elements included in the phased array antenna system.

Heat generated by the active electronic components can generally be dissipated from every face of an enclosed unit, including the antenna aperture 212. The dielectric and spacer layers in the antenna stack assembly 334 can be designed for thermal conductivity using thermally conductive plastics in spacing elements (not shown) having low thickness for optimized thru-plane heat dissipation. In some implementations, the spacer plastics are selected to provide thermal conductivity for heat transfer away from the active electronics.

The slots 352, 354, the feed lines 356, 358 of the slots and the cavity 360 backing the slots are implemented in PCB technology, because these components have fine features and vertical conductors (e.g., vias) in addition to the planar conductive layers. In some implementations, the patch antennas and the dielectric spacers between those are implemented using lower cost materials (LDPE or HDPE plastic, mylar, etc.).

Main PCB Assembly

Figure 7A:
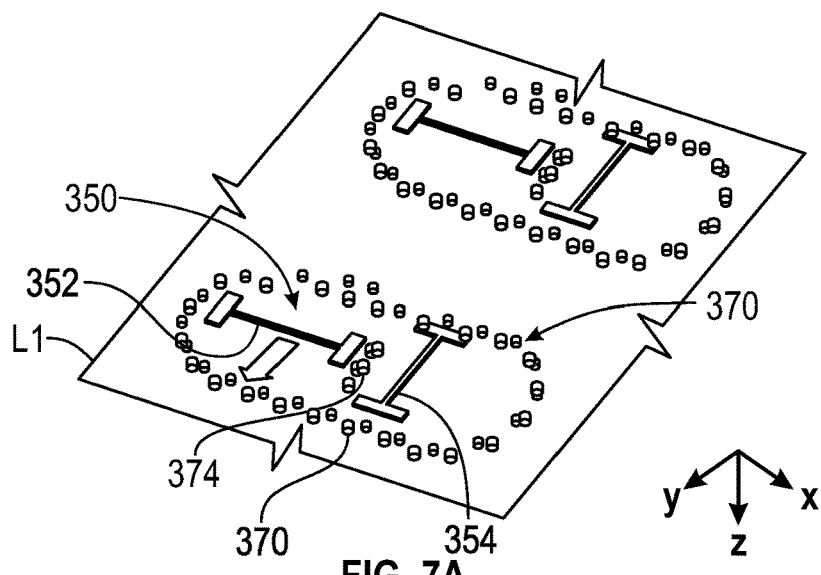
FIGS. 7A-7C are exemplary views of circuitry components in a plurality of layers of a PCB assembly in accordance with some embodiments of the present disclosure.

As discussed above with reference to FIG. 6A, the PCB assembly 342 includes features that may be aligned with the upper and lower antenna patch elements 330a and 332a of the individual antenna elements 313, 314, which together may form a resonant antenna structure. As discussed above, PCB assembly 342 includes some of the features of the antenna elements like dual slots 352 and 354 etched on the ground plane 355 with feed lines 356, 358, a cavity 360, and a backing ground plane 361. FIG. 6B illustrates a simplified sketch of the main PCB assembly 342 stack-up showing the RF path (inside the PCB assembly) from the DBFs 207, 208 through the FEM 215 of FIG. 2B and/or from the FEM 295 to the DBFs 297, 298 of FIG. 2C and up to the slot feed 350 (etched on the first metal layer of the PCB assembly 342). In the illustrated embodiment, a signal flow direction indicated by arrows corresponds to a receiving (Rx) mode. For a phased array antenna configured in a transmitting (Tx) mode, the signal flow direction shown in FIG. 6B is reversed. Because of the cross-sectional nature of the drawing, FIG. 6B does not fully illustrate the dual slot configuration for the slot feed 350 (slots 352 and 354), as seen in FIGS. 3A, 3B, and 7A, the 90-deg hybrid coupler seen in FIGS. 3A, 3B, and 7B, or the calibration line 367/367' shown in FIGS. 3A-3C.

As a non-limiting example, twelve PCB metal layers (L1 through L12) are shown in the illustrated PCB assembly 342. As discussed above, the slots 352 and 354 are etched in the first metal layer (L1), the feed lines 356 and 358 (Tx and Rx routing and the 90-deg hybrid) are on the second layer (L2), and the secondary ground plane 355 backing the slots 352 and 354 is on the fifth metal layer (L5).

To prevent the RF signals from bleeding inside PCB layers L1 to L5, the slots 352 and 354 are surrounded by grounding vias 370, 380, forming a cavity 360 together with the L1 and L5 ground planes 355 and 361. The grounding vias 370 and 380 guarding the cavity 360 are formed by staggered laser vias extending from L3 and L5 (see FIG. 6B and FIGS. 7A-7C). In another embodiment, the laser vias could be replaced with mechanical through vias (from layer L1 to L12). Inside the cavity 360, metal layers L3 and L4 are etched off (see FIG. 6B and FIG. 7C). Outside the cavity 360, metal layer L3 is used as another ground plane, separating the routing layers L2 and L4.

A plurality of cavities 360 are disposed in the PCB assembly 342, to correspond with the lattice 302 of the antenna elements 313 (see FIG. 6A). The distances between adjacent cavities 360 and antenna elements 313 is determined based on the effective dielectric constant of the antenna stack and the resulting onset frequency/scan-angle of the surface waves and/or grating lobes. However, the effective dielectric constant inside the main PCB assembly 342 is larger (typically >3.5) than the antenna stack 390 (see FIG. 6B), which is primarily made from plastic and air). This higher dielectric constant may cause resonant modes between antenna cavities and reduce the operational bandwidth of the antenna array from the higher end of the spectrum. Such reduction in operational bandwidth can be mitigated by disposing random ground vias (for example, extending from L1 to L5) between the cavities and the feed lines to reduce the maximum spacing below a desired limit and isolate the cavities from each other. Another suitable approach is placing a low number of ground vias (e.g., one per antenna) (not shown) strategically between the cavities to reduce the average size of the gaps between cavities and move resonance frequencies higher (freeing-up the antenna spectrum). Yet another suitable approach is placing the TX and/or RX transition vias (not shown) in strategic locations to use the ground vias of those transitions as the resonant suppressing features.

The cavity 360 is designed with L5 as the backing ground plane 361 is to provide spacing between the backing ground and the L1 slots and the L2 feedlines. Closer implementation (for example, using L3 as the backing ground plane and reducing the layers of the antenna cavity) might be possible but will be more sensitive to material properties and dielectric and laminate thicknesses. In view of the L1 and L5 spacing between the ground plane 355 and the backing ground plane 361, L2 and L4 are used as dual purpose layers. L4 is used for routing low frequency digital signals between modem, FEM 215 or 295, and DBFs 207/298, or 208/298. L2 is used for 90-degree hybrid combiner/splitter 362, calibration lines (e.g., calibration line 367 of FIGS. 3A-3B, calibration line 367' of FIG. 3C, calibration line 467 of FIGS. 4A-4B, 4D, calibration lines 1067 of FIG. 10) and couplers (e.g., bidirectional coupler 399 of FIGS. 3A-3B, bidirectional coupler 499 of FIGS. 4A-4B, coupler 489 of FIG. 4D, couplers 1089 of FIG. 10) and the Tx/Rx antenna mapping (not shown) for length matching purposes (if FEMs 215/295 are not distributed uniformly from their respective antenna elements 213, 214 as a result of layout complexity on the bottom layer of the PCB assembly 342). Therefore, the advantageous effect of creating a cavity 360 in L1-L5, is that the number of layers in the overall PCB assembly 342 can be reduced resulting in optimized PCB assembly design. In that regard, other components may be disposed on the same or a nearby layer without interfering with the feed structure.

Another suitable implementation would be using L3 as backing ground plane for the slots 352 and 354 but making the distance between L2 and L3 larger (for example, greater than 0.3 mm) as compared to the distance between L1 and L2 (for example, approximately 0.1 mm). However, such distancing would also be implemented in L10, L11, L12 for top/down symmetry in the PCB assembly 342. Such spacing of L10, L11, and L12 may affect ground plane stitching between L10, L11, and L12, which could degrade the quality of the RF-breakout of the electronics (DBF, FEM, etc.).

Figure 7B:
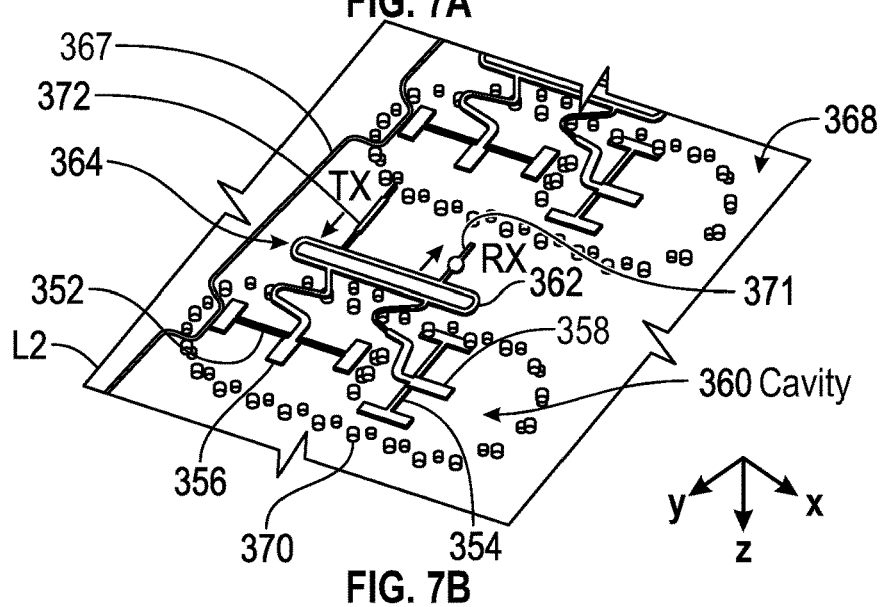
Figure 7C:
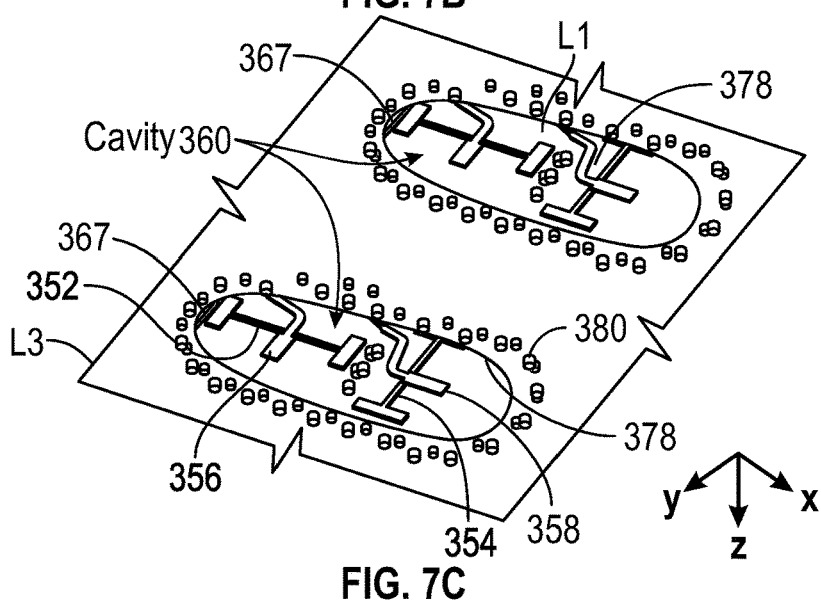

Referring now to FIGS. 7A-7C (showing the progression of layers L1, L2, L3 in the PCB assembly 342 from the bottom view in FIGS. 7A-7C. the PCB assembly 342 will now be described in greater detail. Referring to FIGS. 7A-7C, the slot feed 350 (including slots 352 and 354) interfaces with the feed structure (including first and second feed lines 356 and 358) disposed in the layers of the PCB assembly 342. The feed lines 356 and 358 couple each antenna element 313 of an antenna lattice 302 (see FIG. 6A) with a specific DBF 207/297, 208/298 in the DBF lattice 206 (not shown in the PCB assembly layers L1-L3 in FIGS. 7A-7C, but see FIG. 6B). The DBF lattice 206 (and respective FEMs 215/295) may be disposed in the PCB assembly 342 at a lower layer, such as a bottom layer of the PCB assembly 342.

Referring to FIG. 7A, a slot feed 350 including a pair of first and second slots 352 and 354 is shown. In the illustrated embodiment, the first and second slots 352 and 354 are oriented substantially normal to one another and coupled to feed lines 356 and 358 of a 90-degree hybrid combiner/splitter 362.

As described above, each antenna element 313, 314 of the antenna lattice 302 can be dual linearly polarized antenna elements operated either as a transmitting antenna element (see FIG. 2B) or as a receiving antenna element (see FIG. 2C). In some embodiments, the component structure shown in FIGS. 7A-7C can be used for operating antenna each antenna element 313, 314 as a transmit (Tx) only antenna element (see FIG. 2B). In such cases, the Rx port 371 of feed structure 364 (see FIG. 7B) can be terminated as shown in FIG. 2B. In some embodiments, the component structure shown in FIGS. 7A-7C can be used for operating antenna each antenna element 313, 314 as a receive (Rx) only antenna element (see FIG. 2B). In such cases, the Tx port 372 of feed structure 364 (see FIG. 7B) can be terminated as shown in FIG. 2B. In another embodiment, each antenna element 313, 314 may be dual circularly polarized with a separate receiving Rx (e.g., right-hand circularized ports) and transmitting Tx (e.g., left-hand circularized ports) port for each unit cell. The 90-degree hybrid combiner/splitter 362 can work in conjunction with dual linearly polarized antenna elements to create circularly polarized (CP) ports for coupling with the FEMs 215/295 and the DBFs 207/297, 208/298.

As described above, from the bottom surface of L1 extends a plurality of ground vias (e.g., metal vias or stitching) 370 defining at least a portion of cavity 360 to mitigate RF "bleeding" from the cavity 360. The cavity 360 provides a resonant structure and enables isolation of the slots from other structures that can be placed, on the field 368 (see FIG. 7B) of the same or a nearby layer without interfering with the feed structure. Ground vias 374 also help isolate the first and second slots 352 and 354 and feed lines 356 and 358 from each other.

Referring to FIG. 7B, L2 includes the first and second feed lines 356 and 358 to interface with the slot feed 350 and the 90-degree hybrid combiner/splitter 362. In the Tx direction, the 90-degree hybrid combiner/splitter 362 excites the slot feed 350 and the antenna stack (not shown). In the Rx direction, the slot feed 350 excites the 90-degree hybrid combiner/splitter 362. As described above, in addition to the Rx and/or Tx lines, L2 may further include meander routing for line length consistency (not shown). In the illustrated embodiment, calibration line 367 is also included in L2, and can be routed to avoid collision with the vias 370, 380. As shown, the calibration line 367 can enter the cavity 360 of each antenna element 313, 314 to couple with the signal chain of the antenna elements. In other embodiments, the calibration line 367 can be routed on a different layer from the 90-degree hybrid combiner/splitter 362, slot feed 350, and/or feed lines 356, 358. For example, the calibration line 367 may be routed on layer L4 and still pass within the cavity 360, thereby coupling the signal chain of the antenna element. As illustrated, the calibration line 367 can be routed in proximity to and couple to the slot 352 of the antenna element. However, as noted above, the calibration line 367 can also be coupled to other portions of the signal chain of each antenna element, including, without limitation, slot 354, feed lines 356, 358, or routing between the 90-degree hybrid combiner/splitter 362 and the FEMs 215, 295 (e.g., traces 261, 263 of FIGS. 2B and 2C).

Referring to FIG. 7C, L3 is a partial ground layer that includes a cut-out portion 378 corresponding with the cavity 360 defined by the ground vias 370 extending from L1. Extending from the bottom surface of L3 are additional ground vias 380 aligned with ground vias 370 to further define the cavity 360.

As seen in FIGS. 7B and 7C, the first and second slots 352 and 354 of the slot feed 350 couple with the first and second feed lines 356 and 358 of the 90-degree hybrid combiner/ splitter 362 (with the feed lines residing in the cavity 360, but the 90-degree hybrid combiner/splitter 362 outside the cavity 360), with the first and second slots 352 and 354 and corresponding feed lines 356 and 358. In the illustrated embodiment, L4 (not shown) may be a mostly empty layer, for example, used for calibration meander termination and connector routing for factory calibration. As seen in FIG. 6B, L5 is a backing ground plane 361 defining the cavity 360.

Figure 8A:
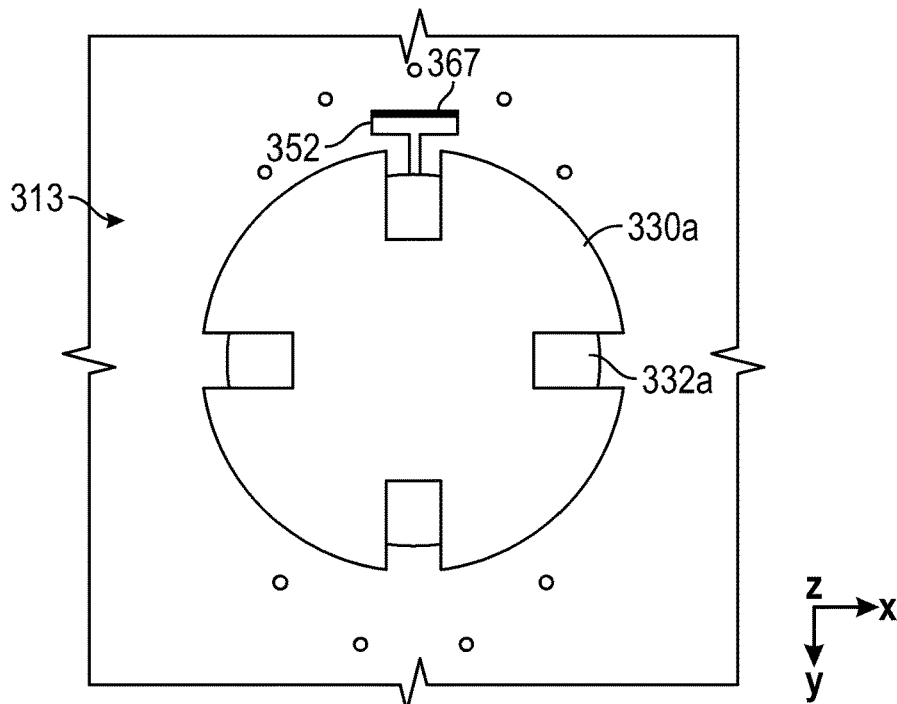
FIGS. 8A-8C are exemplary views showing circuitry components in an antenna stack assembly and a PCB assembly in accordance with some embodiments of the present disclosure.
Figure 8B:
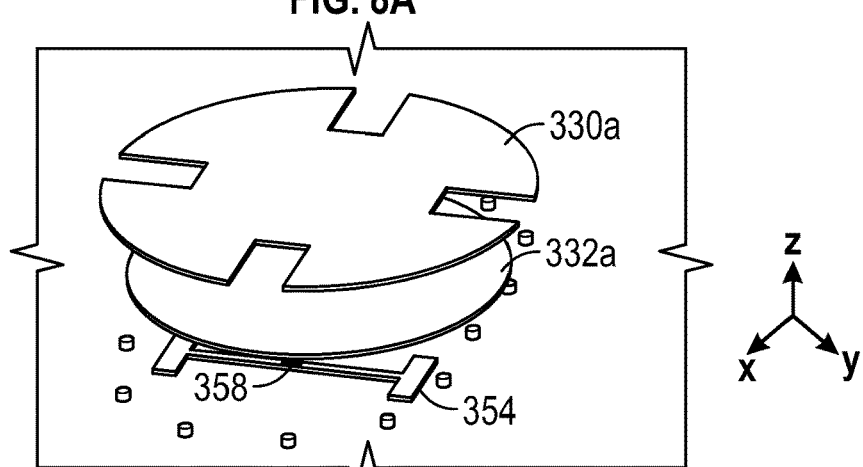
Figure 8C:
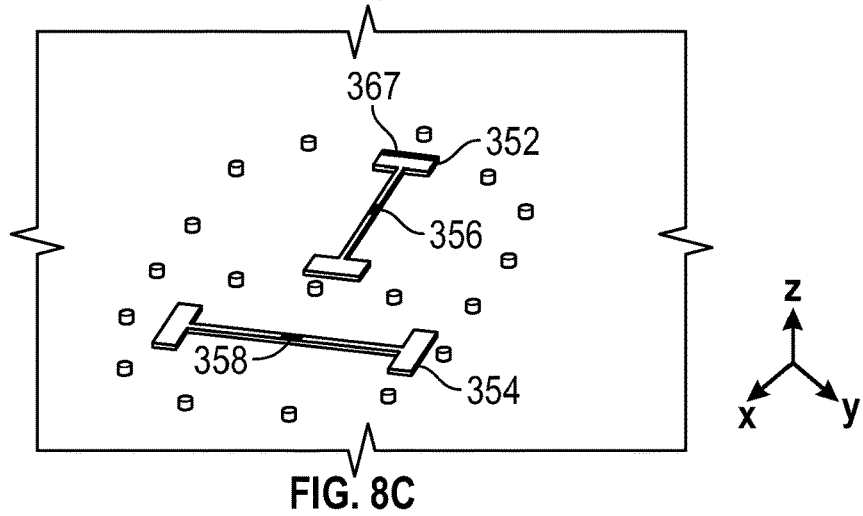

FIGS. 8A-8C illustrate atop down view of a portion of the antenna stack 390 as well as an upper layer (e.g., L1) of the PCB assembly 342. FIG. 8A illustrates a view looking at a side of the upper antenna patch 330a of antenna element 313 facing away from the PCB assembly 342. As illustrated, portions of the lower antenna patch 332a can be seen through features in the geometry of the upper antenna patch 330a. In addition, a portion of the slot 352 of slot feed 350 can be seen protruding slightly beyond the perimeter of the upper and lower antenna patches 330a, 332a. In addition, a portion of the calibration line 367 (e.g., on layer L2 as shown in FIG. 7B) is visible through the slot 352. As described with respect to FIGS. 7A-7C, the calibration line 367 can enter into the cavity 360 (see FIG. 7B) of each antenna element 313 and couple to signals transmitted and/or received by the antenna element 313. FIG. 8B illustrates an isotropic view of the components in FIG. 8A. In FIG. 8B, the slot 352 is obscured while the slot 354 of the slot feed 350 is visible and a portion of the feed line 358 (e.g., on layer L2 as shown in FIG. 7B) is visible through the slot 354. FIG. 8C illustrates the isotropic view of FIG. 8B with the upper and lower antenna patch 330a, 332a removed. In the illustration of FIG. 8C, both the slots 352 and 354 of the slot feed 350 are visible as well as portions of the calibration line 367 and feed lines 356, 358.

Calibration of a Two-Dimensional Phased Array Antenna

Figure 9A:
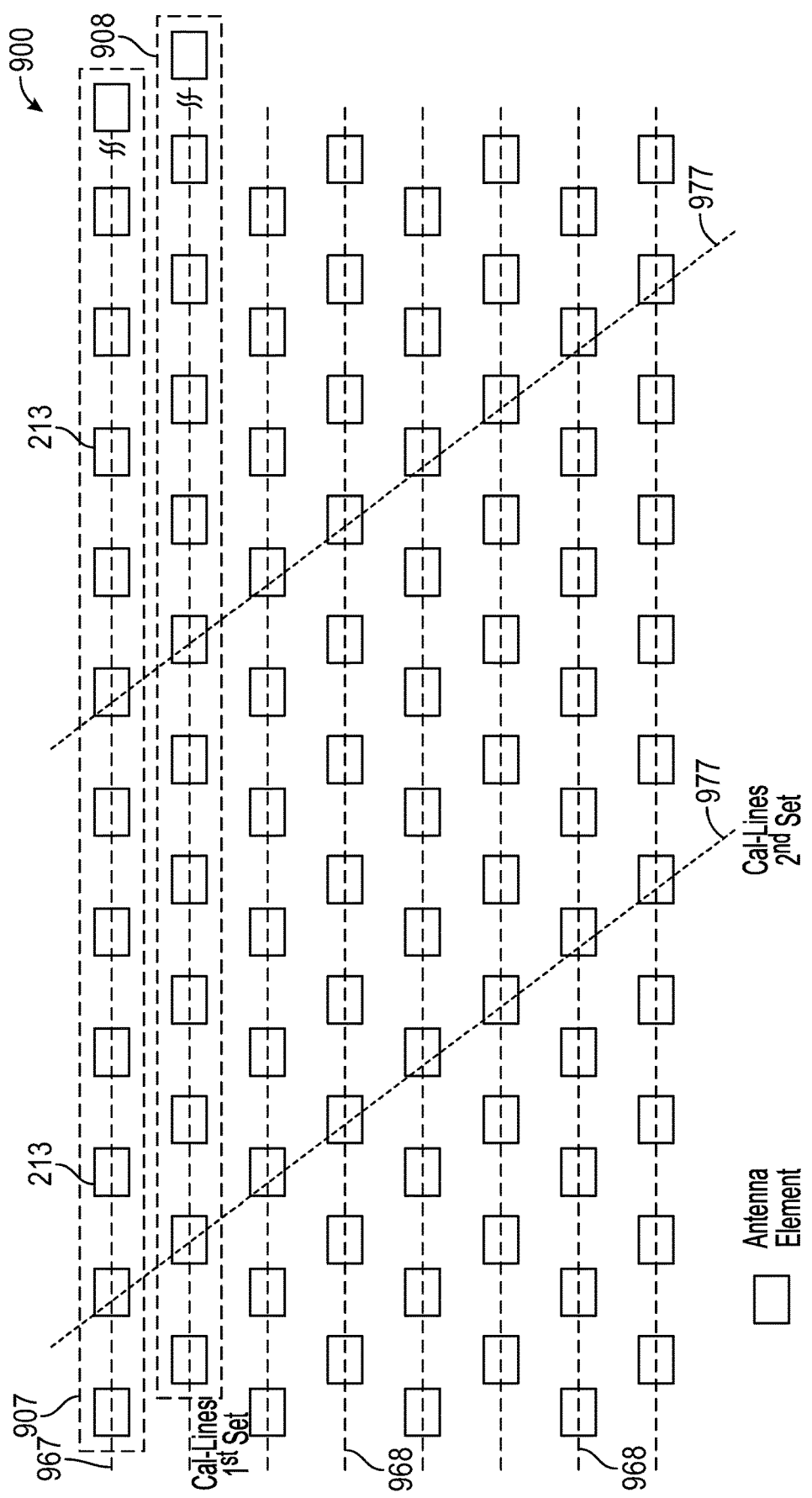
FIGS. 9A-9C are exemplary simplified schematics showing multiple configurations of grouping antennas in an antenna lattice with DBFs in a DBF lattice.
Figure 9B:
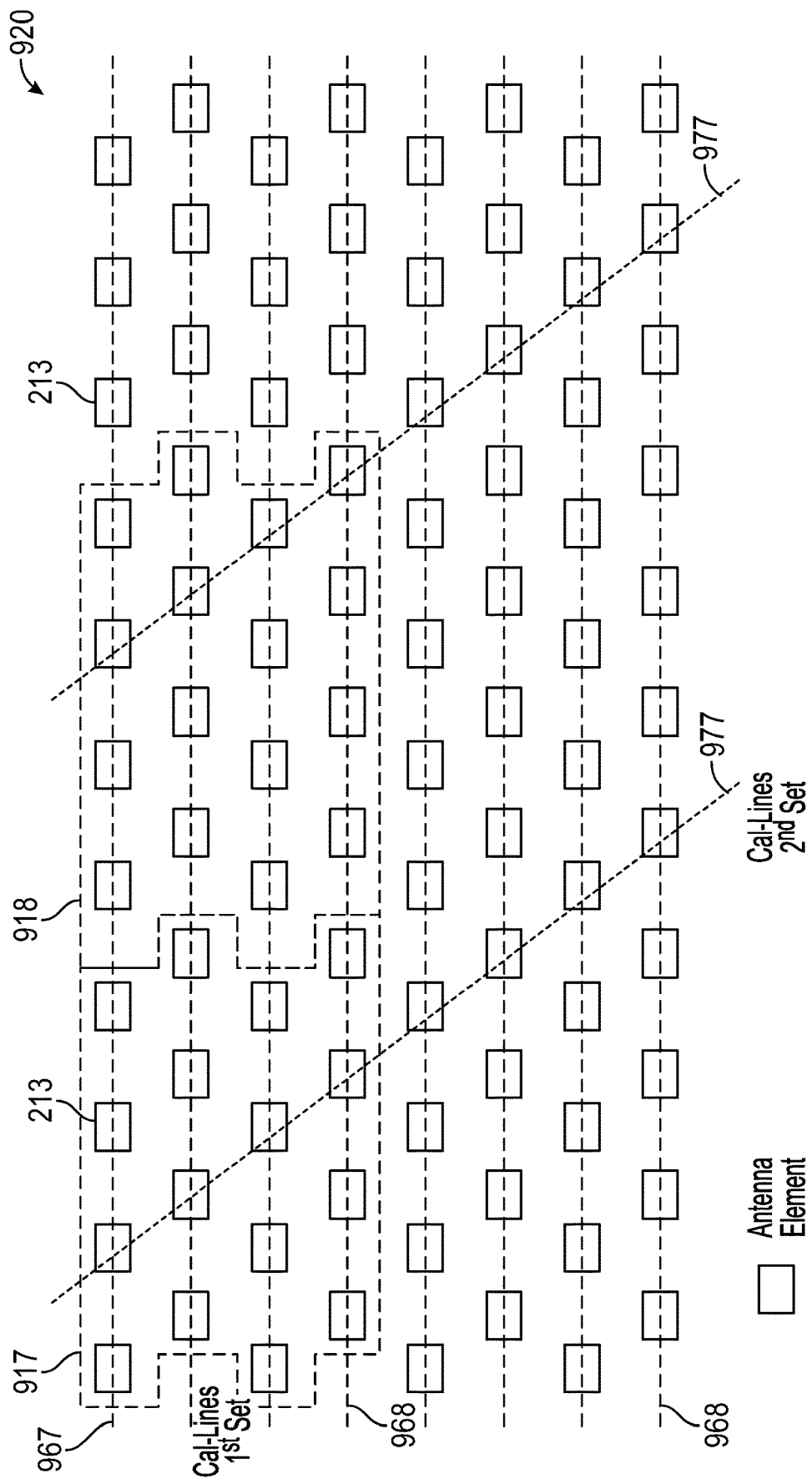
Figure 9C:
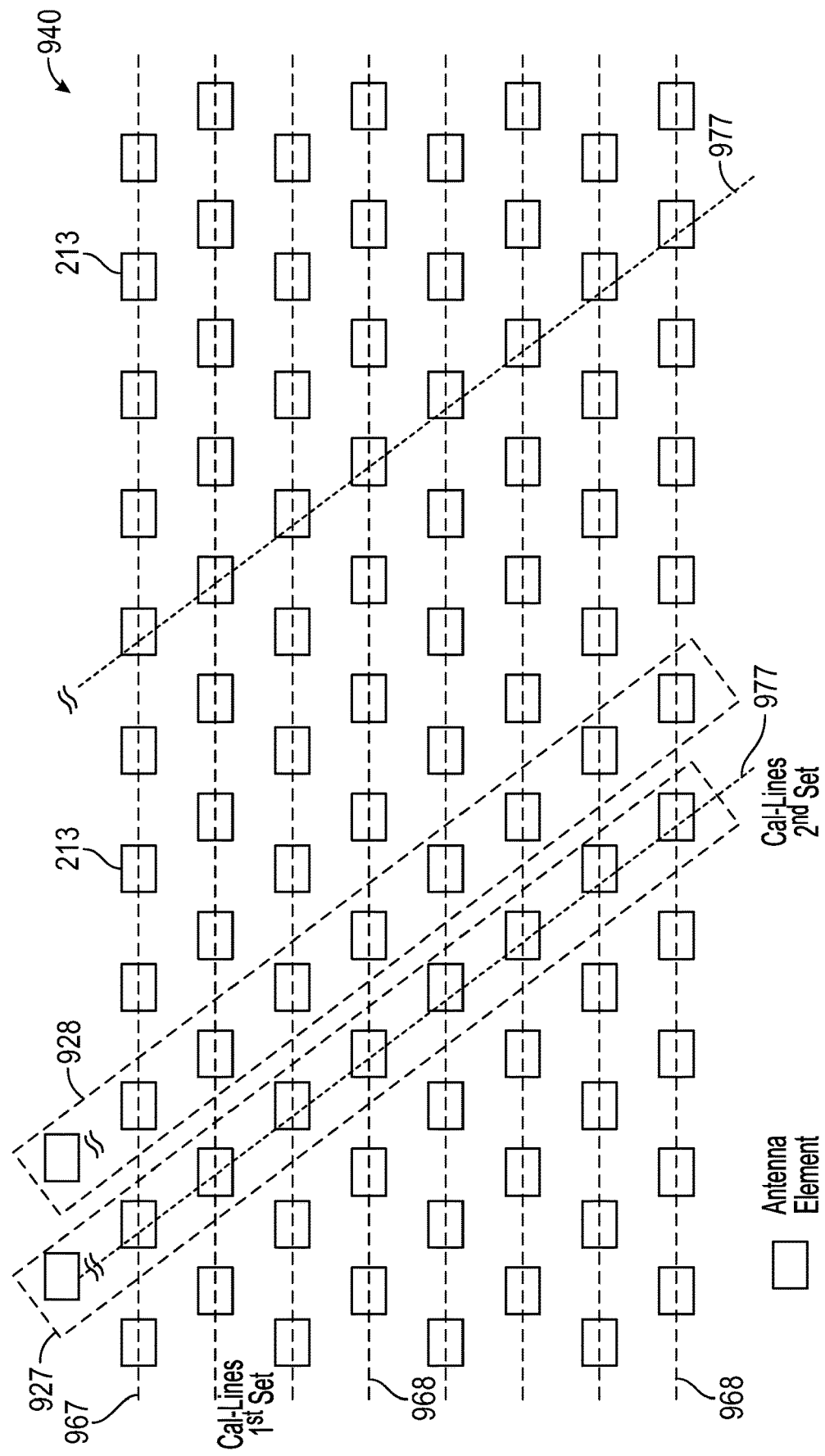

FIGS. 9A to 9C are simplified schematic illustrations of a portion of a phased array antenna including antenna elements, a first set of calibration lines, a second set of calibrations lines, and correspondence between DBFs (e.g., 207/297, 208/298) and antenna elements of a phased array antenna. FIG. 9A illustrates a first example phased array antenna 900 with a configuration similar to the configurations illustrated in FIGS. 3A-3C, 4A-4B, and 4D. The calibrations lines 967 can correspond to calibration lines 367 (see FIGS. 3A-3B), 467 (see FIGS. 4A-4B and 4D) and the rectangular box 907 can include antenna elements 213 RF coupled to a first DBF 207/297 of a DBF lattice 206 (see FIG. 2E). Box 908 illustrates another set of antenna elements that can be associated with a second calibration line of the calibration lines 968. In some embodiments, additional antenna elements in the same "row" of antenna elements can be associated with the same calibration line 967 and coupled to a second DBF (208/298) of DBF lattice 206 (see FIG. 2E). In the illustrated example, the calibration line 967 can be coupled to calibration transmit sections (mTx) (see 231 of FIG. 2C) and/or calibration receive sections (mRx) (see 232 of FIG. 2B) of the DBFs 207/297 and 208/298. Calibration line 967 can be one calibration line in a first set of calibration lines that includes additional calibrations lines 968 running parallel to calibration line 967, and each of the calibration lines 968 can include a similar correspondence with additional DBFs of the DBF lattice 206 (see FIG. 2E). Groups of antenna elements that share a calibration line 967 can be calibrated relative to one another using the calibration techniques described with respect to FIGS. 4A-4E and 5A-5B. However, since the calibration is relative as opposed to being indexed to a known calibration setting, the calibration (e.g., phase and/or gain setting) of antenna elements 213 associated with calibration line 967 may not correspond to the calibration setting of the antenna elements 213 associated with any of the other calibration lines 968 of the first set of calibration lines.

In some embodiments, to calibrate antenna elements 213 across two dimensions of phased array antenna 900, a second set of calibration lines including calibration line 977 can be coupled to antenna elements 213 in a second dimension that crosses between antenna elements associated with different calibration lines 967, 968 of the first set of calibration lines. As illustrated, the first set of calibration lines and the second set of calibration lines do not need to be orthogonal to one another. A similar calibration technique can be used for the antenna elements 213 in the second dimension that are associated with the calibration line 977. In some embodiments, performing the relative calibration in both the first dimension and second dimension, the antenna elements 213 can be calibrated relative to one another in both dimensions of the phased array antenna 900.

FIGS. 9B and 9C illustrate additional variations for correspondence between DBFs 207/297, 208/298 and the antenna elements 213 of a phased array antenna system. Both the phased array antenna 920 of FIG. 9B and the phased array antenna 940 of FIG. 9C include a first set of calibration lines including calibration line 967 and calibration lines 968 aligned in a first dimension and a second set of calibration lines including calibration line 977 aligned in a second dimension. Referring to FIG. 2B, a first grouping 917 shows correspondence between a 4×4 group of antenna elements 213 and a first DBF (e.g., 207/297 of FIGS. 2B and 2C). A second grouping 918 shows correspondence between a 4×4 group of antenna elements 213 and a second DBF. As illustrated in FIG. 2B, a single calibration line 967, 968, 977 can be associated with antenna elements 213 grouped with more than two DBFs. In some cases, to perform relative calibration of antenna elements 213 along a calibration line 967, 968, 977, the DBFs performing calibration measurements can communicate with each other, e.g., as shown in FIG. 2E. FIG. 2C illustrates another variation of correspondence between DBFs and antenna elements 213. In the illustrated example, groupings 927 and 928 are linear similar to the groupings in FIG. 9A, but the linear groupings are arranged in the second dimension corresponding to the second set of calibration lines including calibration line 977 instead of the first dimension corresponding to the first set of calibration lines including calibration lines 967, 968. As demonstrated by the examples of FIGS. 9A-9C, different phased array antenna configurations can utilize the calibration techniques described herein without departing from the scope of the present disclosure.

Figure 10:
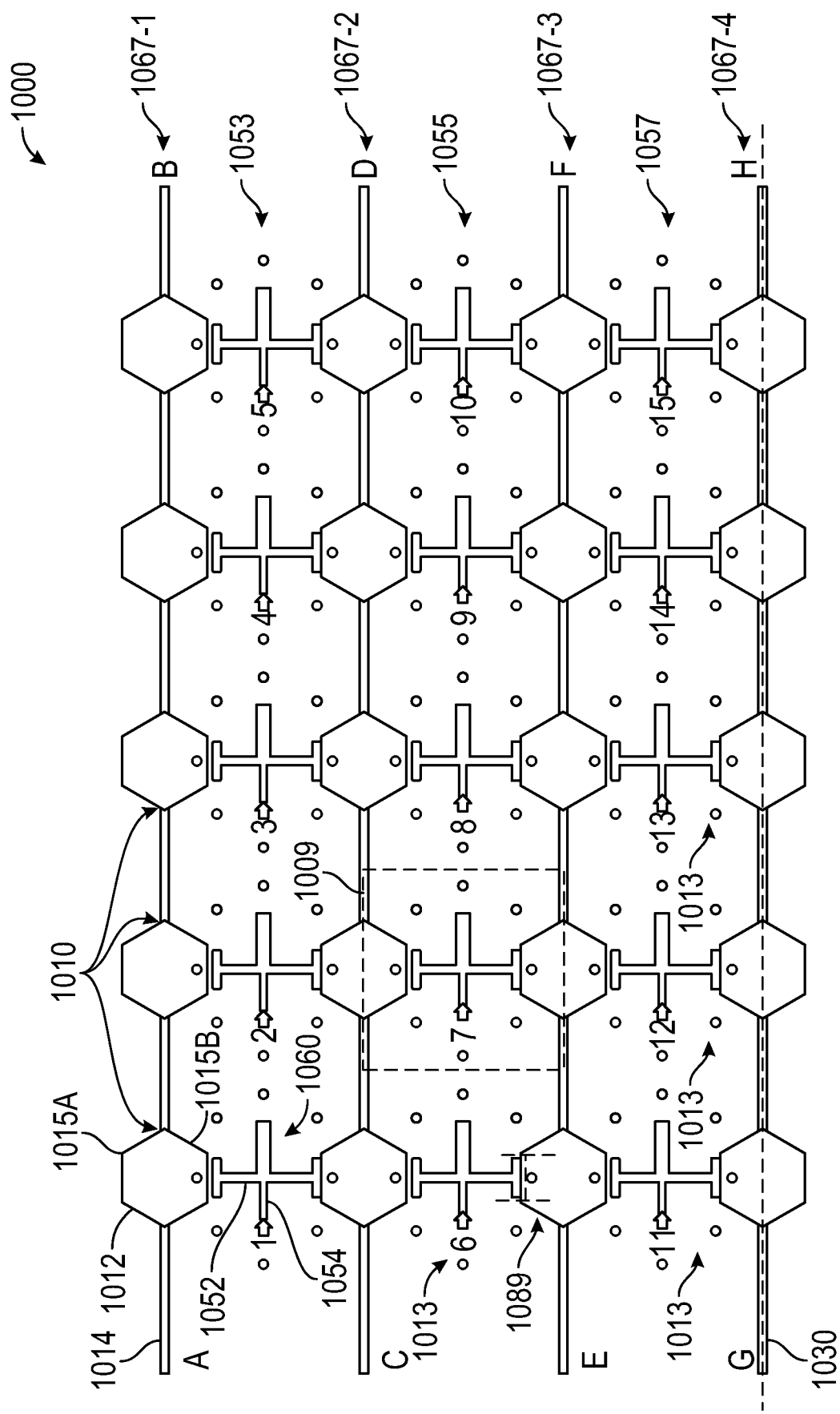
FIG. 10 illustrates an example calibration configuration for calibrating a two-dimensional antenna lattice with calibration lines oriented along a single axis.

FIG. 10 illustrates an example calibration configuration 1000 for calibrating a two-dimensional phased array with calibration lines oriented along a single axis. In the illustrated example of FIG. 10, four calibration lines 1067-1, 1067-2, 1067-3, and 1067-4 (collectively referred to herein as calibration lines 1067) are aligned along a first axis and coupled between two parts at either end of each calibration line 1067. As shown in the illustration, each of the calibration lines 1067 includes a plurality of splitter/combiners 1010, which can divide an RF calibration signal into two calibration signal components and/or combine two components into a single RF calibration signal. In the illustrated example, each calibration line 1067 includes a plurality of split sections 1012 and a plurality of combined sections 1014. As illustrated, each of the split sections 1012 can include a first branch 1015A and a second branch 1015B. As illustrated in FIG. 10, the first branch 1015A and second branch 1015B of each split section 1012 can be symmetric across the calibration line axis 1030. The branches of the split sections 1012 can each couple with an antenna calibration unit cell 1009 of different rows of a two dimensional array of antenna elements as shown in FIG. 10. The example calibration configuration also includes an array of antenna elements 1013 included in antenna calibration unit cells 1009. For the purposes of illustration, a radiating portion (e.g., upper and lower antenna patches 330a and 332a of FIGS. 6A, 8A, and 8B) of the antenna elements 1013 is not shown. In the illustrated example, each antenna calibration unit cell 1009 includes components of a signal chain of each corresponding antenna element 1013. The signal chain of antenna elements 1013 can include, without limitation, a slot feed 1052 and a feed line 1054. In the illustrated example, the antenna elements can be linearly polarized single port stack patch antennas. In a transmit mode, an RF signal to be radiated by the antenna elements 1013 can enter a cavity 1060 (see cavity 360 of FIG. 7B) of the antenna element by a feed line 1054 and the RF signal on the feed line 1054 can induce an electric field across the slot feed 1052, which in turn can stimulate upper and lower antenna patches (e.g., 332a, 334a of FIG. 6A) of the antenna element.

In one illustrative example, calibration configuration 1000 is included in a receiving (Rx) phased array antenna. In a first calibration step, port A can transmit an RF calibration signal (e.g., RF calibration signal 401 of FIG. 4A) onto the calibration line 1067-1 and one or more RF Rx sections (e.g., Rx RF section 288 of FIG. 2C) of one or more DBFs (e.g., DBFs 297, 298 of FIG. 2C) can obtain measurements between the port A and each respective antenna calibration unit cells 1009 in the first row 1053 of antenna calibration unit cells 1009 similar to the first calibration step described with respect to FIG. 4A. In a second calibration step, port B can transmit an RF calibration signal (e.g., RF calibration signal 431 of FIGS. 4B and 4D) onto the calibration line 1067-1 and the one or more RF Rx sections of the one or more DBFs can obtain measurements between the port B and each respective antenna calibration unit cells 1009 in the first row 1053 of antenna calibration unit cells 1009 similar to the second calibration step described with respect to FIG. 4B and/or FIG. 4D. In some embodiments, the antenna calibration unit cells 1009 the calibration configuration 1000 can calibrate the relative phase and magnitude of the antenna calibration unit cells 1009 according to Equations (1)-(12), Equations (15)-(22), any other calibration technique disclosed herein, or any combination thereof.

In some embodiments, in a third calibration step, port C can transmit an RF calibration signal (e.g., RF calibration signal 401 of FIG. 4A) onto the calibration line 1067-2 and one or more RF Rx sections (e.g., Rx RF section 288 of FIG. 2C) of one or more DBFs (e.g., DBFs 297, 298 of FIG. 2C) can obtain measurements between the port C and each respective antenna calibration unit cell 1009 in the first row 1053 of antenna calibration unit cells 1009 similar to the first calibration step described with respect to FIG. 4A. In addition, one or more RF Rx sections (e.g., Rx RF section 288 of FIG. 2C) of one or more DBFs (e.g., DBFs 297, 298 of FIG. 2C) can obtain measurements between the port C and each respective antenna calibration unit cell 1009 in the second row 1055 of antenna calibration unit cells 1009. FIG. 10 illustrates an axis of symmetry 1030 passing through the center of calibration line 1067-4. As illustrated, each mirrored half of the calibration line 1067-4 resembles calibration line 367 of FIGS. 3A and 3B and calibration line 467 of FIGS. 4A, 4B, and 4D except that each half of the split sections 1012, which include couplers 1089, are in the shape of half-hexagons rather than a smooth curve that is used to form bidirectional coupler 499 of FIGS. 4A and 4B and/or coupler 489 of FIG. 4D. The couplers 1089 can be bidirectional or directional. In the case of directional couplers, as long as a coupling ratio between the coupling coefficients for each direction of travel of RF calibration signals is known, the directional coupling may not create additional unknown variables in any of Equations (1)-(12) and Equations (15)-(22).

In some embodiments, in addition to calibrating antenna calibration unit cells 1009 within rows of antenna elements, the calibration configuration 1000 can also be used to calibrate antenna signal chains corresponding to antenna calibration unit cells 1009 across all of the rows of a phased array antenna. For example, as described above, the ports C and D can be used to calibrate antenna elements in both first row 1053 and second row 1055. Because first row 1053 and second row 1055 share the ports C and D for calibration, the antenna calibration unit cells 1009 in both rows can be calibrated relative to one another. Similar to the ports C and D coupled to calibration line 1067-2, the ports E and F can be used to calibrate antenna calibration unit cells 1009 in both the second row 1055 and the third row 1057 relative to one another. Furthermore, since the calibrations using calibration line 1067-2 and four calibration lines 1067-3 share the antenna calibration unit cells 1009 of second row 1055 in common, the antenna calibration unit cells 1009 from all three rows 1053, 1055, 1057 can be calibrated relative to one another using two calibration lines 1067-2 and 1067-3 as shown in FIG. 10. The technique described with respect to FIG. 10 can also be extended to a larger array of antenna elements utilizing the same type of periodic structure of antenna calibration unit cells 1009.

In some embodiments (not shown), if the number of antenna calibration unit cells 1009 along a row of a phased array antenna exceeds the maximum length of a usable calibration line (e.g., due to attenuation), calibration between antenna calibration unit cells 1009 from different calibration lines in a same row of the calibration configuration may also require mutual calibration. In one illustrative example, alternating calibration lines (e.g., 1067-2, 1067-3) can be staggered in either direction along the axis of the calibration lines 1067. In some cases, by staggering the calibration lines 1067, at least one antenna calibration unit cell 1009 can be shared by every calibration line in the phased array antenna. The added complexity (e.g., the use of splitter combiners, calibration across multiple rows using a single calibration line, etc.) of the calibration configuration 1000 of FIG. 10 when compared with the calibration configurations of FIGS. 4A-4B and 4D can introduce new unknowns into the equations (1)-(12) and/or (15)-(22) above. In some cases, potential unknowns can be negated by designing the calibration configuration with symmetry and periodicity along both the axis of the calibration lines 1067 and along the axis perpendicular to calibration lines 1067. Example techniques for designing the calibration configuration 1000 with symmetry and periodicity can include, without limitation, using bidirectional couplers (e.g., bidirectional coupler 499 of FIGS. 4A and 4B), using bidirectional splitter/combiners 1010, and arranging the cavity 1060, feed line 1054, and slot feed 1052 of each antenna calibration unit cells 1009 to be symmetric with respect to both of the calibration lines 1067 associated with the corresponding unit cell (e.g., calibration lines 1067-2 and 1067-3 both associated with antenna calibration unit cells 1009 in second row 1055).

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A method of calibrating a transmit (Tx) phased array antenna, comprising:
   obtaining a phased array antenna including a plurality of antenna elements, the plurality of antenna elements coupled to at least one transmit (Tx) section for transmitting radio frequency (RF) signals;
   transmitting a first RF signal to a first signal chain associated with a first antenna element of the plurality of antenna elements, wherein the first RF signal is generated in the at least one transmit (Tx) section;
   transmitting a second RF signal to a second signal chain associated with a second antenna element of the plurality of antenna elements, wherein the second RF signal is generated in the at least one transmit (Tx) section;
   receiving each of the first and second RF signals from respective signal chains of the first and second antenna elements of the plurality of antenna elements at a calibration receive (mRx) section by a calibration line associated with the plurality of antenna elements;
   comparing a first received (mRx) RF signal from the first signal chain associated with the first antenna element with a second received (mRx) RF signal from the second signal chain associated with the second antenna element, wherein comparing the first received (mRx) RF signal with the second received (mRx) RF signal comprises determining one or more characteristics associated with propagation of at least one of the first or second RF signals along a portion of the calibration line disposed between the first antenna element and the second antenna element; and
   adjusting one of the first signal chain associated with the first antenna element and the second signal chain associated with the second antenna element relative to the other of the first signal chain associated with the first antenna element and the second signal chain associated with the second antenna element, wherein the adjustment is based at least in part on the determined one or more characteristics.

2. The method of claim 1, wherein the first received (mRx) RF signal is RF coupled to the calibration line at a first coupling section and the second received (mRx) RF signal is RF coupled to the calibration line at a second coupling section.

3. The method of claim 2, wherein the portion of the calibration line disposed between the first antenna element and the second antenna element comprises a portion of the calibration line disposed between the first coupling section and the second coupling section.

4. The method of claim 2, wherein the first received (mRx) RF signal is RF coupled to an input port of a directional coupler by the first coupling section, a through port of the directional coupler is terminated, a coupled port of the directional coupler is coupled to the first signal chain associated with the first antenna element, and an isolated port of the directional coupler is coupled to the first antenna element of the plurality of antenna elements.

5. The method of claim 2, wherein the first and second coupling sections comprise bidirectional couplers.

6. The method of claim 1, wherein the one or more characteristics associated with propagation of at least one of the first and second RF signals along the portion of the calibration line between the first antenna element and the second antenna element comprise one or more of a phase shift, a delay, or an attenuation.

7. The method of claim 1, wherein adjusting for the one or more characteristics associated with propagation of at least one of the first and second RF signals along the portion of the calibration line between the first antenna element and the second antenna element comprises adjusting one or more of a phase, a delay, a magnitude, or an amplitude associated with the first signal chain or the second signal chain.

8. The method of claim 1, wherein each adjacent pair of antenna elements of the plurality of antenna elements is separated by a corresponding predetermined portion of the calibration line.

9. The method of claim 8, wherein each corresponding predetermined portion of the calibration line has an equal length.

10. The method of claim 1, wherein comparing the first received (mRx) RF signal with the second received (mRx) RF signal comprises simultaneously determining the one or more characteristics associated with propagation of at least one of the first and second RF signals along a portion of the calibration line disposed between the first antenna element and the second antenna element and determining one or more characteristics associated with at least one reflected signal associated with a termination of the calibration line.

11. The method of claim 10, wherein comparing the first received (mRx) RF signal with the second received (mRx) RF signal comprises solving a system of equations based on the first received (mRx) RF signal from the first antenna element, the second received (mRx) RF signal from the second antenna element, and at least one additional received RF signal from an additional antenna element of the plurality of antenna elements RF coupled to the calibration line.

12. The method of claim 1, wherein determining the one or more characteristics associated with propagation of at least one of the first and second RF signals along the portion of the calibration line between the first antenna element and the second antenna element comprises determining solving a system of equations comprising two mathematically valid solutions; and
   selecting a solution based on comparing the two mathematically valid solutions with an estimated solution based on known physical characteristics of the calibration line.

13. The method of claim 12, wherein the known physical characteristics comprise an electrical length of each calibration line section.

14. The method of claim 13, wherein a determined phase of the selected solution differs from an estimated phase contribution associated with the electrical length of each calibration line section by less than ninety degrees.

15. The method of claim 14, wherein the estimated phase contribution is determined at least in part based on performing calibration measurements at multiple calibration measurement frequencies and estimating an unwrapped phase of the portion of the calibration line.

16. An antenna calibration system for a receive (Rx) phased array antenna, the antenna calibration system comprising:
   a first calibration transmit (mTx) section, a second calibration transmit (mTx) section, and a receive (Rx)

section for receiving RF signals and comparing received RF signals for the purpose of calibration;
a calibration line RF couplable to the first calibration transmit (mTx) section and the second calibration transmit (mTx) section; and
a plurality of antenna elements associated with the calibration line, wherein:
   the first calibration transmit (mTx) section is configured to transmit (mTx) a first RF signal by the calibration line and the second calibration transmit (mTx) section is inactive;
   the Rx section is configured to compare a first received (Rx) RF signal associated with a first antenna element of the plurality of antenna elements with a second received (Rx) RF signal associated with a second antenna element of the plurality of antenna elements and compare the first received (Rx) RF signal with the second received (Rx) RF signal, wherein the comparing the first received (Rx) RF signal with the second received (Rx) RF signal comprises determining one or more characteristics associated with propagation of at least one of the first and second RF signals along a portion of the calibration line disposed between the first antenna element and the second antenna element; and
   adjusting one of a first signal chain associated with the first antenna element and a second signal chain associated with the second antenna element relative to the other of the first signal chain associated with the first antenna element and the second signal chain associated with the second antenna element, wherein the adjustment is based at least in part on the determined one or more characteristics.

17. A method of calibrating a receive (Rx) phased array antenna, comprising:
   obtaining a phased array antenna including a plurality of antenna elements, the plurality of antenna elements coupled to at least one receive (Rx) section for receiving radio frequency (RF) signals;
   transmitting an RF signal to respective signal chains of first and second antenna elements of the plurality of antenna elements from a calibration transmit (mTx) section by a calibration line associated with the plurality of antenna elements;
   receiving a first received (Rx) RF signal from a first signal chain associated with the first antenna element of the plurality of antenna elements, wherein the first RF signal is received in the at least one receive (Rx) section;
   receiving a second received (Rx) RF signal from a second signal chain associated with the second antenna element of the plurality of antenna elements, wherein the second RF signal is received in the at least one receive (Rx) section;
   comparing the first received (Rx) RF signal from the first signal chain associated with the first antenna element with the second received (Rx) RF signal from the second signal chain associated with the second antenna element, wherein comparing the first received (Rx) RF signal with the second received (Rx) RF signal comprises determining one or more characteristics associated with propagation of the RF signals along a portion of the calibration line disposed between the first antenna element and the second antenna element; and
   adjusting one of the first signal chain associated with the first antenna element and the second signal chain associated with the second antenna element relative to the other of the first signal chain associated with the first antenna element and the second signal chain associated with the second antenna element, wherein the adjustment is based at least in part on the determined one or more characteristics.

18. The method of claim 17, wherein the first received (Rx) RF signal is RF coupled to the calibration line at a first coupling section and the second received (Rx) RF signal is RF coupled to the calibration line at a second coupling section.

19. The method of claim 18, wherein the portion of the calibration line disposed between the first antenna element and the second antenna element comprises a portion of the calibration line disposed between the first coupling section and the second coupling section.

20. The method of claim 19, wherein the first received (Rx) RF signal is RF coupled to an input port of a directional coupler by the first coupling section, a through port of the directional coupler is terminated, a coupled port of the directional coupler is coupled to the first signal chain associated with the first antenna element, and an isolated port of the directional coupler is coupled to the first antenna element of the plurality of antenna elements.

21. The method of claim 19, wherein the first and second coupling sections comprise bidirectional couplers.

22. The method of claim 17, wherein the one or more characteristics associated with propagation of at least one of the first and second RF signals along the portion of the calibration line between the first antenna element and the second antenna element comprise one or more of a phase shift, a delay, or an attenuation.

23. The method of claim 17, wherein adjusting for the one or more characteristics associated with propagation of at least one of the first and second RF signals along the portion of the calibration line between the first antenna element and the second antenna element comprises adjusting one or more of a phase, a delay, a magnitude and an amplitude associated with the first signal chain or the second signal chain.

24. The method of claim 17, wherein each adjacent pair of antenna elements of the plurality of antenna elements is separated by a corresponding predetermined portion of the calibration line.

25. The method of claim 24, wherein each corresponding predetermined portion of the calibration line has an equal length.

26. The method of claim 17, wherein comparing the first received (Rx) RF signal with the second received (Rx) RF signal comprises simultaneously determining the one or more characteristics associated with propagation of at least one of the first and second RF signals along a portion of the calibration line disposed between the first antenna element and the second antenna element and determining one or more characteristics associated with at least one reflected signal associated with a termination of the calibration line.

* * * * *